(12) United States Patent
Fukushima et al.

(10) Patent No.: US 8,681,265 B2
(45) Date of Patent: Mar. 25, 2014

(54) IMAGING DEVICE, EXTERNAL FLASH DETECTION METHOD, PROGRAM, AND INTEGRATED CIRCUIT

(75) Inventors: Yasushi Fukushima, Osaka (JP); Tadayuki Inoue, Hyogo (JP); Yuji Kiniwa, Fukuoka (JP); Katsuyuki Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 13/262,868

(22) PCT Filed: Apr. 13, 2010

(86) PCT No.: PCT/JP2010/002676
§ 371 (c)(1),
(2), (4) Date: Oct. 4, 2011

(87) PCT Pub. No.: WO2010/119669
PCT Pub. Date: Oct. 21, 2010

(65) Prior Publication Data
US 2012/0026359 A1 Feb. 2, 2012

(30) Foreign Application Priority Data

Apr. 16, 2009 (JP) ................................ 2009-099809
Apr. 17, 2009 (JP) ................................ 2009-100522
May 26, 2009 (JP) ................................ 2009-126015
Mar. 19, 2010 (JP) ................................ 2010-063795

(51) Int. Cl.
*H04N 5/222* (2006.01)

(52) U.S. Cl.
USPC ............ 348/370; 348/371; 348/374; 348/375

(58) Field of Classification Search
USPC .......... 348/370–376; 396/61, 62, 65–68, 106, 396/108, 124, 164–167, 204
See application file for complete search history.

(56) References Cited

U.S. PATENT DOCUMENTS 6,195,509 B1 * 2/2001 Nakahara ...................... 396/100
7,965,323 B2 6/2011 Lee et al.
(Continued)

FOREIGN PATENT DOCUMENTS

JP 11-341305 12/1999
JP 11-355655 12/1999
(Continued)

OTHER PUBLICATIONS

International Search Report issued Aug. 3, 2010 in International (PCT) Application No. PCT/JP2010/002676.

(Continued)

*Primary Examiner* — Yogesh Aggarwal
(74) *Attorney, Agent, or Firm* — Wenderoth, Lind & Ponack, L.L.P.

(57) ABSTRACT

When capturing images of a subject with an imaging device that uses a CMOS image sensor, a white band-shaped artifact appears in the imaging signal due to the influence of a rolling shutter operation performed when an external flash has been emitted. Manipulating or removing images in which such an artifact appears requires specifying the frames in which the artifact appears. A line averaging unit (11) calculates the average luminance level of each line in the imaging signal, the average luminance levels are temporarily stored by a storage unit (12), and thereafter a frame difference calculation unit (13) calculates the difference between the line average luminance levels and the line average luminance levels of the next frame. These frame difference values are compared with a reference value, and it is determined that the influence of an external flash is present if a portion of interest with high values is continuous for one frame period.

12 Claims, 37 Drawing Sheets

(56) References Cited

U.S. PATENT DOCUMENTS

2007/0140356 A1 6/2007 Wada
2007/0146500 A1 6/2007 Lee et al.
2008/0232765 A1 9/2008 Patten et al.

FOREIGN PATENT DOCUMENTS

| | | |
|---|---|---|
| JP | 2007-166408 | 6/2007 |
| JP | 2007-174678 | 7/2007 |
| JP | 2007-306225 | 11/2007 |
| JP | 2009-253367 | 10/2009 |

OTHER PUBLICATIONS

Supplementary European Search Report issued Jan. 21, 2013 in corresponding European Application No. EP 10 76 4256.

* cited by examiner

IMAGING DEVICE, EXTERNAL FLASH DETECTION METHOD, PROGRAM, AND INTEGRATED CIRCUIT

TECHNICAL FIELD

The present invention relates to an imaging device that can mitigate white band-shaped artifacts that appear during the capturing of video due to the flash of a still camera or the like.

BACKGROUND ART

In recent years, imaging devices that use a CMOS (Complementary Metal Oxide Semiconductor) image sensor, which has features such as a small size, low power consumption, and high-speed imaging, have been making a breakthrough in the field of consumer video cameras and professional video cameras.

A CMOS image sensor has various features that a CCD (Charge Coupled Device) does not have, and the method of reading out charge accumulated in photodiodes (hereinafter, "PD") is also different between a CMOS image sensor and a CCD image sensor.

With a CCD image sensor, PD charge readout is performed at the same time in all pixels, that is to say, using the so-called global shutter method. On the other hand, with a CMOS image sensor, PD charge readout is performed using the so-called rolling shutter method in which the readout time is shifted line-by-line (pixel-by-pixel). A CMOS image sensor therefore has disadvantages that a CCD image sensor does not have, due to the fact that the accumulated charged readout time is shifted, and the timing of the accumulation period of each pixel is shifted.

One example of a problem is the phenomenon in which white band-shaped artifacts appear in the captured screen when a video camera with a CMOS image sensor captures images of a subject being illuminated with flashes from a still camera or the like. Here, "white band-shaped artifact" refers to the phenomenon in which only part of a certain frame of a captured image is influenced by a flash, and only the portion above a midline (screen upper portion) or below it (screen lower portion) becomes brighter.

This phenomenon is described below with reference to FIGS. 34 and 35.

FIG. 34 is a diagram illustrating an imaging scene in which both a video camera and still cameras are present, such as a press conference.

FIG. 34 illustrates an imaging scene including a video camera 100, a monitor 101 displaying the imaging signal thereof, still cameras 102 and 103, and a subject 104. The video camera 100 uses a CMOS image sensor.

In such an imaging scene, when the still cameras 102 and 103 emit flashes, white band-shaped artifacts appear on the screen of the monitor 101 that is displaying the imaging signal from the video camera 100. This principle is described below.

FIG. 35 is a diagram illustrating the accumulation period (exposure period), the readout timing, the readout period, and the scan period of the video camera 100.

FIG. 35 shows charge accumulation periods and scan periods for reading out such charge for each scan line constituting the screen (image captured by the video camera 100), with the horizontal axis indicating the time axis. Envisioning the case of a high-definition camera, the total number of scan lines is assumed to be 1,125. Also, "monitor screen 0 period" shown in FIG. 35 is the period in which the imaging signal of frame 0 is output to the monitor screen or the like, and is assumed here to be 1/60 sec. The same also follows for "monitor screen 1 period" and the like.

In the video camera 100, for line 1 for example, which is the top line of the screen (one line worth of pixels (a PD being disposed in each pixel) on the face of the imaging element of the CMOS image sensor for acquiring a video signal forming line 1), PD accumulation (charge accumulation in a PD) for frame 1 starts exactly when the monitor screen 0 period starts, and the PD accumulation ends when one frame period, that is to say, the monitor screen 0 period, ends. Immediately thereafter (immediately after the PD accumulation ends), scanning for accumulated charge readout ("accumulated charged readout" will sometimes be simply referred to as "readout") for the accumulated PD signal of line 1 starts, and PD accumulation for the next frame 2 starts at the same time. Since 1,125 lines are scanned in one frame period (1/60 sec), the PD signal readout scan period is $1/60/1{,}125 \approx 1.48 \times 10^{-5}$ sec.

Next, for line 2, PD accumulation starts in conformity with the end of the PD readout scan period for frame 0 in line 1. In other words, PD accumulation and readout operations for line 2 are performed delayed with respect to those for line 1 by an amount corresponding to the PD readout scan period. The same operations as those described above are performed for line 3 and subsequent lines as well.

In this way, with the rolling shutter method, the charge accumulation periods for the lines constituting a frame are shifted little by little from top to bottom as shown in FIG. 35. Accordingly, the scan periods of the lines, that is to say, the PD signal readout times, are also immediately after the charge accumulation periods of the lines as shown in FIG. 35. In other words, with the video camera 100 using a CMOS image sensor, PD signal readout processing is sequentially performed in line order, such as the PD signal for line 1 being read out, and then the PD signal for line 2 being read out.

Here, as shown in FIG. 35, when a flash is emitted near the middle of the monitor screen 1 period (the period indicated as "flash emission period" in FIG. 35), the bright flash light influences the latter half of the charge accumulation period for frame 1 and the first half of the charge accumulation period for frame 2. As shown in FIG. 35, the flash emitted in the monitor screen 1 period spans the charge accumulation times and the charge readout times for frame 1 and frame 2 in line X and line Y.

Specifically, the bright flash light in the case shown in FIG. 35 has the following influence.

(Frame 1, lines a1 (lines belonging to portion indicated as "a1" in FIG. 35)):

In frame 1, the lines a1 portion before line X is not influenced by the flash light (the charge accumulation period has already ended).

(Frame 1, line X to line Y (lines belonging to portion indicated as "a2" in FIG. 35)):

In frame 1, the lines a2 portion in the period between line X and line Y is influenced by the flash light, and the accumulated light quantity gradually increases.

(Frame 1, line Y and subsequent lines (lines belonging to portion indicated as "a3" in FIG. 35)):

The lines a3 portion from line Y onward is influenced by the full light quantity of the flash light.

(Frame 2, lines b1 (lines belonging to portion indicated as "b1" in FIG. 35)):

Conversely, in frame 2, the lines b1 portion before line X is influenced by the full light quantity of the flash light.

(Frame 2, line X to line Y (lines belonging to portion indicated as "b2" in FIG. 35)):

In the lines b2 portion in the period between line X and line Y, the influence of the flash light gradually decreases.

(Frame 2, line Y and subsequent lines (lines belonging to portion indicated as "b3" in FIG. 35)):

In the lines b3 portion from line Y onward, the flash light has no influence since the accumulation period has not started yet.

Accordingly, assuming that the flash light emission period is just for a moment, and that the transient periods corresponding to the portions a2 and b2 in FIG. 35 are not present, on the monitor screen, as shown in the lower portion of FIG. 35, basically the lower half of the monitor screen 1 (the screen (image) formed by the imaging signal of frame 1) is bright, and the upper half of the monitor screen 2 (the screen (image) formed by the imaging signal of frame 2) is bright, and thus white band-shaped artifacts appear on the video display device. In the case of an imaging device using a CCD image sensor, unlike a CMOS image sensor, charge accumulation is performed at the same time for all of the lines constituting a frame, and thus the above problem does not occur, and a natural image that is entirely bright appears when a flash is emitted.

In this way, with an imaging device that uses a CMOS image sensor, there is the first problem that white band-shaped artifacts appear in a video formed by an imaging signal when an external flash is emitted. Also, with an imaging device that uses a CMOS image sensor, there is the second problem that performing appropriate processing with respect to white band-shaped artifacts that appear in a video requires appropriately detecting whether white band-shaped artifacts have appeared due to influence of an external flash.

First, a description will be given of conventional technology for solving the first problem.

The imaging device disclosed in Patent Literature 1 is an example of a conventional imaging device that solves the first problem.

FIG. 36 is a block diagram showing an example of the configuration of a conventional imaging device 900. The imaging device 900 is a so-called digital still camera that mainly records still images.

As shown in FIG. 36, the imaging device 900 includes an imaging unit 113, an image processing unit 114, a recording/display processing unit 116, a buffer 117, an evaluation unit 120, a storage unit 121, and a control unit 123.

The imaging unit 113 includes an imaging element, a CDS (Correlated Double Sampling) circuit, an A/D (Analog/Digital) circuit, a signal generator (SG), a timing generator (TG), and the like that are not shown, and the imaging unit 113 captures images of a subject and supplies images obtained as a result to the image processing unit 114.

The imaging element is constituted by a CCD image sensor, a CMOS image sensor, or the like, and the imaging element acquires an image signal that is an electrical signal by receiving incident light from a subject and performing photoelectric conversion, and outputs the acquired image signal. The imaging element is constituted by a plurality of pixels disposed planarly in a lattice arrangement, each pixel accumulating a charge according to the quantity of received light, and the imaging element receives light for a predetermined exposure time in accordance with a horizontal drive signal and a vertical drive signal that are supplied from the timing generator. The pixels of the imaging element accumulate a charge according to the quantity of received light, and the imaging element supplies the charges to the CDS circuit as an analog image signal.

The CDS circuit eliminates a noise component of the analog image signal supplied from the imaging element by performing correlated double sampling.

The image signal from which the noise component has been eliminated is supplied by the CDS circuit to the A/D circuit.

The A/D circuit performs A/D conversion on the analog image signal from the CDS circuit, and supplies the digital image data obtained as a result to the image processing unit 114.

Under control of the control unit 123, the signal generator generates a horizontal synchronization signal and a vertical synchronization signal, and outputs them to the timing generator.

Based on the horizontal synchronization signal and the vertical synchronization signal supplied from the signal generator, the timing generator generates the horizontal drive signal and the vertical drive signal for driving the imaging element, and supplies them to the imaging element.

The image processing unit 114 includes a Y-C separation circuit, a filter circuit, a WB (White Balance) circuit, an aperture compensation/gamma circuit, and the like that are not shown, and the image processing unit 114 performs predetermined image processing on the image data supplied from the A/D circuit of the imaging unit 113.

The image processing unit 114 supplies the image (image data) subjected to image processing to the recording/display processing unit 116 and the evaluation unit 120.

The Y-C separation circuit performs Y-C separation processing for separating the image data from the imaging unit 113 into a luminance signal (Y signal) and a chrominance signal (C signal).

The filter circuit performs noise reduction processing for filtering the image data from the imaging unit 113 and removing a noise component included in the image data.

The WB circuit performs processing for adjusting the white balance of an image by multiplying the image data from the imaging unit 113 by a gain so as to, for example, equalize the R, G, and B levels of a white subject.

The aperture compensation/gamma circuit subjects the image data from the imaging unit 113 to processing for adjusting the image quality through, for example, aperture correction for emphasizing edge portions in an image and gamma correction for adjusting the shade of an image.

The recording/display processing unit 116 receives the image (data) subjected to image processing from the image processing unit 114, and performs output control for outputting the image to a recording unit or a display unit that are not shown.

The buffer 117 stores data that needs to be temporarily stored when the recording/display processing unit 116 performs output control.

The evaluation unit 120 includes a detection circuit (not shown) that detects the brightness and color distribution of an image, and receives the image captured by the imaging element from the image processing unit 114.

The detection circuit performs detection on the image supplied from the image processing unit 114, and outputs information obtained as a result (e.g., information indicating the brightness and color distribution of a predetermined portion of the image, and information indicating the spatial frequency of a predetermined portion of the image) as an evaluation value with respect to the image captured by the imaging element.

The evaluation unit 120 supplies the evaluation value output by the detection circuit to the control unit 123.

The storage unit 121 is made up of a ROM (Read Only Memory), a RAM (Random Access Memory), an EEPROM (Electrically Erasable and Programmable Read Only Memory), or the like, and the storage unit 121 stores, for example, programs executed by a CPU (Central Processing Unit) (not shown) of the control unit 123, data necessary when the control unit 123 performs processing, and data that needs to be held even when the imaging device is powered off.

The control unit 123 includes the CPU and a calculation circuit that calculates a difference value, neither of which are shown. The control unit 123 receives the evaluation value with respect to the image captured by the imaging element from the evaluation unit 120, and temporarily stores the evaluation value received from the evaluation unit 120 in the storage unit 121.

The calculation circuit calculates a difference value between two predetermined evaluation values. The control unit 123 then controls various units of the imaging device based on the difference value calculated by the calculation circuit.

According this configuration, with the conventional imaging device 900, when a still image or moving image is captured by the imaging unit 113 in accordance with a user operation for example, the captured image is subjected to predetermined image processing by the image processing unit 114, and thereafter supplied to the recording/display processing unit 116 and the evaluation unit 120.

The recording/display processing unit 116 causes the image obtained after the predetermined image processing was carried out by the image processing unit 114 to be buffered in the buffer 117, and in the evaluation unit 120, an evaluation value is generated for the image by the detection circuit and supplied to the control unit 123. The control unit 123 then temporarily stores the evaluation value in the storage unit 121.

The calculation circuit of the control unit 123 calculates a difference value between this evaluation value and an evaluation value that was previously stored in the storage unit 121, that is to say, an evaluation value generated from the image of the frame one frame earlier. If the difference value is greater than or equal to a reference value that has been set in advance, it is determined that the image has been negatively influenced by an external flash, and if the difference value is less than the reference value, it is determined that the image has not been influenced by an external flash. The control unit 123 controls various units of the imaging device in accordance with the result of the determination, discards the image in the case of determining that the image has been negatively influenced by an external flash, and outputs the image in the case of determining that the image has not been negatively influenced by an external flash.

Accordingly, the conventional imaging device 900 solves the problem of white band-shaped artifacts that appear due to an external flash.

Next, a description will be given of conventional technology for solving the second problem.

The technology disclosed in Patent Literature 2 is an example of conventional technology that solves the second problem.

With this conventional technology, whether an imaging signal has been influenced by a flash (external flash) is determined by dividing a video into blocks of an appropriate size and examining whether the brightness of a block has risen compared to that of a block at the same position in the previous field. Specifically, as shown in FIG. 37, a difference unit 1102 calculates the difference between an input imaging signal VI and a signal obtained by a delay unit 1101 delaying the input imaging signal VI by one field, a summation unit 1103 obtains a sum of the differences for each of the predetermined number of blocks that the image was divided into, a counter 1105 counts the number of blocks for which the sum value is greater than a, and it is determined that a flash (external flash) was emitted (the imaging signal has been influenced by an external flash) if the counted number is greater than or equal to 13 and furthermore less than or equal to y. This conventional technology enables determining whether an imaging signal has been influenced by an external flash.

CITATION LIST

Patent Literature

Patent Literature 1: JP 2007-306225A
Patent Literature 2: JP H11-341305A

SUMMARY

Technical Problem

However, such conventional technology has the following problems.

With the conventional imaging device 900 that solves the first problem, it is conceivable to employ a method of calculating, for example, the average value of the luminance level for the entire screen as the evaluation value of a captured image. In this case, with the imaging device 900, the evaluation unit 120 sequentially obtains an average luminance level value for each frame by integrating and averaging the luminance signal, the control unit 123 temporarily stores the average luminance level values in the storage unit 121, and when the image of the next frame is input, whether the influence of an external flash is present is determined by similarly calculating an average luminance level value and comparing it with the average luminance level value of the frame one frame earlier that is stored in the storage unit 121.

However, there are cases where the influence of an external flash is present in only a small portion at the bottom of the screen, such as the bottom line, and with this method, it is difficult to determine whether the influence of an external flash is present since a clear difference cannot be found between the average luminance level of the entire screen and the average luminance level of a frame that has not been influenced by an external flash.

Also, in the case where, for example, the average value of luminance levels in only a portion of the screen is calculated as the evaluation value of the captured image, since the external flash has influence only from an arbitrary line, it is difficult to specify in advance which portion the average luminance level should be calculated for.

Also, with the conventional imaging device 900, it is possible to store the image of the frame one frame earlier, determine the portion for which the average luminance level is to be calculated when the influence of an external flash is present, and compare the evaluation values of the frame one frame earlier and the current frame, but this requires a frame memory or the like for storing the frame one frame earlier, thus leading to an increase in the circuit scale.

Also, with the conventional technology that solves the second problem, there are cases where it is erroneously determined that a flash was emitted when a high-luminance subject has moved (it is erroneously determined that the image formed by the imaging signal (frame image or field image) has been influenced by an external flash), and flash correction (correction for eliminating the influence of an external flash)

is executed. For example, assume that a screen has been divided into 16 blocks vertically and 24 blocks horizontally as shown in FIG. 32, and a high-luminance subject is present in the hatched portion. If this subject moves one block upward in the next field, the result is shown in FIG. 33. Here, the blocks in the hatched portion in the 10th level in FIG. 33 are brighter than those in the previous field, and therefore it is determined that a flash was emitted (it is erroneously determined that the influence of an external flash is present).

However, there is technology called motion detection that enables finding out how much and in which direction an object has moved. Using this motion detection technology enables finding out that the high-luminance subject in FIG. 32 has moved to the position in FIG. 33, and if the block used for comparison in the processing in FIG. 33 is compared with the block one level down in the previous field, there is no change in brightness, thus preventing a change in brightness due to motion from being mistaken for a change in brightness due to a flash.

However, in the case where motion detection is realized using a circuit, a relatively large-scale circuit is necessary, thus making it impossible to avoid a rise in the cost and power consumption of the device.

An object of the present invention is to solve the conventional problems described above, and to provide an imaging device, an external flash detection method, a program, and an integrated circuit that can reliably determine whether an imaging signal has been influenced by an external flash emitted at an arbitrary time without leading to an increase in the circuit scale.

Another object of the present invention is to provide an imaging device, an external flash detection method, a program, and an integrated circuit that can perform flash presence detection with respect to an unnatural image including a bright horizontal band due to an external flash and with respect to a moving high-luminance subject, with a small circuit scale and few erroneous operations.

Solution to Problem

A first aspect of the present invention is an imaging device including an imaging unit and a flash detection unit.

The imaging unit acquires an imaging signal by capturing an image of a subject. The flash detection unit detects whether the imaging signal acquired by the imaging unit has been influenced by a flash.

Accordingly, it is possible to determine whether the influence of an external flash is present in an imaging signal.

A second aspect of the present invention is the first aspect of the present invention, wherein the flash detection unit includes a line luminance information value calculation unit, a frame different calculation unit, and a determination unit.

The line luminance information value calculation unit calculates a luminance information value for each line of an image formed by the imaging signal. The frame difference calculation unit, for each line of a current image formed by the imaging signal targeted for processing, calculates a frame difference value by subtracting the line luminance information value of the same line in an image one unit image earlier from the luminance information value of the line of the current image. The determination unit determines whether the influence of an external flash is present in the imaging signal by determining whether the frame difference values are greater than a first reference value, which is a predetermined value.

With this imaging device, whether the influence of an external flash is present in an imaging signal is determined by determining whether there has been a change in luminance between the same line in unit images. Accordingly, with this imaging device, it is possible to reliably determine whether the influence of an external flash emitted at an arbitrary time is present in an imaging signal without inviting an increase in the circuit scale.

Note that "unit image" refers to an image constituting a screen of a display device caused to display an imaging signal, and for example, one frame image or one field image corresponds to a "unit image". Accordingly, in the case where the "unit image" is a frame image, "one unit image earlier" refers to one frame image earlier (i.e., earlier by the time corresponding to one frame image), and in the case where the "unit image" is a field image, "one unit image earlier" refers to one field image earlier (i.e., earlier by the time corresponding to one field image).

Note that the "first reference value" needs only be set to a value that enables appropriately detecting an external flash taking the system performance (camera performance) of the imaging device into consideration. For example, in the imaging device, the "first reference value" may be changed (the "first reference value" may be a variably set value) according to the average luminance level of a predetermined image region (predetermined image region formed by an imaging signal) of the imaging signal output from the imaging unit (an imaging signal that has been subjected to processing such as AGC and has been standardized (a video signal that has been adjusted so as to have a desired predetermined dynamic range in the camera system). Also, the "first reference value" may be changed (the "first reference value" may be a variably set value) for each unit image (e.g., for each frame).

A third aspect of the present invention is the second aspect of the present invention, wherein each of the luminance information values is any one of an average value of luminance levels, an additional value of luminance levels, a root mean square value of luminance levels, and a weighted average value of luminance levels.

A fourth aspect of the present invention is the second or third aspect of the present invention, wherein the determination unit determines that the influence of an external flash is present if a period of continuous lines whose frame difference values are greater than the first reference value is substantially equal to one frame period.

Accordingly, with this imaging device, the determination unit monitors change in the frame difference value using the characteristic that the period for which the influence of an external flash is present is continuous for substantially one frame period, thus enabling precisely detecting whether the influence of an external flash is present in an imaging signal.

Note that "substantially equal to one frame period" is a concept including not only the case of strictly being equal to one frame period, but also a range including a margin of error arising from measurement error or design error. For example, if the period targeted for measurement is included in a range of within 10% of one frame period, it can be considered to be "substantially equal to one frame period".

A fifth aspect of the present invention is any of the second to fourth aspects of the present invention, wherein the determination unit determines that the line at the start of the period of continuous lines whose frame difference values are greater than the first reference value is a start line at which the influence of an external flash started.

A sixth aspect of the present invention is any of the second to fifth aspects of the present invention, wherein the determination unit determines whether the influence of an external flash has ended by determining whether the frame difference values are less than a second reference value, which is a predetermined value.

With this imaging device, the determination unit determines that the influence of an external flash in an imaging signal has ended if the frame difference value is less than the second reference value. Accordingly, with this imaging device, it is possible to appropriately determine (detect) when the influence of an external flash in an imaging signal has ended.

Note that the "second reference value" needs only be set to a value that enables appropriately detecting an external flash taking the system performance (camera performance) of the imaging device into consideration. For example, in the imaging device, the "second reference value" may be changed (the "second reference value" may be a variably set value) according to the average luminance level of a predetermined image region (predetermined image region formed by an imaging signal) of the imaging signal output from the imaging unit (an imaging signal that has been subjected to processing such as AGC and has been standardized (a video signal that has been adjusted so as to have a desired predetermined dynamic range in the camera system). Also, the "second reference value" may be changed (the "second reference value" may be a variably set value) for each unit image (e.g., for each frame).

A seventh aspect of the present invention is any of the second to sixth aspects of the present invention, wherein the determination unit determines that the influence of an external flash has ended if a period of continuous lines whose frame difference values are less than the second reference value is substantially equal to one frame period.

Accordingly, with this imaging device, the determination unit monitors change in the frame difference value using the characteristic that the period for which the influence of an external flash is present is continuous for substantially one frame period, thus enabling precisely detecting whether the influence of an external flash is present in an imaging signal (in particular, detecting the end of an external flash).

An eighth aspect of the present invention is any of the second to seventh aspects of the present invention, wherein the determination unit determines that the line at the start of the period of continuous lines whose frame difference values are less than the second reference value is an end line at which the influence of an external flash ends.

Accordingly, with this imaging device, it is possible to appropriately detect the end line in which the influence of an external flash ends.

A ninth aspect of the present invention is any of the second, third, and fifth to eighth aspects of the present invention, wherein the imaging unit includes an electronic shutter function. The determination unit determines that the influence of an external flash is present in the imaging signal if a period of continuous lines whose frame difference values are greater than the first reference value is substantially equal to a period corresponding to a shutter time of the electronic shutter.

Accordingly, with this imaging device, it is possible to appropriately detect the period for which the influence of an external flash is present taking into consideration the shutter time of an electronic shutter.

Note that "substantially equal" is a concept that includes not only the case of strictly being equal, but also include a certain allowable range (e.g., measurement error, design error, or a margin for ensuring device operation).

A tenth aspect of the present invention is any of the second to ninth aspects of the present invention, further including a storage unit that stores the line average luminance levels calculated by the line average luminance level calculation unit.

An eleventh aspect of the present invention is an external flash detection method including an imaging step, a flash detection step, a line luminance information value calculation step, a frame difference calculation step, and a determination step.

The imaging step is a step of acquiring an imaging signal by capturing an image of a subject. The flash detection step is a step of detecting whether the imaging signal acquired in the imaging step has been influenced by a flash. The line luminance information value calculation step is a step of calculating a luminance information value for each line of an image formed by the imaging signal. The frame difference calculation step is a step of calculating, for each line of a current image formed by the imaging signal targeted for processing, a frame difference value by subtracting the line luminance information value of the same line in an image one unit image earlier from the luminance information value of the line of the current image. The determination step is a step of determining whether the influence of an external flash is present in the imaging signal by determining whether the frame difference values are greater than a first reference value, which is a predetermined value.

This enables realizing an external flash detection method that achieves the same effects as the second aspect of the invention.

A twelfth aspect of the present invention is a program for causing a computer to execute an external flash detection method used in an imaging device including an imaging unit that acquires an imaging signal by capturing an image of a subject. The external flash detection method includes a flash detection step, a line luminance information value calculation step, a frame difference calculation step, and a determination step.

The flash detection step is a step of detecting whether the imaging signal acquired by the imaging unit has been influenced by a flash. The line luminance information value calculation step is a step of calculating a luminance information value for each line of an image formed by the imaging signal. The frame difference calculation step is a step of calculating, for each line of a current image formed by the imaging signal targeted for processing, a frame difference value by subtracting the line luminance information value of the same line in an image one unit image earlier from the luminance information value of the line of the current image. The determination step is a step of determining whether the influence of an external flash is present in the imaging signal by determining whether the frame difference values are greater than a first reference value, which is a predetermined value.

This enables realizing a program for causing a computer to execute an external flash detection method that achieves the same effects as the second aspect of the invention.

A thirteenth aspect of the present invention is an integrated circuit used in an imaging device including an imaging unit that acquires an imaging signal by capturing an image of a subject, the integrated circuit including a flash detection unit, a line luminance information value calculation unit, a frame difference calculation unit, and a determination unit.

The flash detection unit detects whether the imaging signal acquired by the imaging unit has been influenced by a flash. The line luminance information value calculation unit calculates a luminance information value for each line of an image formed by the imaging signal. The frame difference calculation unit, for each line of a current image formed by the imaging signal targeted for processing, calculates a frame difference value by subtracting the line luminance information value of the same line in an image one unit image earlier from the luminance information value of the line of the current image. The determination unit determines whether the influence of an external flash is present in the imaging signal by determining whether the frame difference values are greater than a first reference value, which is a predetermined value.

This enables realizing an integrated circuit that achieves the same effects as the second aspect of the invention.

A fourteenth aspect of the present invention is the first aspect of the present invention, wherein the flash detection unit includes a line determination unit, a determination information storage unit, and a frame determination unit.

In the flash detection unit, the line determination unit determines whether the influence of an external flash is present in a top line and a bottom line of an image formed by the imaging signal, and outputs top line determination information, which is a determination result regarding the top line, and bottom line determination information, which is a determination result regarding the bottom line. The determination information storage unit stores the bottom line determination information. The frame determination unit, in a case where the bottom line determination information stored in the determination information storage unit indicates that the influence of an external flash is present in the bottom line of an imaging signal of the frame one frame earlier, and furthermore the top line determination information output from the line determination unit indicates that the influence of an external flash is present in the top line of the current imaging signal, determines that the influence of an external flash is present in the imaging signal that forms a frame image of the frame one frame earlier and the imaging signal that forms the current frame image.

With this imaging device, whether the influence of an external flash is present in an imaging signal is determined by examining change (e.g., change in line average luminance) in the top line and the bottom line of images (e.g., frame images). Accordingly, with this imaging device, it is possible to reliably determine whether the influence of an external flash emitted at an arbitrary time is present in an imaging signal without inviting an increase in the circuit scale.

A fifteenth aspect of the present invention is the fourteenth aspect of the present invention, wherein letting an evaluation value $LT(n)$ and an evaluation value $LB(n)$ (n being a frame number) respectively be the evaluation values calculated using a predetermined method for the top line and the bottom line of the current frame image formed by the current imaging signal, letting evaluation values $LT(n-1)$ and $LB(n-1)$ (n−1 being a frame number) respectively be evaluation values for the top line and the bottom line of the frame image of the frame one frame earlier that is formed by the imaging signal of the frame one frame earlier, and letting a predetermined amount th (th>0) be a predetermined amount, the line determination unit performs the following determination processing (1) to (4).

(1) In a case where $LT(n)-LT(n-1) \geq th$, the line determination unit determines that the influence of an external flash in the top line of the current frame image has started.

(2) In a case where $LT(n)-LT(n-1) \leq -th$ by a predetermined amount or more, the line determination unit determines that the influence of an external flash in the top line of the current frame image has ended.

(3) In a case where $LB(n)-LB(n-1) \geq th$, the line determination unit determines that the influence of an external flash in the bottom line of the current frame image has started.

(4) In a case where $LB(n)-LB(n-1) \leq -th$, the line determination unit determines that the influence of an external flash in the bottom line of the current frame image has ended.

Accordingly, with this imaging device, whether the influence of an external flash is present in an imaging signal can be appropriately determined without inviting an increase in the circuit scale, by examining change (e.g., change in line average luminance) in the top line and the bottom line of images (e.g., frame images).

Note that the "predetermined method" for calculating an evaluation value is a method for acquiring a characteristic value for each line that arises due to an external flash, and corresponds to, for example, a method for acquiring an average value of luminance, an additional value of luminance, or the like for each line.

A sixteenth aspect of the present invention is the fourteenth aspect of the present invention, wherein letting an evaluation value $LT(n)$ and an evaluation value $LB(n)$ (n being a frame number) respectively be the evaluation values calculated using a predetermined method for the top line and the bottom line of the current frame image formed by the current imaging signal, letting evaluation values $LT(n-1)$ and $LB(n-1)$ (n−1 being a frame number) respectively be evaluation values for the top line and the bottom line of the frame image of the frame one frame earlier that is formed by the imaging signal of the frame one frame earlier, and letting a predetermined amount th (th>0) be a predetermined amount, the line determination unit performs the following determination processing (1) and (2).

(1) In a case where $LB(n)-LB(n) \geq th$, the line determination unit determines that the influence of an external flash in the bottom line of the current frame image has started, and that the influence of an external flash in the top line of a frame image one frame after the current frame has started.

(2) In a case where $LB(n)-LT(n) \leq -th$, the line determination unit determines that the influence of an external flash in the bottom line of the current frame image has ended, and that the influence of an external flash in the top line of the frame image one frame after the current frame image has ended.

Accordingly, with this imaging device, whether the influence of an external flash is present in an imaging signal can be appropriately determined without inviting an increase in the circuit scale, by examining change (e.g., change in line average luminance) in the top line and the bottom line of the same image (e.g., the same frame image).

A seventeenth aspect of the present invention is any of the fourteenth to sixteenth aspects of the present invention, wherein in a case where the line determination unit has determined that the influence of an external flash is present in the top line of the frame image formed by the imaging signal, the determination information storage unit stores the top line determination information indicating the determination result. In a case where the top line determination information indicates that the influence of an external flash is present in the top line of the current frame image formed by the current imaging signal, and furthermore the line determination unit has determined that the influence of an external flash is present in the bottom line of the current frame image formed by the current imaging signal, the frame determination unit determines that the influence of an external flash is present in the entirety of the current frame image formed by the current imaging signal.

Accordingly, with this imaging device, it is possible to appropriately detect an image (e.g., a frame image) in which the influence of an external flash is present in the entirety of the frame image without inviting an increase in the circuit scale, by examining change (e.g., change in line average luminance) in the top line and the bottom line of images (e.g., frame images).

An eighteenth aspect of the present invention is the first aspect of the present invention, wherein the flash detection unit includes a line evaluation value calculation unit, a line determination unit, and a frame determination unit.

The imaging unit acquires an imaging signal by capturing an image of a subject. The line evaluation value calculation unit calculates an evaluation value for each line of a captured image that is formed by the imaging signal and can constitute a frame.

The line determination unit detects, as an m-th line in an N-th frame (N being an integer), a line targeted for processing whose evaluation value is greater than the evaluation value of a line that is a lines (a being a positive integer) earlier than the line targeted for processing by a predetermined amount or more, and stores line position information m indicating the line position of the m-th line, the evaluation value Lm(N) of the m-th line, and the evaluation value Lm–a (N) of an (m–a)-th line that is a lines earlier than the m-th line. The frame determination unit determines whether the influence of an external flash is present in each of the frames constituted by the imaging signal by, with respect to the line position information m stored in the line determination unit, performing a comparison between lines or between frames in which the evaluation value Lm(N) of the m-th line of the N-th frame and the evaluation value Lm–a (N) of the (m–a)-th line of the N-th frame that are stored in the line determination unit are compared with the evaluation value Lm(N+α) (α being a natural number) of the m-th line and the evaluation value Lm–a (N+α) of the (m–a)-th line of the imaging signal in a frame after the N-th frame.

With this imaging device, the line determination unit first specifies a line to be focused on by detecting a steep change in evaluation value in the line direction (line evaluation values), and thereafter monitors only the specified line (in each frame image), thus enabling appropriately detecting a portion (imaging signal) including the influence of an external flash.

A nineteenth aspect of the present invention is the eighteenth aspect of the present invention, wherein letting the (N+1)-th frame (N being an integer) be the current frame, the frame determination unit determines that the influence of an external flash is present in the imaging signal of the N-th frame that is the frame one frame earlier and the imaging signal of the (N+1)-th frame that is the current frame if the following (1) to (3) are all satisfied.

(1) With respect to the line position information m stored in the line determination unit, the evaluation value Lm(N+1) of the m-th line of the imaging signal of the (N+1)-th frame that is the current frame is less than the evaluation value Lm–a (N+1) of the (m–a)-th line of the imaging signal of the (N+1)-th frame that is the current frame by a predetermined amount T1 or more, that is to say, $(Lm-\alpha(N+1))-Lm(N+1) \geq$ (predetermined amount $T1$)

is satisfied.

(2) The evaluation value Lm–a (N+1) of the (m–a)-th line of the imaging signal of the (N+1)-th frame that is the current frame is greater than the evaluation value Lm–a (N) of the (m–a)-th line of the imaging signal of the frame one frame earlier that is stored in the line determination unit by a predetermined amount T2 or more, that is to say, $(Lm-a(N+1))-Lm-a(N) \geq$ (predetermined amount $T2$)

is satisfied.

(3) The evaluation value Lm(N+1) of the m-th line of the imaging signal of the (N+1)-th frame that is the current frame is less than the evaluation value Lm(N) of the m-th line of the imaging signal of the frame one frame earlier that is stored in the line determination unit by a predetermined amount T3 or more, that is to say, $Lm(N)-Lm(N+1) \geq$ (predetermined amount $T3$)

is satisfied.

With this imaging device, regardless of the timing when an external flash is emitted (regardless of the line at which the influence of an external flash starts), only the line position and the line evaluation value need to be stored, thus eliminating the need for a frame memory or the like, and enabling the comparison of evaluation values (line evaluation values) between frames, and employing the regularity of the change in evaluation value (line evaluation value) in both the line direction and the frame direction of frame images (captured images) enables more reliably determining whether the influence of an external flash is present.

A twentieth aspect of the present invention is the nineteenth aspect of the present invention, wherein the predetermined amount T1, the predetermined amount T2, and the predetermined amount T3 satisfy the following relation:

(predetermined amount $T1$)=(predetermined amount $T2$)=(predetermined amount $T3$)

With this imaging device, determination processing can be performed using a single predetermined amount since the predetermined amount T1, the predetermined amount T2, and the predetermined amount T3 are the same, thus enabling more easily detecting whether the influence of an external flash is present.

A twenty-first aspect of the present invention is any of the eighteenth to twentieth aspects of the present invention, wherein the frame determination unit determines that the influence of an external flash on the imaging signal of the N-th frame has started in the following case (1), and subsequently determines that the influence of an external flash on the imaging signal of the (N+α)-th frame has ended in the following case (2).

(1) The case where, with respect to the line position information m that is stored in the line determination unit and was detected in the imaging signal of the N-th frame that is the frame one frame earlier, the evaluation value Lm–a (N+1) of the (m–a)-th line of the imaging signal of the (N+1)-th frame that is the current frame is greater than the evaluation value Lm–a (N) of the (m–a)-th line of the imaging signal of the N-th frame that is the frame one frame earlier stored in the line determination unit by a predetermined amount T4 or more, that is to say, $(Lm-\alpha(N+1))-(Lm-\alpha(N1)) \geq$ (predetermined amount $T4$)

is satisfied.

(2) The case where the evaluation value Lm(N+α) (α being a natural number) of the m-th line of the imaging signal of the (N+α)-th frame that is a frame after the N-th frame is less than the evaluation value Lm(N) of the m-th line stored in the line storage unit by a predetermined amount T5 or more for the first time in the frame after the N-th frame, that is to say, $Lm(N)-Lm(N+\alpha) \geq$ (predetermined amount $T5$)

is satisfied.

With this imaging device, the frames at which the influence of an external flash starts and ends are detected by monitoring a change, between frames, in a specified line in the imaging signal of the frame in which the influence of an external flash started, thus enabling appropriately determining frames that include the influence of an external flash even in the case where the influence of an external flash spans three or more frames.

A twenty-second aspect of the present invention is the twenty-first aspect of the present invention, wherein the predetermined amount T4 and the predetermined amount T5 satisfy the following relation:

(predetermined amount $T4$)=(predetermined amount $T5$)

With this imaging device, determination processing can be performed using a single predetermined amount since the predetermined amount T4 and the predetermined amount T5 are the same, thus enabling more easily detecting whether the influence of an external flash is present.

A twenty-third aspect of the present invention is any of the eighteenth to twenty-second aspects of the present invention, wherein the evaluation values are each a signal average value of luminance signals of respective lines of the imaging signal.

Accordingly, with this imaging device, it is possible to detect whether the influence of an external flash is present based on a change in the luminance level of an imaging signal.

A twenty-fourth aspect of the present invention is any of the eighteenth to twenty-third aspects of the present invention, wherein the imaging unit outputs a plurality of channels of primary color signals as imaging signals and includes imaging elements, each of which captures an imaging of a subject and outputs an imaging signal corresponding to a channel of primary color signal respectively. The evaluation value is an average value of the imaging signal forming a line with respect to each channel. The line determination unit detects, as an m-th line in an N-th frame (N being an integer), a line targeted for processing whose evaluation values for all of the channels are greater than the evaluation values of a line that is a lines earlier than the line targeted for processing by respective predetermined amounts or more, and stores line position information m indicating the line position of the m-th line, vector data Lvm(N) indicating the evaluation values of the plurality of channels of the m-th line, and vector data Lvm−α(N) indicating the evaluation values of the plurality of channels of an (m−a)-th line that is a lines earlier than the m-th line. The frame determination unit performs, with respect to the line position information m stored in the line determination unit, a comparison between lines or between frames for each of the plurality of channels, in which the vector data Lvm(N) and Lvm−α(N) indicating the evaluation values of the m-th line and the (m−a)-th line that are stored in the line determination unit are compared with the vector data Lvm(N+α) and Lvm−α(N+α) indicating the evaluation values of the m-th line and the (m−a)-th line of the imaging signal in a frame after the N-th frame, (1) in a case where the evaluation values for all of the channels have increased by respective predetermined amounts or more, the frame determination unit determines that the evaluation values Lm and Lm−α of the m-th line and the (m−a)-th line have increased, and (2) in a case where the evaluation values for all of the channels have decreased by respective predetermined amounts or more, the frame determination unit determines that the evaluation values Lm and Lm−α of the m-th line and the (m−a)-th line have decreased.

With this imaging device, in the case where the imaging unit includes, for example, three imaging elements, which output three channels of primary color signals, namely green, blue, and red, respectively, the influence of an external flash that has been emitted starts in the same line in the same frame of the imaging signals for the three channels, and the influence of an external flash ends in the same line of another frame, and therefore by setting the condition that the evaluation values of each of the three channels have increased or decreased by a predetermined amount or more at the same time when performing detection, it is possible to more reliably detect whether the influence of an external flash is present regardless of the subject.

Note that the vector data is multidimensional data having a plurality of elements (scalar values). For example, letting Lrm be the evaluation value of the R (red) channel signal of the m-th line, Lgm be the evaluation value of the G (green) channel signal of the m-th line, and Lbm be the evaluation value of the B (blue) channel signal of the m-th line, vector data Lvm indicating the evaluation values of the R channel, the G channel, and the B channel of the m-th line is obtained as follows.

$Lvm=(Lrm,Lgm,Lbm)$

Then, for example, the difference calculation (vector calculation) can be performed on the m-th line and the k-th line as follows.

$$Lvm - Lvk = (Lrm, Lgm, Lbm) - (Lrk, Lgk, Lbk)$$
$$= (Lrm - Lrk, Lgm - Lgk, Lbm - Lbk)$$

Also, a comparison (magnitude comparison) can be performed between (Lvm−Lvk) and vector data thv=(thr,thg,thb) that is a predetermined amount.

For example, (Lvm−Lvk)>thv means the following.

$Lrm-Lrk>thr$ $Lgm-Lgk>thg$ $Lbm-Lbk>thb$

A twenty-fifth aspect of the present invention is an imaging device that includes an imaging unit, a line evaluation value calculation unit, a line increase determination unit, a line decrease determination unit, and a frame determination unit.

The imaging unit captures an image of a subject and outputs an imaging signal. The line evaluation value calculation unit that calculates an evaluation value for each line of a captured image that is formed by the imaging signal and can constitute a frame. The line increase determination unit detects, as an m1-th line, a line targeted for processing whose evaluation value is greater than the evaluation value of a line a lines (a being a positive integer) earlier than the line targeted for processing by a predetermined amount or more. The line decrease determination unit detects, as an m2-th line, a line targeted for processing whose evaluation value is less than the evaluation value of a line b lines (b being a positive integer) earlier than the line targeted for processing by a predetermined amount or more. The frame determination unit, in a case where the line increase determination unit has detected the m1-th line in the imaging signal of an N-th frame, which is the current frame, determines that the influence of an external flash started from the imaging signal of the N-th frame that is the current frame, and in a case where the line decrease determination unit has detected the m2-th line in the imaging signal of a frame after the N-th frame, determines that the influence of an external flash ended in the imaging signal of an (N+α)-th frame (α being an integer), which is the frame in which the m2-th line was detected.

With this imaging device, the frame in which the influence of an external flash starts is detected by detecting a steep increase in evaluation values in the line direction, and the frame in which the influence of an external flash ends is detected by detecting a steep decrease in evaluation values in the line direction in a subsequent frame. For this reason, with this imaging device, it is possible to determine whether the influence of an external flash is present regardless of the timing when an external flash is emitted (regardless of the line at which the influence of an external flash starts), without requiring a frame memory or the like.

A twenty-sixth aspect of the present invention is the twenty-fifth aspect of the present invention, wherein the evaluation values are each a signal average value of luminance signals of respective lines of the imaging signal.

Accordingly, with this imaging device, it is possible to detect whether the influence of an external flash is present based on a change in the luminance level of an imaging signal.

A twenty-seventh aspect of the present invention is the twenty-fifth or twenty-sixth aspect of the present invention, wherein the imaging unit outputs a plurality of channels of primary color signals as imaging signals and includes imaging elements, each of which captures an imaging of a subject and outputs an imaging signal corresponding to a channel of primary color signal respectively. The evaluation value is an average value of the imaging signal forming a line with respect to each channel. The line increase determination unit and the line decrease determination unit detect the m1-th line and the m2-th line in a case where the evaluation values of all of the channels are greater than and less than the evaluation values of the lines a lines earlier and b lines earlier than the line targeted for processing by the respective predetermined amounts or more.

With this imaging device, in the case where the imaging unit includes, for example, three, for example, three imaging elements, which output three channels of primary color signals, namely green, blue, and red, respectively, the influence of an external flash that has been emitted starts in the same line in the same frame of the imaging signals for the three channels, and the influence of an external flash ends in the same line of another frame. For this reason, with this imaging device, by setting the condition that the evaluation values of each of the three channels have increased or decreased by a predetermined amount or more at the same time when performing detection, it is possible to more reliably detect whether the influence of an external flash is present regardless of the subject.

A twenty-eighth aspect of the present invention is an external flash detection method used in an imaging device including an imaging unit that acquires an imaging signal by capturing an image of a subject, including a line evaluation value calculation step, a line determination step, and a frame determination step.

The line evaluation value calculation step is a step of calculating an evaluation value for each line of a captured image that is formed by the imaging signal and can constitute a frame. The line determination step is a step of detecting, as an m-th line in an N-th frame (N being an integer), a line targeted for processing whose evaluation value is greater than the evaluation value of a line that is a lines (a being a positive integer) earlier than the line targeted for processing by a predetermined amount or more, and storing line position information m indicating the line position of the m-th line, the evaluation value Lm(N) of the m-th line, and the evaluation value Lm−a (N) of an (m−a)-th line that is a lines earlier than the m-th line. The frame determination step is a step of determining whether the influence of an external flash is present in each of the frames constituted by the imaging signal by, with respect to the line position information m stored in the line determination step, performing a comparison between lines or between frames in which the evaluation value Lm(N) of the m-th line of the N-th frame and the evaluation value Lm−a (N) of the (m−a)-th line of the N-th frame that were stored in the line determination unit are compared with the evaluation value Lm(N+α) (α being a natural number) of the m-th line and the evaluation value Lm−a (N+α) of the (m−a)-th line of the imaging signal in a frame after the N-th frame.

This enables realizing an external flash detection method that achieves the same effects as the eighteenth aspect of the invention.

A twenty-ninth aspect of the present invention is a program for causing a computer to execute an external flash detection method used in an imaging device including an imaging unit that acquires an imaging signal by capturing an image of a subject. The external flash detection method includes a line evaluation value calculation step, a line determination step, and a frame determination step.

The line evaluation value calculation step is a step of calculating an evaluation value for each line of a captured image that is formed by the imaging signal and can constitute a frame. The line determination step is a step of detecting, as an m-th line in an N-th frame (N being an integer), a line targeted for processing whose evaluation value is greater than the evaluation value of a line that is a lines (a being a positive integer) earlier than the line targeted for processing by a predetermined amount or more, and storing line position information m indicating the line position of the m-th line, the evaluation value Lm(N) of the m-th line, and the evaluation value Lm−a (N) of an (m−a)-th line that is a lines earlier than the m-th line. The frame determination step is a step of determining whether the influence of an external flash is present in each of the frames constituted by the imaging signal by, with respect to the line position information m stored in the line determination step, performing a comparison between lines or between frames in which the evaluation value Lm(N) of the m-th line of the N-th frame and the evaluation value Lm−a (N) of the (m−a)-th line of the N-th frame that were stored in the line determination unit are compared with the evaluation value Lm(N+α) (α being a natural number) of the m-th line and the evaluation value Lm−a(N+α) of the (m−a)-th line of the imaging signal in a frame after the N-th frame.

This enables realizing a program for causing a computer to execute an external flash detection method that achieves the same effects as the eighteenth aspect of the invention.

A thirtieth aspect of the present invention is an integrated circuit used in an imaging device including an imaging unit that acquires an imaging signal by capturing an image of a subject, the integrated circuit including a line evaluation value calculation unit, a line determination unit, and a frame determination unit.

The line evaluation value calculation unit calculates an evaluation value for each line of a captured image that is formed by the imaging signal and can constitute a frame. The line determination unit detects, as an m-th line in an N-th frame (N being an integer), a line targeted for processing whose evaluation value is greater than the evaluation value of a line that is a lines (a being a positive integer) earlier than the line targeted for processing by a predetermined amount or more, and stores line position information m indicating the line position of the m-th line, the evaluation value Lm(N) of the m-th line, and the evaluation value Lm−a (N) of an (m−a)-th line that is a lines earlier than the m-th line. The frame determination unit determines whether the influence of an external flash is present in each of the frames constituted by the imaging signal by, with respect to the line position information m stored in the line determination unit, performing a comparison between lines or between frames in which the evaluation value Lm(N) of the m-th line of the N-th frame and the evaluation value Lm–a (N) of the (m–a)-th line of the N-th frame that are stored in the line determination unit are compared with the evaluation value Lm(N+α) (α being a natural number) of the m-th line and the evaluation value Lm–a (N+α) of the (m–a)-th line of the imaging signal in a frame after the N-th frame.

This enables realizing an integrated circuit that achieves the same effects as the eighteenth aspect of the invention.

A thirty-first aspect of the present invention is the first aspect of the present invention, further including a flash correction processing unit.

The flash detection unit divides an N-th image, which is the current unit image formed by the imaging signal, into blocks of a predetermined size, obtains an average value of signal values of the imaging signal for each of the divided blocks, and detects whether the influence of a flash is present in the current unit image formed by the imaging signal based on a comparison of the average value of a block at an arbitrary position (i,j) (position of the block in the i-th row and the j-th column) in the current unit image with the average value of a block that is neighboring to the same position (i,j) in a unit image one unit image earlier than the current unit image. In a case where the flash detection unit has determined that the influence of a flash is present in the imaging signal, the flash correction processing unit performs correction on the influence of a flash that is present in the imaging signal.

With this imaging device, the flash detection unit detects whether the influence of a flash is present in the current unit image formed by the imaging signal based on a comparison of the average value of a block at an arbitrary position (i,j) (position of the block in the i-th row and the j-th column) in the current unit image with the average value of a block that is neighboring to the same position (i,j) in a unit image one unit image earlier than the current unit image. Accordingly, with this imaging device, it is possible to reliably detect whether an external flash was emitted without performing processing such as motion detection, and without, for example, mistakenly determining "external flash" with respect to a moving high-luminance subject.

A thirty-second aspect of the present invention is the thirty-first aspect of the present invention, wherein the flash detection unit detects a difference (Ave(i,j)–RAve) between a block average value Ave(i,j), which is an average value of pixel values of pixels constituting the block at the arbitrary position (i,j) in the unit image, and a block average value RAve of, among blocks that are neighboring to the same position (i,j) in the unit image one unit image earlier, a block whose block average value is closest to the block average value Ave(i,j). The flash detection unit acquires the number of blocks Num for which the detected difference (Ave(i,j)–RAve) is greater than or equal to a predetermined value. Then, the flash detection unit detects whether the imaging signal has been influenced by a flash by determining whether the number of blocks Num exists a predetermined number of times or more in a predetermined area of the unit image.

Accordingly, with this imaging device, it is possible to reliably detect whether an external flash was emitted without performing processing such as motion detection, and without, for example, mistakenly determining "external flash" with respect to a moving high-luminance subject.

A thirty-third aspect of the present invention is the thirty-first or thirty-second aspect of the present invention, wherein the flash detection unit uses, as each of the block average values, a value obtained by bit-shifting the sum of the values of the pixels of the block.

This enables obtaining a block average value through bit-shifting.

Advantageous Effects

The present invention enables achieving an imaging device, an external flash detection method, a program, and an integrated circuit that can reliably determine whether an imaging signal has been influenced by an external flash emitted at an arbitrary time without inviting an increase in the circuit scale.

The present invention also enables achieving an imaging device, an external flash detection method, a program, and an integrated circuit that can perform flash presence detection with respect to an unnatural image including a bright horizontal band due to an external flash and with respect to a moving high-luminance subject with a small circuit scale and few erroneous operations.

DESCRIPTION OF EMBODIMENTS

The following describes an embodiment with reference to FIGS. 1 to 5.

First Embodiment

<1.1: Configuration of Imaging Device>

Figure 1:
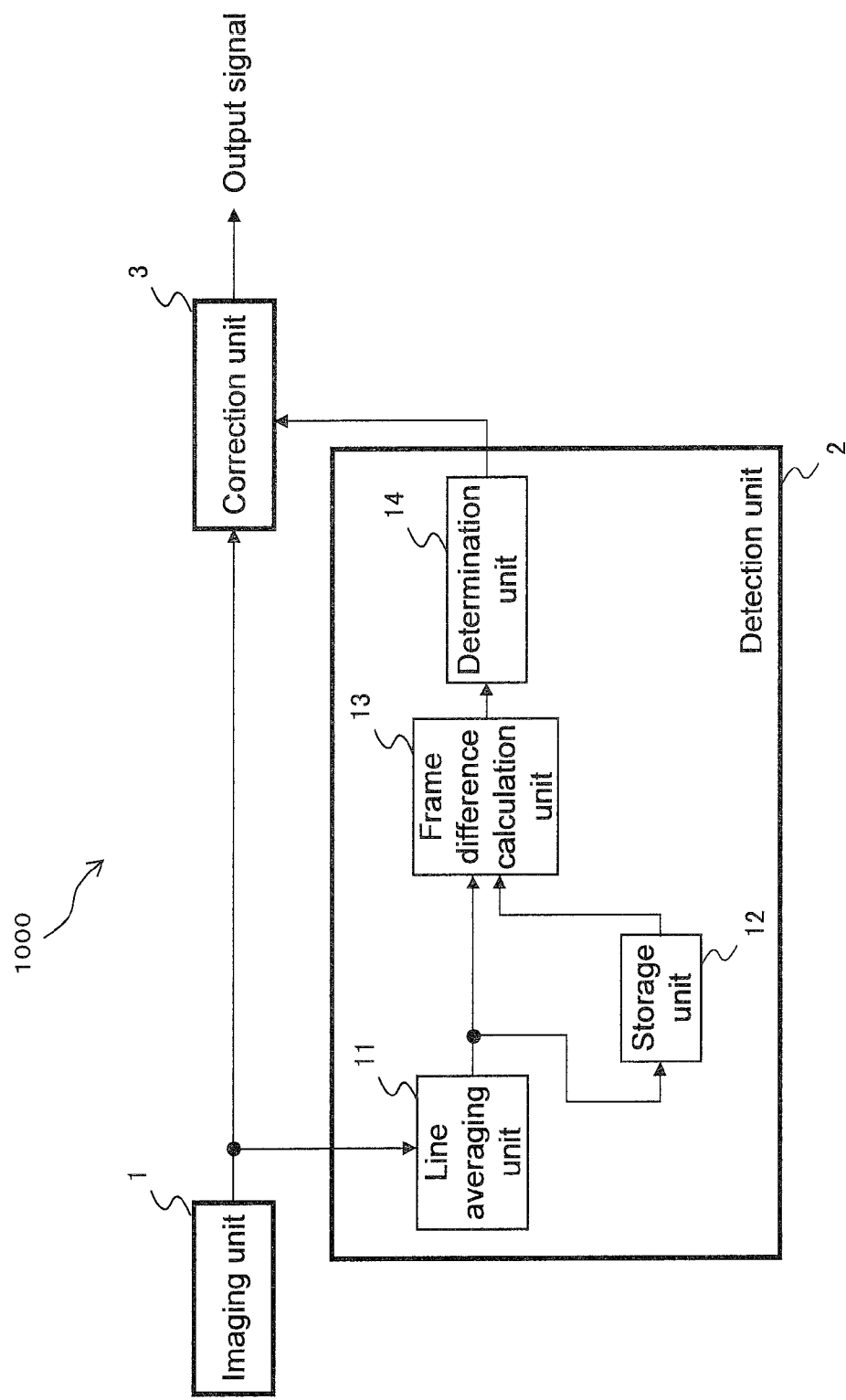
FIG. 1 is a block diagram showing the configuration of an imaging device according to a first embodiment.

FIG. 1 is a diagram showing the schematic configuration of an imaging device 1000 of the first embodiment.

As shown in FIG. 1, the imaging device 1000 includes an imaging unit 1, a detection unit 2, and a correction unit 3.

The imaging unit 1 is constituted including an imaging element such as a CMOS image sensor, and the imaging unit 1 acquires an imaging signal (video signal) by capturing images of a subject, and outputs the acquired imaging signal (video signal) to the detection unit 2 and the correction unit 3. Note that captured images (frame images) are formed by the imaging signal. The captured video can then be displayed by a display device by causing the display device to display a plurality of frame images.

As shown in FIG. 1, the detection unit 2 includes a line averaging unit 11 (line luminance information calculation unit), a storage unit 12, a frame difference calculation unit 13, and a determination unit 14. The detection unit 2 receives an input of the imaging signal (video signal) output from the imaging unit 1, and determines based on the imaging signal whether a captured image (frame image) has been influenced by an external flash. The detection unit 2 then outputs a signal indicating the determination result to the correction unit 3.

The line averaging unit 11 receives an input of the imaging signal (video signal) from the imaging unit 1, and calculates an average value (line average value) for each line in the input imaging signal (video signal). The line averaging unit 11 then sequentially outputs the calculated line average values (signals indicating them) to the storage unit 12 and the frame difference calculation unit 13.

The storage unit 12 receives an input of the line average values (signals indicating them) output from the line averaging unit 11, and stores the line average values corresponding to one screen (one screen (frame image) formed by the imaging signal (video signal)). Then storage unit 12 then supplies (outputs) the stored line average values to the frame difference calculation unit 13 after one frame period.

The frame difference calculation unit 13 receives an input of line average values Ave(k,N) (k being the line number, and N being the frame number) (signals indicating them) output from the line averaging unit 11, and line average values Ave(k,(N−1) (k being the line number, and N being the frame number) (signals indicating them) output from the storage unit 12. The frame difference calculation unit 13 calculates a difference by subtracting the line average value of the frame one frame earlier from the current line average value. Specifically, the following is used to acquire a difference Diff(k, N) (the difference between the line average value of the k-th line in the current frame and the frame one frame earlier).

$$Diff(k,N)=Ave(k,N)-Ave(k,(N-1))$$

The frame difference calculation unit 13 then outputs the acquired differences (frame differences with respect to line average value) (signals indicating them) to the determination unit 14.

The determination unit 14 receives an input of the differences (frame differences with respect to line average value) (signals indicating them) output from the frame difference calculation unit 13, and determines whether the influence of an external flash is present based on the differences (frame differences with respect to line average value). The determination unit 14 then outputs a signal indicating the determination result to the correction unit 3. Note that the determination unit 14 has a function for storing, for example, information regarding the period for which the influence of an external flash is present (e.g., the start line number and the end line number of the lines determined to have been influence by an external flash, and the frame number of the frame determined to have been influenced by an external flash). Also, in order to determine whether the influence of an external flash is present, the determination unit 14 has a function for setting a threshold value for comparison with line average difference values.

The correction unit 3 receives an input of the imaging signal (video signal) output from the imaging unit 1 and the signal output from the detection unit 2 that indicates the information regarding whether the influence of an external flash is present, and performs correction processing (e.g., processing for eliminating the influence of an external flash) on the imaging signal (video signal) based on the information regarding whether the influence of an external flash is present.

<1.2: Operations of Imaging Device>

The following describes operations performed by the imaging device 1000 constituted as described above.

An imaging signal acquired by the imaging unit 1 by capturing images of a subject is output to the detection unit 2 and the correction unit 3. The imaging unit 1 includes a CMOS imaging element, and performs charge accumulation, readout, and output as an imaging signal on a line-by-line basis.

Note that in the present embodiment, first a description will be given of the case where an electronic shutter is not used, that is to say, the exposure time (signal charge accumulation time) per frame of the imaging unit 1 is substantially the same as the signal readout cycle (one frame period), which is determined by the imaging frame rate. For example, if the imaging frame rate is 60 frames/sec, one frame period, the signal readout cycle, and the exposure time are ⅟60 sec.

The detection unit 2 determines whether an image in the imaging signal (video signal) output from the imaging unit 1 (an image formed by the imaging signal) has been influenced by an external flash, and outputs determination information to the correction unit 3.

In accordance with the determination information from the detection unit 2, the correction unit 3 executes processing such as image correction and manipulation on the video signal from the imaging unit 1. The video signal that was processed by the correction unit 3 is then output to a later-stage function unit (not shown) of the correction unit 3.

The following are conceivable examples of the correction processing performed by the correction unit 3.

(1) Correction processing for eliminating the influence of an external flash, in which the correction unit 3 obtains an output signal by replacing the imaging signal of a frame influenced by an external flash with the imaging signal of the immediately previous frame that not was not influenced by an external flash.

(2) Correction processing for eliminating the influence of an external flash, in which the correction unit 3 obtains an output signal by replacing an imaging signal that was influenced by an external flash with a specified imaging signal that has been determined in advance (e.g., an imaging signal in which all of the pixels have a specified pixel value (e.g., the pixel value corresponding to black or white)).

(1.2.1: Operations of Detection Unit 2)

Next is a more detailed description of operations performed by the detection unit 2.

The line averaging unit 11 calculates an average value (line average value) Ave(k,N) (k being the line number, and N being the frame number) for each line in the input video signal, and sequentially outputs the calculated line average values to the storage unit 12 and the frame difference calculation unit 13.

The storage unit 12 stores the line average values Ave(k,N) corresponding to one screen, and supplies the stored line average values to the frame difference calculation unit 13 after one frame period.

The frame difference calculation unit 13 receives an input of the line average values Ave(k,N) of the current screen and the line average values Ave(k,N−1) of the screen of the frame one frame earlier, and calculates the differences Diff(k,N) therebetween using the following.

$$Diff(k,N)=Ave(k,N)-Ave(k,N-1)$$

The frame difference calculation unit 13 then supplies (outputs) the calculated line average value differences Diff(k,N) to the determination unit 14.

The determination unit 14 determines whether an external flash was emitted (the influence of an external flash is present) based on the differences Diff(k,N), and supplies (outputs) the determination result to the correction unit 3 as determination information.

Figure 2:
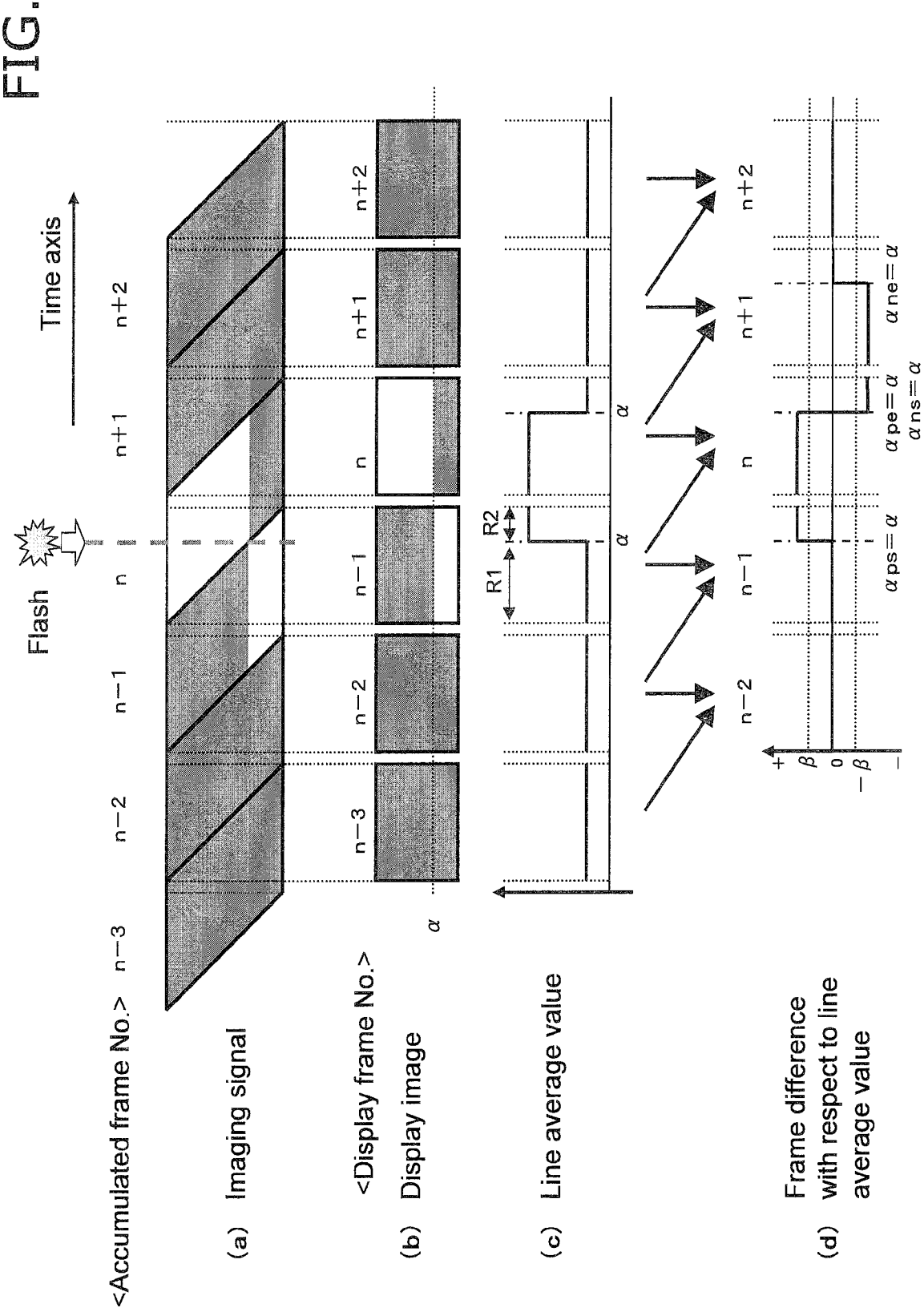
FIG. 2 is a diagram showing an external flash detection operation performed by the imaging device according to the first embodiment.

Next is a description of operations performed by the imaging device 1000 in the case shown in FIG. 2.

FIG. 2 is a diagram showing how an imaging signal and a display image are influenced in the imaging device 1000 of the present embodiment when an external flash such as a still camera flash has been emitted.

Figure 35:
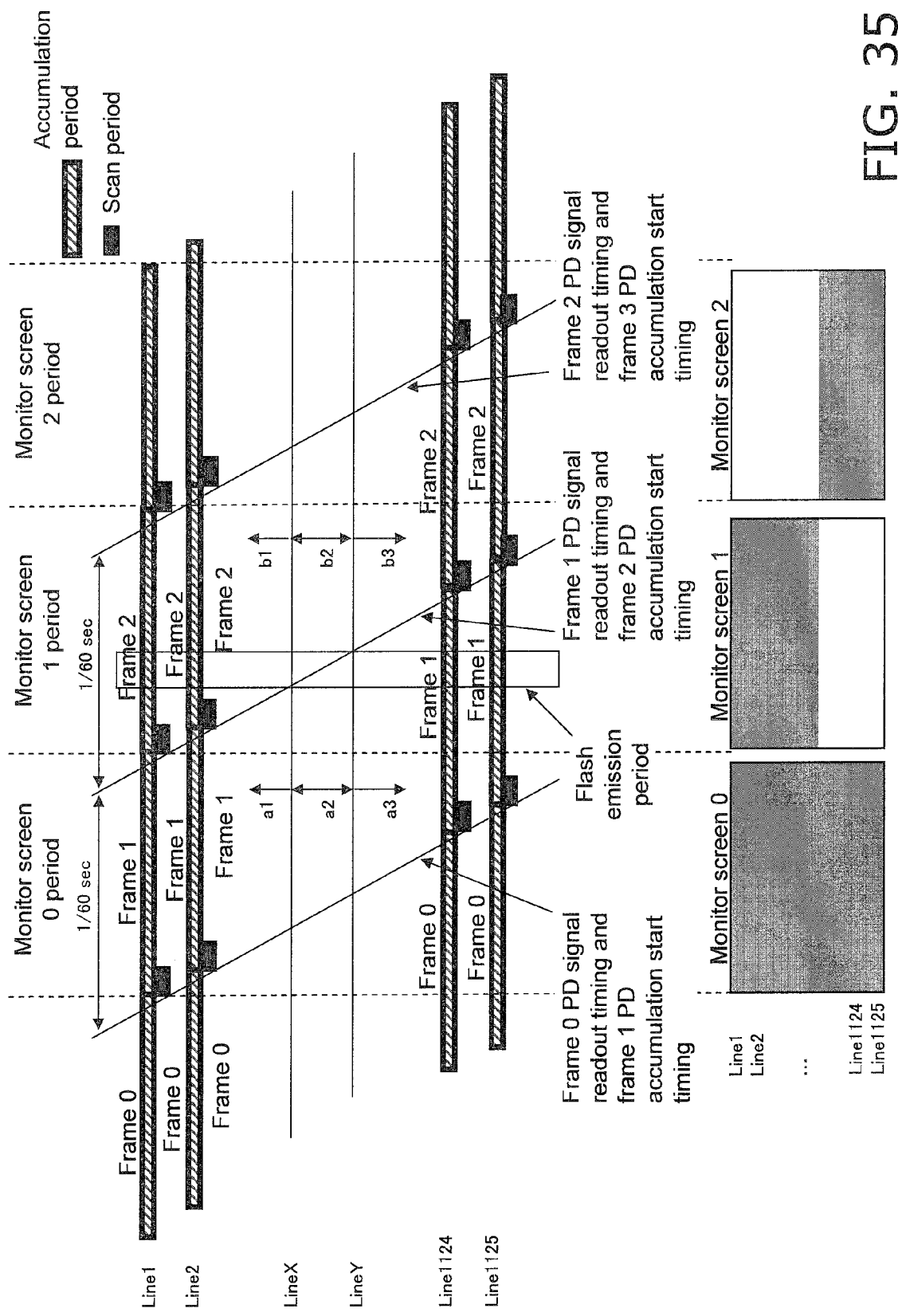
FIG. 35 is a diagram illustrating the principle according to which white band-shaped artifacts appear due to an external flash in an imaging device that uses a CMOS image sensor.

Similarly to FIG. 35 showing conventional technology, FIG. 2(*a*) illustrates the charge accumulation period (exposure period), readout timing, and scan period in the imaging unit 1. The charge accumulation period and the scan period for reading out such charge for each scan line constituting a screen are shown with the horizontal axis indicating the time axis. Also, in FIG. 2(*b*), the imaging signal output from the imaging unit 1 is shown as screens of respective frames.

Here, if an external flash has been emitted while the imaging unit 1 is reading out the imaging signal of the n−1-th frame from the imaging element, as shown in FIG. 2(*b*), the imaging signal that is output from the imaging unit 1 has a white band-shaped artifact in the lower portion (below the line α) of the image of the n−1-th frame and in the upper portion (above the line α) of the image of the n-th frame.

Here, FIG. 2(*c*) illustrates line average values that are the output from the line averaging unit 11, with the horizontal axis indicating the time axis. Note that the image of each frame is read out from the top of the screen to the bottom. For this reason, in FIG. 2(*c*), the line average value for the top portion of the screen is on the left side, and the line average value for the bottom portion of the screen is on the right side. For example, the line average values in the range indicated by R1 in FIG. 2(*c*) are the line average values corresponding to the top portion of the n−1-th frame (portion not influenced by an external flash), and the line average values in the range indicated by R2 in FIG. 2(*c*) are the line average values corresponding to the bottom portion of the n−1-th frame (portion influenced by an external flash).

These line average values are supplied to the storage unit 12 and then output to the frame difference calculation unit 13 after a delay of one frame. The frame difference calculation unit 13 calculates a difference by subtracting a line average value Ave(k,(N−1)) of the frame one frame earlier from the current line average value Ave(k,N). For example, the difference value Diff(k,n) for the k-th line of the n-th frame is calculated as follows.

$$\text{Diff}(k,n) = \text{Ave}(k,n) - \text{Ave}(k,n-1)$$

FIG. 2(d) shows the frame differences with respect to line average value that are calculated in this way.

(Case where current frame is n−2-th frame):

Here, for example, when the imaging signal of the n−2-th frame has been input to the detection unit 2, the differences between the line average values of the n−2-th frame and the n−3-th frame are calculated. Here, since neither of the frames have been influenced by an external flash, the absolute values of the frame differences therebetween are not very large, and furthermore are values less than a threshold value $\beta(\beta>0)$ that has been set in advance.

(Case where current frame is n−1-th frame):

Here, for example, when the imaging signal of the n−1-th frame has been input to the detection unit 2, the differences between the line average values of the n−1-th frame and the n−2-th frame are calculated. Here, the line average values are high in the portion below the line $\alpha$ in the n−1th frame due to an external flash, and therefore the absolute values of the frame differences are values that exceed the threshold value $\beta$ in the lower portion of the screen. The determination unit 14 stores information indicating that the n−1-th frame is the frame at the start of the period for which the line average value difference exceeds the threshold value $\beta$, and that the line $\alpha$ is the line $\alpha$ps.

(Case where current frame is n-th frame):

Next, when the imaging signal of the n-th frame has been input to the detection unit 2, the differences between the line average values of the n-th frame and the n−1-th frame are calculated. Here, due to the influence of an external flash, the line average values are high in the lower portion in the n−1-th frame, and the line average values are high in the upper portion in the n-th frame. Accordingly, the frame difference values of these frames exceed the threshold value $\beta$ in the portion above the line $\alpha$, and are lower than the threshold value $-\beta$ in the portion below the line $\alpha$. The determination unit 14 stores information indicating that the n-th frame is the frame at the end of the period for which the line average value difference exceeds the threshold value $\beta$, and that the line $\alpha$ is the line $\alpha$pe. Note that likewise, the n-th frame is the frame at the start of the period for which the frame difference value is less than the threshold value $-\beta$, and the line $\alpha$ is the line $\alpha$ns.

(Case where current frame is n+1-th frame):

Here, when the imaging signal of the n+1-th frame has been input to the detection unit 2, the differences between the line average values of the n+1-th frame and the n-th frame are calculated. Here, since the line average values are high in the upper portion in the n-th frame due to the influence of an external flash, the frame difference values are less than the threshold value $-\beta$ in the upper portion of the screen, and the absolute values thereof are less than the threshold value $\beta$ in the bottom portion of the screen. Here, n+1-th frame is the frame at the end of the period for which the frame difference value is less than the threshold value $-\beta$, and the line $\alpha$ is the line $\alpha$ne.

Here, as clearly shown in FIG. 2(d), due to the emission of an external flash, the state in which the frame difference value exceeds the threshold value $\beta$ is continuous for substantially one frame period, from the line $\alpha$ of the n−1-th frame to the line $\alpha$ of the n-th frame.

The determination unit 14 detects that an external flash has been emitted if the number of lines from $\alpha$ps of the n−1-th frame to $\alpha$pe of the n-th frame is substantially the same as one frame period, and supplies the detection result to the correction unit 3. Specifically, if (1) the frame at the start of the period for which the line average value difference exceeds the threshold value $\beta$ and the frame at the end of the period for which the line average value difference exceeds the threshold value $\beta$ are successive, and furthermore (2) $\alpha$ps=$\alpha$pe, the determination unit 14 detects that the appearance of an artifact due to an external flash started at the former one of these two successive frames (in FIG. 2, the former frame corresponds to the n−1-th frame).

Note that it is preferable that "substantially one frame period" is an arbitrary period in the range of within ±10% of one frame period (i.e., 0.9 to 1.1 frame period). Causes for this period being different from one frame period include the fact that the emission time of a real flash (external flash) has a certain time duration instead of being instantaneous, and the fact that an ineffective charge accumulation period occurs due to structural limitations of the CMOS image sensor.

Also, the $\alpha$ps=$\alpha$pe determination processing performed by the determination unit 14 may be determination processing in which an allowable range including somewhat of a margin of error is set. For example, the determination unit 14 may determine that the above-described condition (2) is satisfied if $0.9\,\alpha\text{pe} < \alpha\text{ps} < 1.1\alpha\text{pe}$.

Also, placing focus on the state in which the frame difference value is less than the threshold value $-\beta$, this state is continuous for substantially one frame period, from the line $\alpha$ of the n-th frame to the line $\alpha$ of the n+1-th frame.

The determination unit 14 detects that the external flash has disappeared if the number of lines from $\alpha$ns to $\alpha$ne is the same as substantially one frame period, and supplies the determination result to the correction unit 3. Specifically, if (1) the frame at the start of the period for which the line average value difference is less than the threshold value $-\beta$ and the frame at the end of the period for which the line average value difference is less than the threshold value $-\beta$ are successive, and furthermore (2) $\alpha$ns=$\alpha$ne, the determination unit 14 detects that the appearance of an artifact due to an external flash ended at the former one of these two successive frames (in FIG. 2, the former frame corresponds to the n-th frame).

Note that it is preferable that "substantially one frame period" is an arbitrary period in the range of within ±10% of one frame period (i.e., 0.9 to 1.1 frame period). Also, the $\alpha$ns=$\alpha$ne determination processing performed by the determination unit 14 may be determination processing in which an allowable range including somewhat of a margin of error is set. For example, the determination unit 14 may determine that the above-described condition (2) is satisfied when $0.9\alpha\text{ne} < \alpha\text{ns} < 1.1\alpha\text{ne}$.

Note that since $\alpha$ps=$\alpha$ in the result of a calculation performed using the difference between the line average values of the n−1-th frame and the n−2-th frame, the determination unit 14 can determine that the bottom portion of the screen of the n−1-th frame, using the line a as the border, has been influenced by an external flash. Also, since $\alpha$ns=$\alpha$ in the result of a calculation performed using the difference between the line average values of the n-th frame and the n−1-th frame, the determination unit 14 can determine that the upper portion of the screen, using the line $\alpha$ as the border, has been influenced by an external flash. In the processing such as image correction and manipulation performed by the correction unit 3, if a border line indicating where the influence of an external flash is present and absent is necessary, these determination results from the determination unit 14 may be used.

(1.2.2: Processing on Readily Mis-Recognized Imaging Signal)

Next is a description of operations performed by the imaging device 1000 of the present embodiment, taking the example of an imaging signal that is readily mis-recognized as having an artifact due to an external flash.

Figure 3:
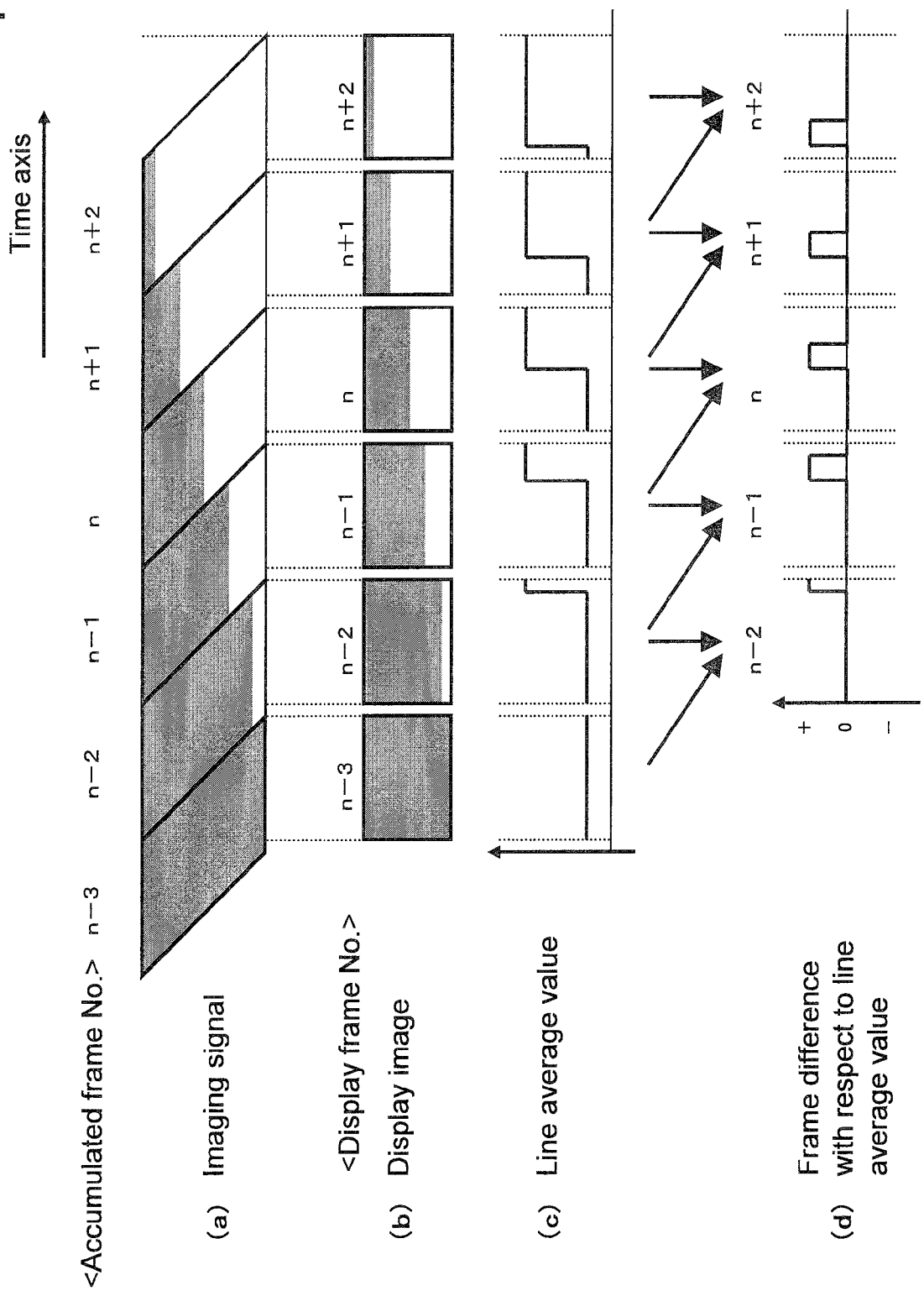
FIG. 3 is a diagram showing a detection operation performed by the imaging device according to the first embodiment with respect to a bright subject moving in the vertical direction.

FIG. 3 is a diagram showing the case where a very bright subject moves upward from the bottom portion of the screen, as an example of the case where it is readily mis-recognized that an external flash was emitted. Here, placing focus on only the n−1-th frame for example, the screen is very similar to the case where an external flash was emitted shown in FIG. 2, and the line average values are also similar to those in FIG. 3(c). However, when focus is placed on the frame difference values as shown in FIG. 3(d), the period for which the frame difference values have a high absolute value is shorter, and is not continuous for one frame period as in the case shown in FIG. 2. For this reason, as shown in FIG. 3, even if the bright subject moves in the vertical direction of the screen, the imaging device 1000 does not mistakenly determine that an external flash was emitted.

(1.2.3: Processing in Case where External Flash is Emitted Multiple Times with a Time Difference in One Frame Period)

Next is a description of operations performed by the imaging device 1000 of the present embodiment in the case where an external flash has been emitted multiple times with a time difference in one frame period.

Figure 4:
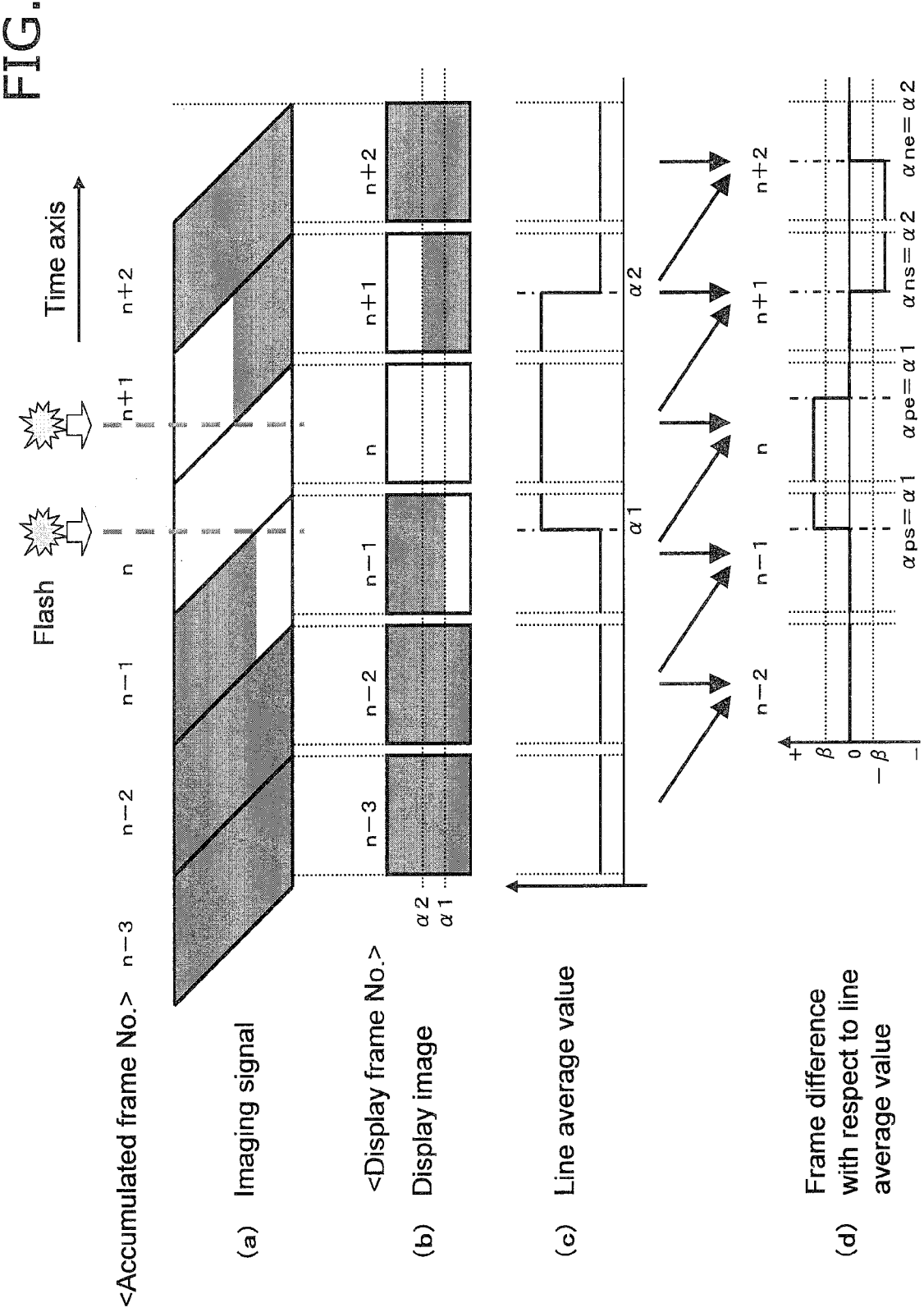
FIG. 4 is a diagram showing an operation performed by the imaging device according to the first embodiment for detecting two external flashes.

FIG. 4 shows the case where an external flash was emitted two times with a time difference in one frame period. Here, FIG. 4(a) illustrates the charge accumulation period (exposure period), readout timing, and scan period in the imaging unit, and FIG. 4(b) shows the imaging signal output from the imaging unit 1 as screens of respective frames.

Here, if an external flash is emitted while the imaging signal of the n−1-th frame is being read out, a white band-shaped artifact appears in the lower portion (below the line $\alpha 1$) of the image of the n−1-th frame.

Next, assume that a second external flash is emitted while the imaging signal of the n-th frame is being readout, as shown in FIG. 4. Then, assume that the interval between the emission of the two external flashes (the period from the time when the first external flash was emitted (the time when the $\alpha 1$-th line of the n−1-th frame is read out) to the time when the second external flash was emitted (the time when the $\alpha 2$-th line of the n-th frame is read out) is less than or equal to one frame period, as shown in FIG. 4. In this case, the influence of both external flashes on the screen overlaps, and thus the entire screen of the image of the n-th frame is influenced by the external flashes. Also, a white band-shaped artifact appears in the upper portion of the image of the n+1-th frame (above the line $\alpha 2$, assuming that $\alpha 2 < \alpha 1$).

Here, the line average values that are the output from the line averaging unit 11 are influenced by the two external flashes as shown in FIG. 4(c), and thus the period in which the line average values have a high value is greater than or equal to one frame period. The frame differences with respect to line average value that are the output from the frame difference calculation unit 13 change as shown in FIG. 4(d).

Specifically, the state in which the frame difference is a value that exceeds the threshold value $\beta$ is continuous for one frame period, from the line $\alpha 1$ of the n−1-th frame to the line $\alpha 1$ of the n-th frame.

Also, the state in which the frame difference is a value less than the threshold value $-\beta$ is continuous for one frame period, from the line $\alpha 2$ of the n+1-th frame to the line $\alpha 2$ of the n+2-th frame.

Since the line $\alpha 1$ is the line $\alpha$ps at the start of the period for which the line average value difference exceeds the threshold value $\beta$ in the n−1-th frame, and the line $\alpha 1$ is the line $\alpha$pe at the end of the period for which the line average value difference exceeds the threshold value $\beta$ in the n-th frame, the determination unit 14 detects that the artifact due to an external flash started to appear at the former one (the n−1-th frame) of these two successive frames.

Also, since the line $\alpha 2$ is the line average value $\alpha$ns at the start of the period for which the line average value difference is less than the threshold value $-\beta$ in the n+1-th frame, and the line $\alpha 2$ is the line $\alpha$ne at the end of the period for which the line average value difference is less than the threshold value $-\beta$ in the n+2-th frame, the determination unit 14 detects that the appearance of an artifact due to an external flash ended at the former one (the n+1-th frame) of these two successive frames.

Here, as clearly shown in FIGS. 4(c) and 4(d), the first line $\alpha$ps at which the line average value difference exceeded the threshold value $\beta$ is the start line of the period for which the artifact appears due to an external flash, and the first line $\alpha$ns at which the line average value difference exceeded the threshold value $-\beta$ is the end line. In other words, the determination unit 14 can determine the period for which an artifact appears due to an external flash, based on the time duration from $\alpha$ps to $\alpha$ns.

As described above, even in the case where two external flashes have been emitted, the state in which the frame difference value exceeds the threshold value $\beta$ is continuous for substantially one frame period, from the line $\alpha 1$ of the n−1-th frame to the line $\alpha 1$ of the n-th frame, and therefore the determination unit 14 can detect that the appearance of an artifact due to an external flash started in the n−1-th frame. Also, since the state in which the frame difference value is less than the threshold value $-\beta$ is continuous for substantially one frame period, from the line $\alpha 2$ of the n+1-th frame to the line $\alpha 2$ of the n+2-th frame, the determination unit 14 can detect that the appearance of an artifact due to an external flash ended in the n+1-th frame.

Note that since $\alpha ps = \alpha 1$ in the result of the calculation performed using the difference between the line average values of the n−1-th frame and the n−2-th frame, the determination unit 14 determines that the bottom portion of the screen of the n−1-th frame, using the line $\alpha 1$ as the border, has been influenced by an external flash. Also, since $\alpha ns = \alpha 2$ in the result of the calculation performed using the difference between the line average values of the n+1-th frame and the n-th frame, the determination unit 14 determines that the upper portion of the screen in the n+1-th frame, using the line $\alpha 2$ as the border, has been influenced by an external flash. Also, the determination unit 14 determines that the entire screen has been influenced by an external flash in the n-th frame, which is surrounded by the n−1-th frame in which the influence of an external flash started and the n+1-th frame in which the influence of an external flash disappeared (ended).

In the processing such as image correction and manipulation performed by the correction unit 3, if a border line indicating where the influence of an external flash is present and absent is necessary, these determination results from the determination unit 14 may be used in the imaging device 1000.

(1.2.4: Processing in Case of Using Electronic Shutter)

Next is a description of operations performed by the imaging device 1000 in the case of using an electronic shutter.

Normally, with an imaging device, the accumulation time for signal charge in pixels of the imaging element, that is to say, the shutter time, is the same as the readout cycle when reading out signals (accumulated charge) from the pixels of the imaging element. However, with an imaging device that uses a solid-state imaging element such as a CMOS image sensor, the signal charge accumulation time can be changed using technology called an electronic shutter. With an imaging device using an electronic shutter, temporarily discarding the charge accumulated in a photodiode enables acquiring a signal in a charge accumulation time that is shorter than the signal readout cycle (e.g., the scan cycle of a TV system), which is determined by the imaging frame rate.

Figure 5:
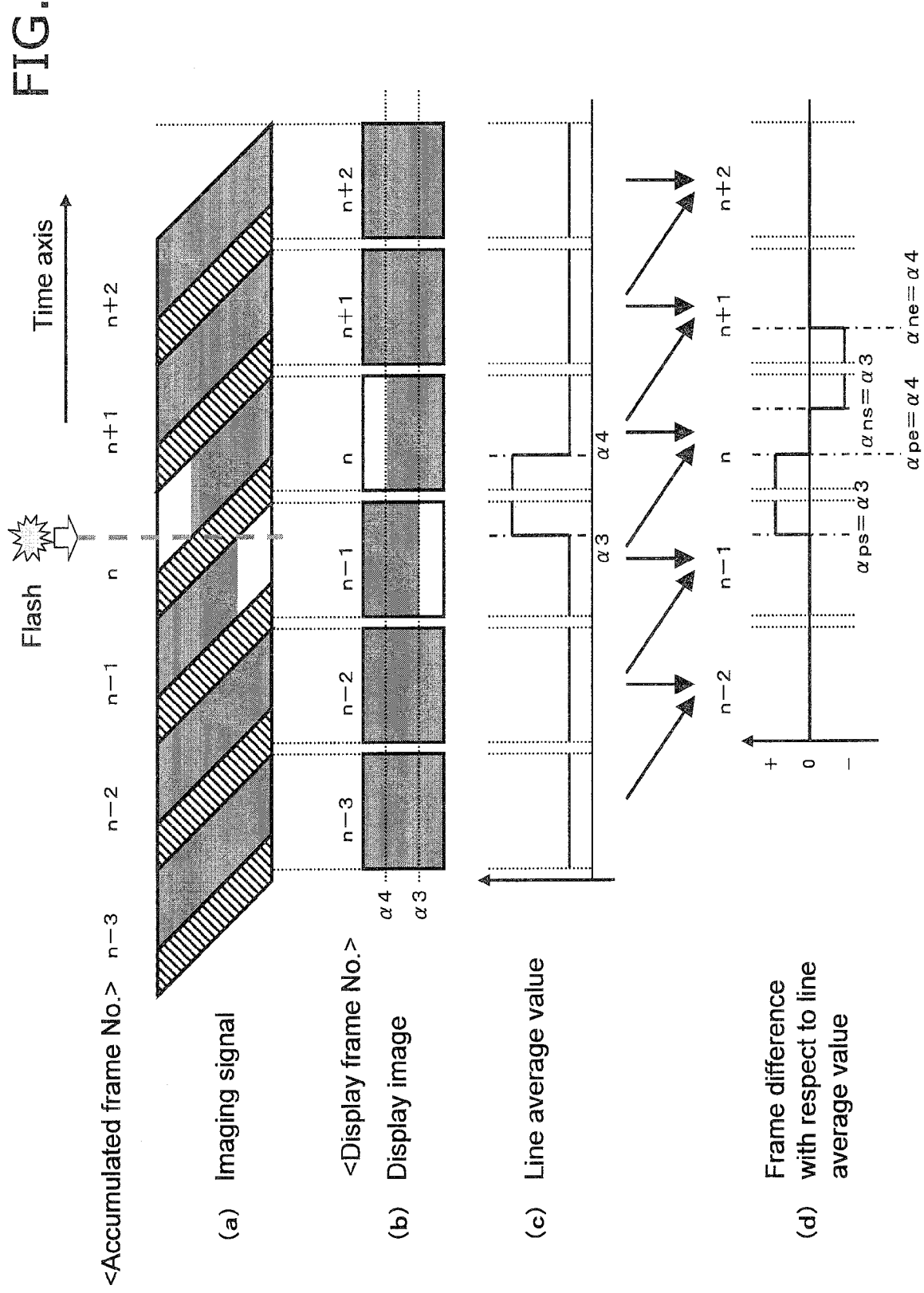
FIG. 5 is a diagram showing the external flash detection operation in an electronic shutter operation performed by the imaging device according to the first embodiment.

FIG. 5 is a diagram showing the influence of an external flash on an imaging signal and a display image when imaging is performed using an electronic shutter in the imaging device 1000. Similarly to FIG. 2, FIG. 5(a) is a diagram illustrating the charge accumulation period (exposure period), readout timing, and scan period in the imaging unit 1. The charge accumulation period and the scan period for reading out such charge for each scan line constituting a screen are shown with the horizontal axis indicating the time axis. Also, in FIG. 5(b), the imaging signal output from the imaging unit 1 is shown as screens of respective frames.

In FIG. 5(a), the portions indicated with hatching are portions corresponding to signal charge that has been discarded by the electronic shutter operation. In FIG. 5(b), the imaging signal output from the imaging unit 1 is shown as screens of respective frames. As shown in FIG. 5(b), a white band-shaped artifact appears in the lower portion (below the line α3) of the image of the n−1-th frame, and in the upper portion (above the line α4) of the image of the n-th frame. If a charge that has been influenced by an external flash is in the hatched portions, it is discarded and thus has no influence on the imaging signal, and therefore the area of the white band-shaped artifact in the upper portion of the image of the n-th frame is smaller than that in the case where an electronic shutter is not used as shown in FIG. 2(b). Specifically, the number of lines that have an artifact due to an external flash decreases according to the proportion of the charge accumulation time to the signal readout cycle.

Letting Tr be the signal readout cycle in the imaging unit 1, and La be the total number of lines in the frame image formed by the imaging signal, if Ts represents the charge accumulation time, the number of lines L that have an artifact due to an external flash is expressed as follows.

$$L = Ts \times La/Tr \qquad (1)$$

Here, compared to FIG. 2(c), the period for which the line average values that are the output of the line averaging unit 11 shown in FIG. 5(c) exceed the threshold value β is shorter than one frame period, in accordance with the electronic shutter period. Also, the frame differences with respect to line average value that are the output from the frame difference calculation unit 13 change as shown in FIG. 5(d).

Here, as is clearly shown in FIG. 5(d), the state in which the frame difference values are a positive number with a high absolute value due to the emission of an external flash is continuous for a period shorter than one frame period. Here, as shown in FIG. 5, the number of lines L that have an artifact due to an external flash is obtained as shown below when the line αps and the line αpe are in different frames that are adjacent.

$$L = La + \alpha pe - \alpha ps \qquad (2)$$

Accordingly, Expression (1) and Expression (2) give the following.

$$La + \alpha pe - \alpha ps = Ts \times La/Tr \qquad (3)$$

Also, the following expression is obtained when the line αps and the line αpe are in the same frame.

$$L = \alpha 4 - \alpha 3 \qquad (4)$$

Accordingly, Expression (1) and Expression (4) give the following.

$$\alpha pe - \alpha ps = Ts \times La/Tr \qquad (5)$$

Accordingly, in the case shown in FIG. 5, the line α3 is the line αps at the start of the period for which the line average value difference exceeds the threshold value β in the n−1-th frame, and the line α4 is the line αpe at the end of the period for which the line average value difference exceeds the threshold value β in the n-th frame, and therefore if αps=α3 and αpe=α4 and Expression (3) is satisfied, the determination unit 14 detects that an artifact due to an external flash has started to appear at the former one (the n−1-th frame) of these two successive frames, and supplies (outputs) the determination result to the correction unit 3.

On the other hand, in the case where αps and αpe are in the same frame, if Expression (5) is satisfied, the determination unit 14 determines that an artifact due to an external flash has started to appear in that frame, and supplies (outputs) the determination result to the correction unit 3.

Note that the processing performed by the determination unit 14 to determine whether Expression (3), (5), and the like are satisfied may be processing in which an allowable range (e.g., an allowable range including a margin of error of approximately ±10% of the value targeted for determination) is set in consideration of error (measurement error and design error), a margin for ensuring operation, and the like.

Likewise, for αns and αne as well, as shown in FIG. 5, the following expression is used if the line αns and the line αne are in different frames that are adjacent.

$$La + \alpha ne - \alpha ns = Ts \times La/Tr \qquad (6)$$

Also, the following expression is used when the line αns and the line αne are in the same frame.

$$\alpha ne - \alpha ns = Ts \times La/Tr \qquad (7)$$

Accordingly, in the case shown in FIG. 5, the line α3 is the line αns at the start of the period for which the line average value difference is less than the threshold value −β in the n-th frame, and the line α4 is the line αne at the end of the period for which the line average value difference is less than the threshold value −β in the n+1-th frame, and therefore if αns=α3 and αne=α4 and Expression (6) is satisfied, the determination unit 14 detects that the appearance of an artifact due to an external flash has ended in the frame including the line αpe (the n-th frame), and supplies (outputs) the determination result to the correction unit 3.

On the other hand, in the case where αns and αne are in the same frame, if Expression (7) is satisfied, the determination unit 14 determines that the appearance of an artifact due to an external flash has ended in that frame, and supplies (outputs) the determination result to the correction unit 3.

Note that the processing performed by the determination unit 14 to determine whether Expression (6), (7), and the like are satisfied is processing in which an allowable range (e.g., an allowable range including a margin of error of approximately ±10% of the value targeted for determination) is set in consideration of error (measurement error and design error), a margin for ensuring operation, and the like.

Also, in the case where an electronic shutter is not used in the imaging device 1000, the determination method described above can be applied as is by setting Ts=Tr in the various expressions in the above description of the case of using an electronic shutter.

As described above, according to the present embodiment, by detecting the fact that frame difference values with respect to line average value continuously have a high absolute value for one frame period, it is possible to determine whether the influence of an external flash is present without mistakenly recognizing the movement of a bright subject or the like as the influence of an external flash.

Second Embodiment

Next is a description of a second embodiment with reference to FIGS. 6 to 15.

<2.1: Configuration of Imaging Device>

Figure 6:
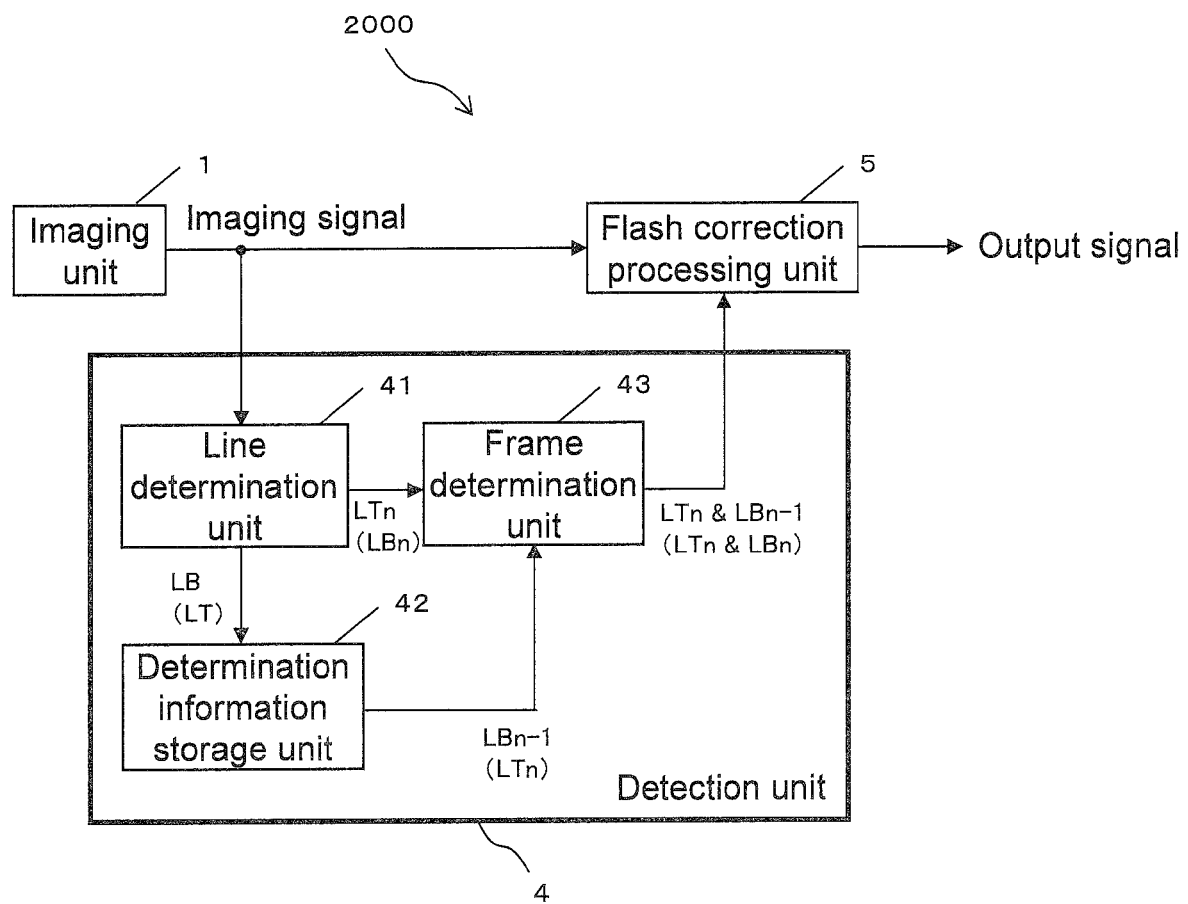
FIG. 6 is a diagram illustrating the schematic configuration of an imaging device according to a second embodiment.

FIG. 6 is a diagram showing the schematic configuration of an imaging device 2000 of the second embodiment.

As shown in FIG. 6, the imaging device 2000 includes an imaging unit 1, a detection unit 4, and a flash correction processing unit 5.

The imaging unit 1 is constituted including an imaging element such as a CMOS image sensor, and the imaging unit 1 acquires an imaging signal (video signal) by capturing images of a subject, and outputs the acquired imaging signal (video signal) to the detection unit 4 and the flash correction processing unit 5. Note that in the present embodiment, it is assumed that the exposure time per frame of the imaging unit 1 is substantially the same as one frame period, which is determined by the imaging frame rate. For example, if the imaging frame rate is 60 frames/sec, one frame period and the exposure time are 1/60 sec.

The detection unit 4 receives an input of the imaging signal (video signal) output from the imaging unit 1, and determines based on the imaging signal whether a captured image (frame image) has been influenced by an external flash. The detection unit 4 then outputs a signal indicating the determination result to the flash correction processing unit 5. As shown in FIG. 6, the detection unit 4 includes a line determination unit 41, a determination information storage unit 42, and a frame determination unit 43.

The line determination unit 41 receives an input of the imaging signal output from the imaging unit 1. The line determination unit 41 monitors the top line and bottom line of the imaging signal in each frame, determines whether the influence of an external flash is present in each of the lines (the top line and the bottom line of each frame), outputs top line determination information to the frame determination unit 43, and outputs bottom line determination information to the determination information storage unit 42.

The determination information storage unit 42 stores the bottom line determination information output from the line determination unit 41. It is assumed that the determination information storage unit 42 can store at least bottom line determination information corresponding to one successive past frame. Specifically, in the case where the current frame (frame targeted for processing) is the N-th frame, it is assumed that the determination information storage unit 42 can store at least the bottom line determination information of the (N−1)-th frame. The determination information storage unit 42 outputs the stored bottom line determination information of the frame one frame earlier to the frame determination unit 43.

If the bottom line determination information of the frame one frame earlier that is stored in the determination information storage unit 42 indicates that the influence of an external flash is present, and furthermore the top line determination information of the current frame that has been output from the line determination unit 41 indicates that the influence of an external flash is present, the frame determination unit 43 determines that the influence of an external flash is present in the imaging signal of the frame one frame earlier and the imaging signal of the current frame. The frame determination unit 43 then outputs frame determination information indicating the determination result to the flash correction processing unit 5.

The flash correction processing unit 5 receives an input of the imaging signal output from the imaging unit 1 and the frame determination information output from the frame determination unit 43. Based on the frame determination information output from the frame determination unit 43, if necessary, the flash correction processing unit 5 subjects the imaging signal to processing for eliminating or suppressing the influence of an external flash, and outputs the resulting imaging signal as an output signal. The flash correction processing unit 5 includes a delay unit (not shown) for temporarily storing the input imaging signal and delaying it by one frame period. The imaging signal corresponding to each line of the frame image formed by the input imaging signal is delayed by one frame period, and thereafter the imaging signal that has been delayed by one frame period is output after, if necessary, being subjected to correction processing. Note that it is assumed that the delay unit included in the flash correction processing unit 5 has a capacity capable of storing at least imaging signals corresponding to one frame plus one line (1V+1H).

According to this configuration, the flash correction processing unit 5 can perform correction processing for eliminating the influence of an external flash using the methods described below, for example.

(1) A method of replacement using an image in which the entire screen is influenced by an external flash, which has been generated by adding the image of the frame one frame earlier in which a white band appears in the lower portion of the screen and the image of the current frame in which a white band appears in the upper portion of the screen.

(2) A method of replacement using the most recent image not influenced by an external flash that was stored in the delay unit.

Figure 36:
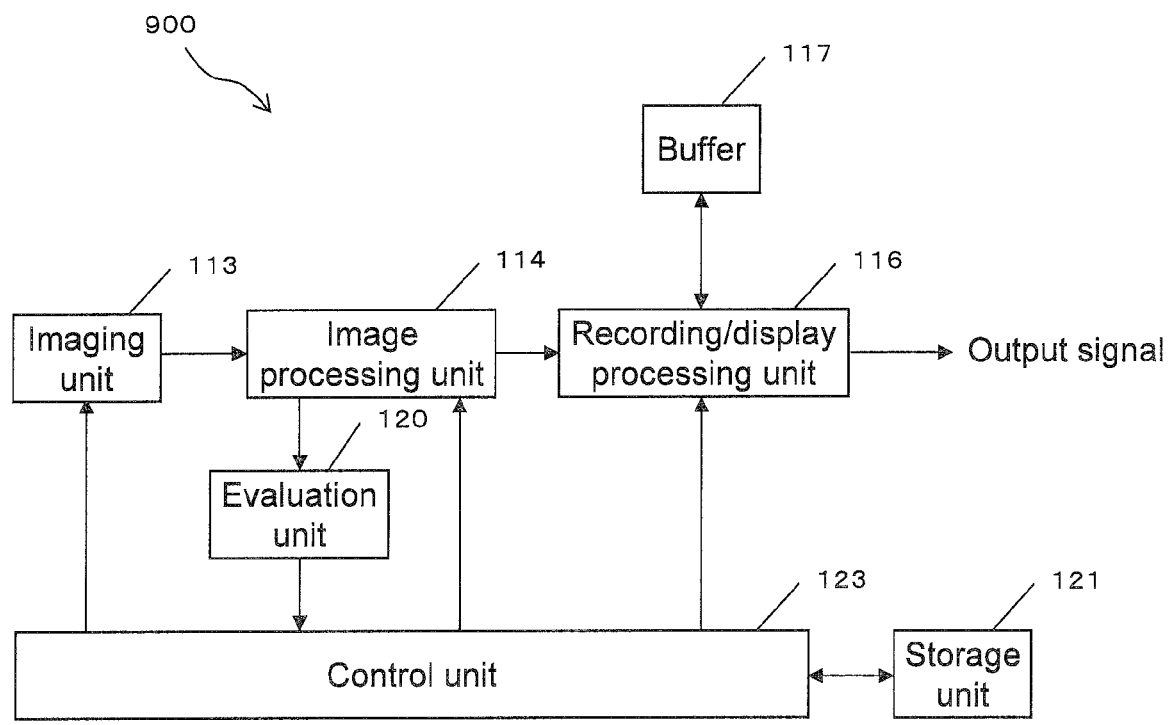
FIG. 36 is a diagram illustrating the schematic configuration of a conventional imaging device.
Figure 37:
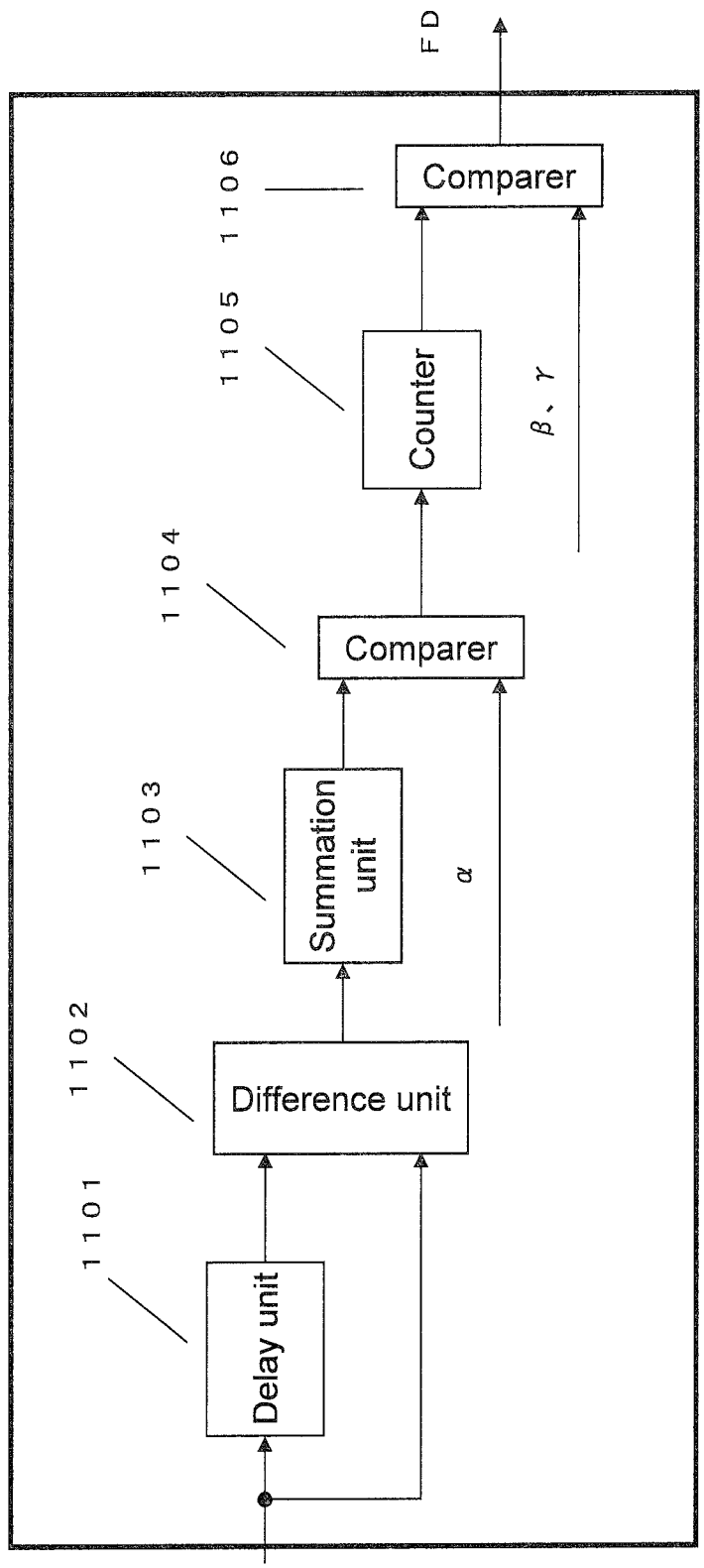
FIG. 37 is a schematic configuration diagram of a conventional flash detection unit.

Note that in the imaging device 2000, the influence of an external flash is detected at the time of the input of the top line of the frame after the frame in which the influence of the external flash started, and since an artifact due to an external flash is subsequently corrected from the top line of the frame one frame earlier, the flash correction processing unit 5 has been described as being configured including the delay unit corresponding to one frame plus one line (1V+1H). However, there is no limitation to this, and for example, in the case where the imaging device 2000 includes signal processing (not shown) other than flash correction processing between the imaging unit 1 and the flash correction processing unit 5 (e.g., the various types of image processing performed by the image processing unit 114 of the conventional imaging device shown in FIG. 36, as well as inter-frame noise reduction processing, video frame rate conversion processing, and video format conversion processing), the video signal may be delayed by such signal processing. For this reason, it is conceivable that the imaging device 2000 does not need the delay unit for flash correction processing, or that the need for a delay unit to be provided in the flash correction processing unit 5 is eliminated due to a delay unit being shared with the aforementioned signal processing unit.

For example, in the imaging device 2000, in the case where a frame influenced by an external flash is corrected by being replaced with a blown-out highlight frame or black frame, there is no need to store the original image, and therefore if delaying corresponding to that described above is performed using, for example, the signal processing other than the aforementioned flash correction processing, a frame memory dedicated to flash correction is unnecessary. Also, since it is often the case that a frame memory is provided for storing the frame one frame earlier in inter-frame noise reduction processing and the like, this frame memory can be shared in the imaging device 2000 to enable the flash correction processing unit 5 to perform correction processing as described above.

<2.2: Operations of Imaging Device>

The following describes operations of the imaging device 2000 constituted as described above.

An imaging signal acquired by the imaging unit 1 by capturing images of a subject is output to the detection unit 4 and the flash correction processing unit 5. The imaging unit 1 includes a CMOS image sensor, and performs charge accumulation, readout, and output as an imaging signal on a line-by-line basis.

The imaging signal output from the imaging unit 1 is input to the line determination unit 41 of the detection unit 4.

(2.2.1: Processing for Determining Regarding Artifact Due to External Flash in Line Determination Unit 41)

The following describes details of the processing performed by the line determination unit 41 for determining whether an artifact due to external flash has appeared.

Figure 7:
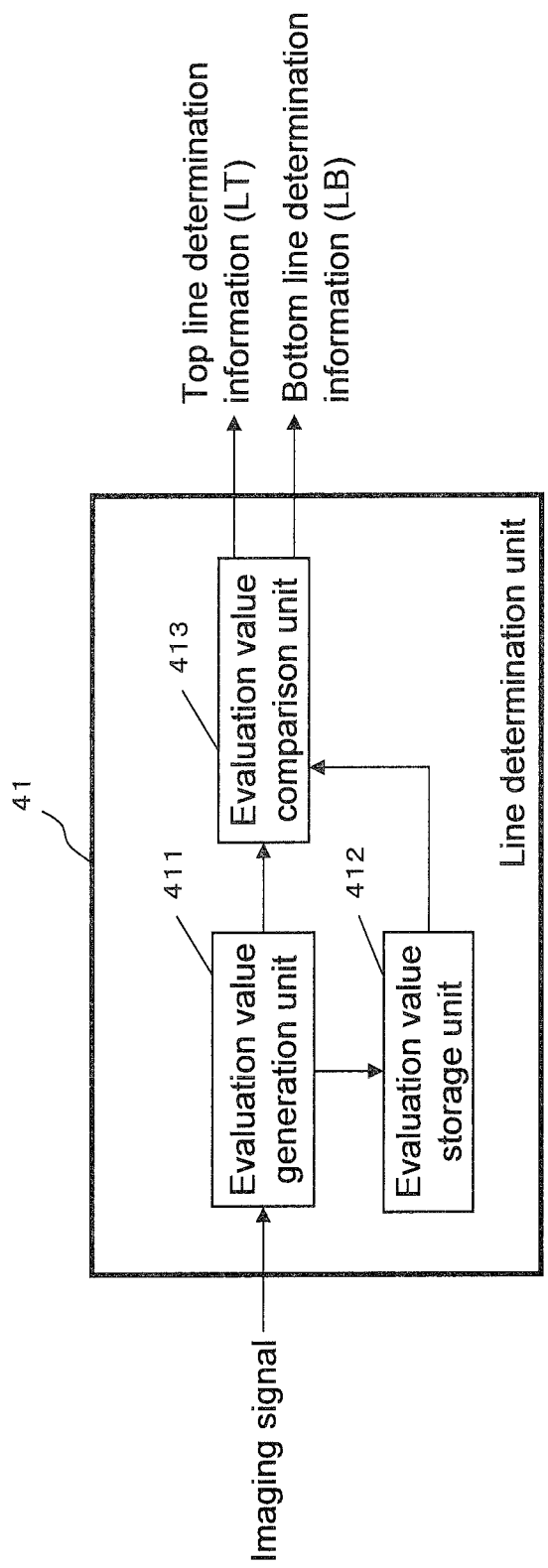
FIG. 7 is a diagram illustrating the schematic configuration of a line determination unit of the imaging device according to the second embodiment.

FIG. 7 is a diagram showing the schematic configuration of the line determination unit 41 of the imaging device 2000 shown in FIG. 6.

An evaluation value generation unit 411 generates an evaluation value for the top line and the bottom line of the frame image formed by the input imaging signal based on the luminance levels or the like of the top line and the bottom line. Here, it is assumed that the average luminance of each line is used as the evaluation value.

An evaluation value storage unit 412 temporarily stores at least one previous frame-worth of the evaluation values generated by the evaluation value generation unit 411.

An evaluation value comparison unit 413 compares the evaluation values stored in the evaluation value storage unit 412 and the current evaluation values generated by the evaluation value generation unit 411, determines whether the influence of an external flash is present in the top line and the bottom line, and outputs the determination results to the frame determination unit 43 as top line determination information and bottom line determination information. The top line determination information and the bottom line determination information indicate "artifact" if the influence of an external flash is present in the line, and indicate "no artifact" if there is no such influence. Also, for the sake of convenience in the following description, $LT_n$ will represent the top line determination information and $LB_n$ will represent the bottom line determination information in the n-th frame. Also, it is assumed that the evaluation value comparison unit 413 holds, as internal states LTI and LBI, information indicating the current state (the most recently output $LT_n$ and $LB_n$) of whether the influence of an external flash is present in the top line and the bottom line. It is also assumed that the initial value of both LTI and LBI is "no artifact".

Figure 8:
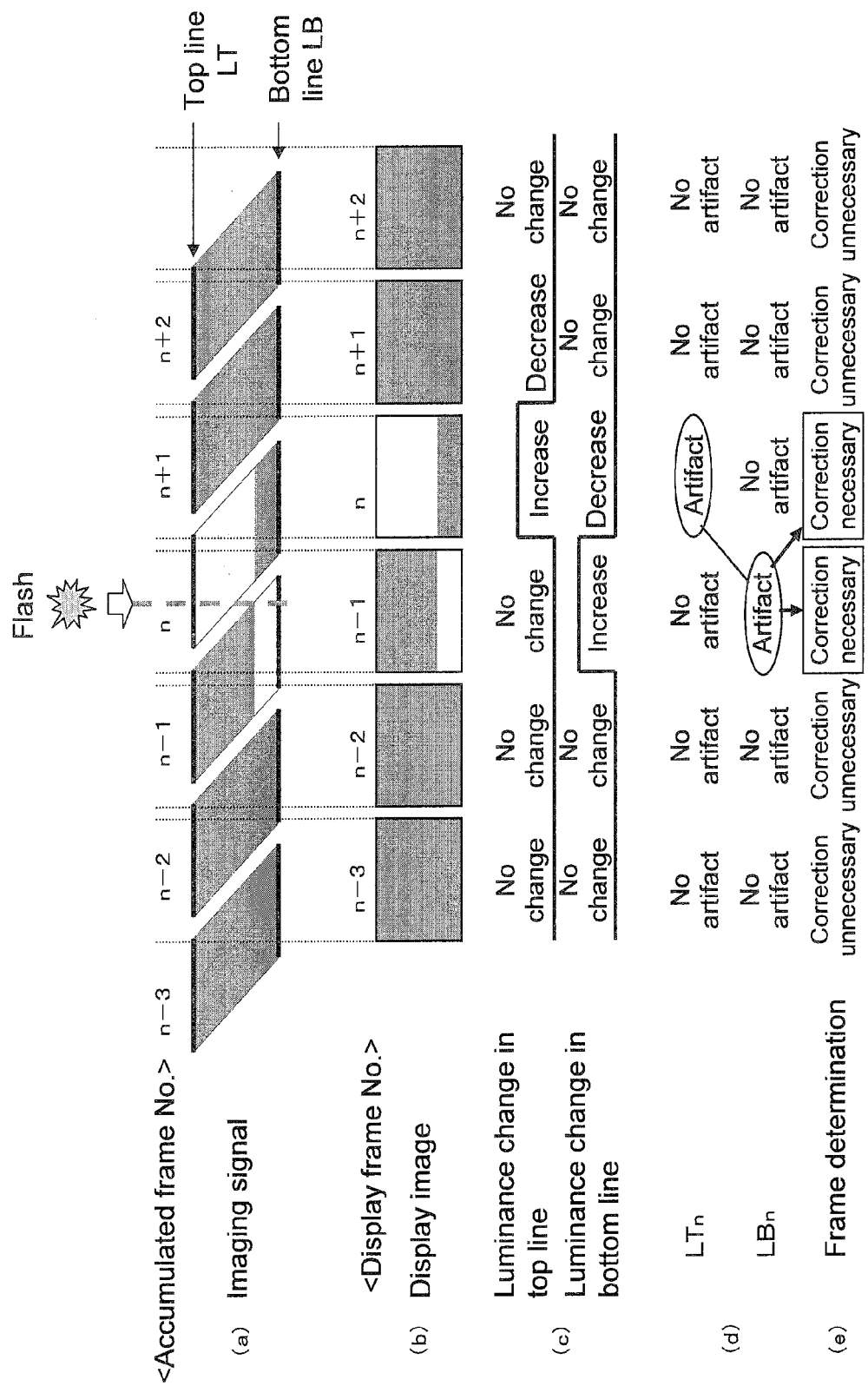
FIG. 8 is a diagram illustrating the influence an external flash has on an imaging signal in an imaging device that uses a CMOS image sensor.
Figure 9:
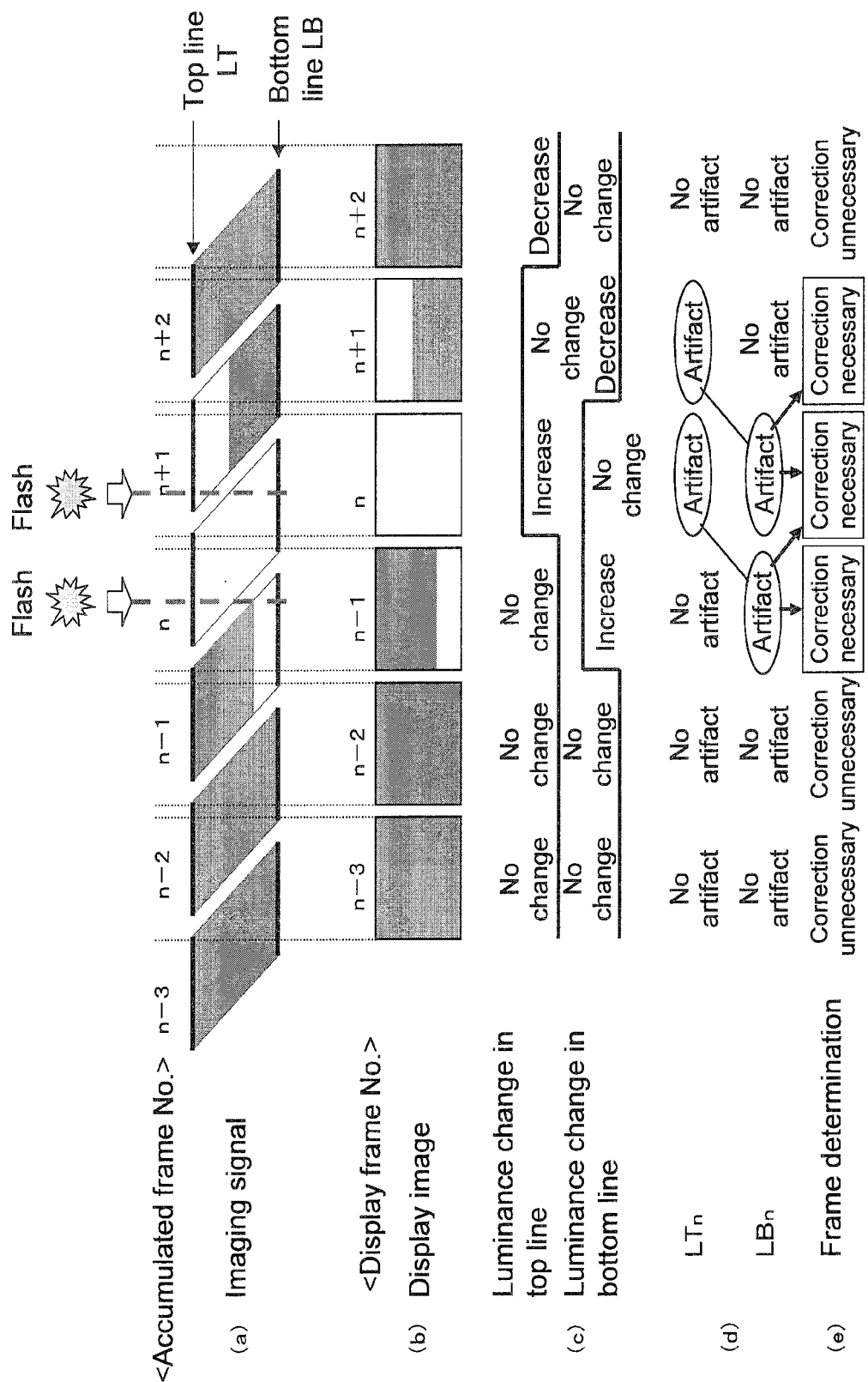
FIG. 9 is a diagram illustrating the influence external flashes have on an imaging signal in an imaging device that uses a CMOS image sensor.
Figure 10:
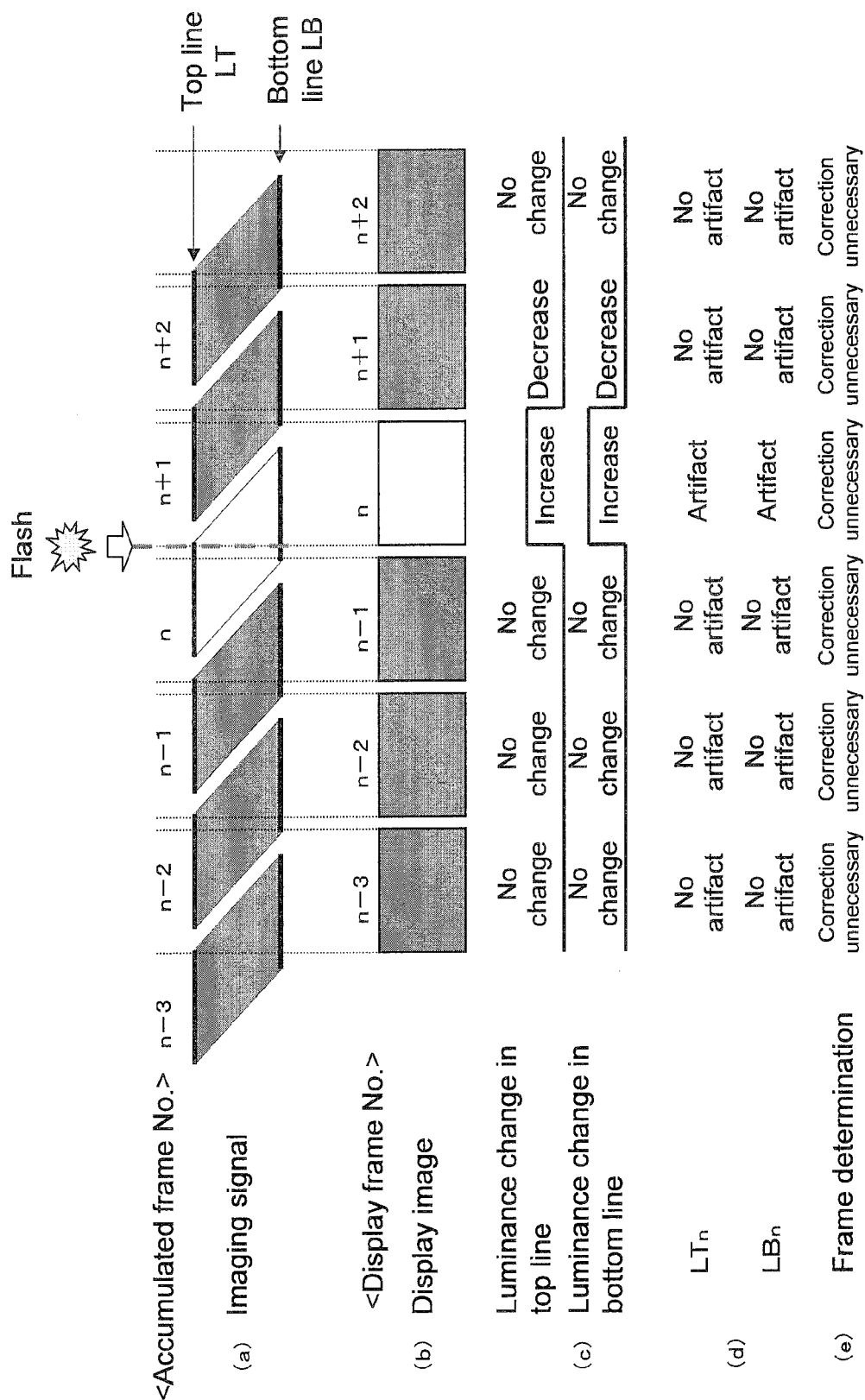
FIG. 10 is a diagram illustrating the influence an external flash has on an imaging signal in an imaging device that uses a CMOS image sensor.

FIGS. 8 to 10 are diagrams showing the influence on an imaging signal and an output signal (image to be displayed by a monitor or a viewfinder) in the case where external flashes such as flashes from a still camera have been emitted at different times during imaging performed by the imaging unit 1.

In these figures, (a) illustrates the charge accumulation periods of respective lines in the imaging signal in the imaging unit 1.

In these figures, (b) illustrates the output signal (image to be displayed by the monitor or the like) output from the flash correction processing unit 5. Here, these correspond to simplifications of the schematic diagrams shown in FIG. 35.

In these figures, (c) illustrates changes in the evaluation values (average luminance of each line) of the top line and the bottom line that are evaluated by the evaluation value comparison unit 413.

In these figures, (d) shows the top line determination information $LT_n$ and the bottom line determination information $LB_n$ output by the evaluation value comparison unit 413.

In these figures, (e) shows the frame determination information output by the frame determination unit 43.

(2.2.2: Operations of Line Determination Unit 41)

Next is a description of operations performed by the line determination unit 41 with reference to FIGS. 7 to 10.

The imaging signal output from the imaging unit 1 is input to the line determination unit 41.

In the line determination unit 41, the input imaging signals of the respective lines (imaging signals forming the respective lines) are sequentially supplied (output) to the evaluation value generation unit 411. When the imaging signals of the top line and the bottom line have been input, the evaluation value generation unit 411 calculates signal average values for the luminance signals of the respective lines, and the calculated values are used as the evaluation values. Normally, since the luminance level of an imaging signal is relatively higher when the influence of an external flash is present than when the influence of an external flash is not present, the presence of the influence of an external flash can be checked by detecting relatively change between frames in the evaluation values of the top line and the bottom line. The evaluation value storage unit 412 temporarily stores the evaluation values of the top line and the bottom line that were calculated by the evaluation value generation unit 411.

<<Case of FIG. 8>>

FIG. 8 shows the situation in which an external flash has been emitted while the imaging unit 1 is capturing frames from the n−1-th frame to n-th frame. In this case, as shown in FIGS. 8(a) and 8(b), a white band-shaped artifact appears in the lower portion of the image of the n−1-th frame and in the upper portion of the image of the n-th frame in the imaging signals output from the imaging unit 1. In the case where an external flash is emitted at the time shown in FIG. 8, evaluation values for the imaging signals of the top line and the bottom line of the n−2-th frame that have been generated by the evaluation value generation unit 411 are stored in the evaluation value storage unit 412 and also supplied to the evaluation value comparison unit 413.

(Processing of n−1-th frame):

Next, likewise, when the imaging signal of the n−1-th frame is input, evaluation values for the imaging signals of the top line and the bottom line of the n−1-th frame that have been generated by the evaluation value generation unit 411 are supplied to the evaluation value storage unit 412 and the evaluation value comparison unit 413. The evaluation value comparison unit 413 compares the evaluation values for the imaging signals of the top line and the bottom line of the n−1-th frame with the evaluation values for the imaging signals of the top line and the bottom line of the n−2-th frame that are stored in the evaluation value storage unit 412, and determines whether the amounts of change (amounts of increase or amounts of decrease) are greater than a predetermined threshold value that has been set in advance.

As shown in FIG. 8(c), the amount of change in the evaluation value of the top line of the n−1-th frame relative to the evaluation value of the top line of the n−2-th frame is less than the predetermined threshold value (hereinafter, this case is noted as "no change"), and the amount of change (amount of increase) in the evaluation value of the bottom line of the n−1-th frame relative to the evaluation value of the bottom line of the n−2-th frame is greater than the predetermined threshold value (hereinafter, this case is noted as "increase").

Since the internal state LTI holding the immediately previous top line determination information $LT_{n-2}$ is "no artifact", and there has been no change in this state in the top line, the line determination unit 41 outputs "no artifact" as the top line determination information $LT_{n-1}$.

Also, since the internal state LBI holding the bottom line determination information $LB_{n-2}$ is "no artifact", and there has been an "increase" in the evaluation value in the bottom line, the line determination unit 41 outputs "artifact" as the bottom line determination information $LB_{n-1}$. The evaluation value comparison unit 413 also changes the internal state LBI from "no artifact" to "artifact".

Note that the threshold value used in the comparison processing performed by the evaluation value comparison unit 413 is set to a value such that, due to the influence of an external flash, the amount of change in the evaluation value exceeds the threshold value in a line in which the luminance level has changed compared to the line corresponding to the frame one frame earlier, and the amount of change in the evaluation value does not exceed the threshold value in a line in which there is no change. Although the threshold value may be set as a fixed value (e.g., a fixed value set in advance that enables appropriately detecting an external flash taking the system performance (camera performance) of the imaging device 2000 into consideration), there is no limitation to this, and for example, the threshold value may be calculated based on the overall average luminance of the immediately previous frame that was determined to not have been influenced by an external flash and not need correction processing.

The evaluation value storage unit 412 stores the newly supplied evaluation values of the top line and the bottom line of the n−1-th frame in place of the evaluation values of the top line and the bottom line of the n−2-th frame.

(Processing of n-th frame):

Next, likewise, when the imaging signal of the n-th frame is input, evaluation values for the imaging signals of the top line and the bottom line of the n-th frame that have been generated by the evaluation value generation unit 411 are supplied to the evaluation value storage unit 412 and the evaluation value comparison unit 413.

The evaluation value comparison unit 413 compares the evaluation values for the imaging signals of the top line and the bottom line of the n-th frame with the evaluation values for the imaging signals of the top line and the bottom line of the n−1-th frame that are stored in the evaluation value storage unit 412. Specifically, the amount of change in the evaluation value of the top line of the n-th frame relative to the evaluation value of the top line of the n−1-th frame is an "increase", and the amount of change (amount of decrease) in the evaluation value of the bottom line of the n-th frame relative to the evaluation value of the bottom line of the n−1-th frame is greater than the predetermined threshold value (hereinafter, this case is noted as "decrease"). Since the internal state LTI held in the evaluation value comparison unit 413 is "no artifact", and there has been an "increase" in the evaluation value of the top line, the evaluation value comparison unit 413 outputs "artifact" as the top line determination information $LT_D$, and changes the internal state LTI from "no artifact" to "artifact". Also, since the internal state LBI is "artifact", and there has been a "decrease" in the evaluation value of the bottom line, the evaluation value comparison unit 413 outputs "no artifact" as the bottom line determination information $LB_n$, and changes the internal state LBI from "artifact" to "no artifact".

The evaluation value storage unit 412 stores the newly supplied evaluation values of the top line and the bottom line of the n-th frame in place of the evaluation values of the top line and the bottom line of the n−1-th frame.

(Processing of n+1-th frame):

Furthermore, likewise, when the imaging signal of the n+1-th frame is input, evaluation values for the imaging signals of the top line and the bottom line of the n+1-th frame that have been generated by the evaluation value generation unit 411 are supplied to the evaluation value storage unit 412 and the evaluation value comparison unit 413.

The evaluation value comparison unit 413 compares the evaluation values for the imaging signals of the top line and the bottom line of the n+1-th frame with the evaluation values for the imaging signals of the top line and the bottom line of the n-th frame that are stored in the evaluation value storage unit 412. Specifically, the amount of change in the evaluation value of the top line of the n+1-th frame relative to the evaluation value of the top line of the n-th frame is a "decrease", and the amount of change in the evaluation value of the bottom line of the n+1-th frame relative to the evaluation value of the bottom line of the n-th frame is "no change". Since the internal state LTI held in the evaluation value comparison unit 413 is "artifact", and there has been a "decrease" in the evaluation value of the top line, the evaluation value comparison unit 413 outputs "no artifact" as the top line determination information $LT_{n+1}$, and changes the internal state LTI from "artifact" to "no artifact". Also, since the internal state LBI is "no artifact", and there has been "no change" in the evaluation value of the bottom line, the evaluation value comparison unit 413 outputs "no artifact" as the bottom line determination information $LB_{n+1}$.

The evaluation value storage unit 412 stores the newly supplied evaluation values of the top line and the bottom line of the n+1-th frame in place of the evaluation values of the top line and the bottom line of the n-th frame.

<<Case of FIG. 9>>

Next is a description of the case where external flashes have been emitted at the times shown in FIG. 9.

FIG. 9 shows the situation in which an external flash is emitted while the n-th frame is being captured, and subsequently an external flash is emitted while the n+1-th frame is being captured.

(Processing of n−2-th and n−1-th frames):

When the imaging signals of the n−2-th frame and the n−1-th frames are input, the line determination unit 41 operates similarly to the case shown in FIG. 8.

(Processing of n-th frame):

When the imaging signal of the n-th frame is input, evaluation values for the imaging signals of the top line and the bottom line of the n-th frame that have been generated by the evaluation value generation unit 411 are supplied to the evaluation value storage unit 412 and the evaluation value comparison unit 413.

The evaluation value comparison unit 413 compares the evaluation values for the imaging signals of the top line and the bottom line of the n-th frame with the evaluation values for the imaging signals of the top line and the bottom line of the n−1-th frame that are stored in the evaluation value storage unit 412. Specifically, the amount of change in the evaluation value of the top line of the n-th frame relative to the evaluation value of the top line of the n−1-th frame is an "increase", and the amount of change in the evaluation value of the bottom line of the n-th frame relative to the evaluation value of the bottom line of the n−1-th frame is "no change". Since the internal state LTI held in the evaluation value comparison unit 413 is "no artifact", and there has been an "increase" in the evaluation value of the top line, the evaluation value comparison unit 413 outputs "artifact" as the top line determination information $LT_n$, and changes the internal state LTI from "no artifact" to "artifact". Also, since the internal state LBI is "artifact", and there has been "no change" in the evaluation value of the bottom line, the evaluation value comparison unit 413 continues to output "artifact" as the bottom line determination information $LB_n$.

The evaluation value storage unit 412 stores the newly supplied evaluation values of the top line and the bottom line of the n-th frame in place of the evaluation values of the top line and the bottom line of the n−1-th frame.

(Processing of n+1-th frame):

Next, when the imaging signal of the n+1-th frame is input, evaluation values for the imaging signals of the top line and the bottom line of the n+1-th frame that have been generated by the evaluation value generation unit 411 are supplied to the evaluation value storage unit 412 and the evaluation value comparison unit 413.

The evaluation value comparison unit 413 compares the evaluation values for the imaging signals of the top line and the bottom line of the n+1-th frame with the evaluation values for the imaging signals of the top line and the bottom line of the n-th frame that are stored in the evaluation value storage unit 412. Specifically, the amount of change in the evaluation value of the top line of the n+1-th frame relative to the evaluation value of the top line of the n-th frame is "no change", and the amount of change in the evaluation value of the bottom line of the n+1-th frame relative to the evaluation value of the bottom line of the n-th frame is a "decrease". Since the internal state LTI held in the evaluation value comparison unit 413 is "artifact", and there has been "no change" in the evaluation value of the top line, the evaluation value comparison unit 413 continues to output "artifact" as the top line determination information $LT_{n+1}$. Also, since the internal state LBI is "artifact", and there has been a "decrease" in the evaluation value of the bottom line, the evaluation value comparison unit 413 outputs "no artifact" as the bottom line determination information $LB_{n+1}$, and changes the internal state LBI from "artifact" to "no artifact".

The evaluation value storage unit 412 stores the newly supplied evaluation values of the top line and the bottom line of the n+1-th frame in place of the evaluation values of the top line and the bottom line of the n-th frame.

(When imaging signal of n+2-th frame is input):

Furthermore, likewise, when the imaging signal of the n+2-th frame is input, evaluation values for the imaging signals of the top line and the bottom line of the n+2-th frame that have been generated by the evaluation value generation unit 411 are supplied to the evaluation value storage unit 412 and the evaluation value comparison unit 413.

The evaluation value comparison unit 413 compares the evaluation values for the imaging signals of the top line and the bottom line of the n+2-th frame with the evaluation values for the imaging signals of the top line and the bottom line of the n+1-th frame that are stored in the evaluation value storage unit 412. Specifically, the amount of change in the evaluation value of the top line of the n+2-th frame relative to the evaluation value of the top line of the n+1-th frame is a "decrease", and the amount of change in the evaluation value of the bottom line of the n+2-th frame relative to the evaluation value of the bottom line of the n+1-th frame is "no change". Since the internal state LTI held in the evaluation value comparison unit 413 is "artifact", and there has been a "decrease" in the evaluation value of the top line, the evaluation value comparison unit 413 outputs "no artifact" as the top line determination information $LT_{n+2}$, and changes the internal state LTI from "artifact" to "no artifact". Also, since the internal state LBI is "no artifact", and there has been "no change" in the evaluation value of the bottom line, the evaluation value comparison unit 413 continues to output "no artifact" as the bottom line determination information $LB_{n+2}$.

The evaluation value storage unit 412 stores the newly supplied evaluation values of the top line and the bottom line of the n+2-th frame in place of the evaluation values of the top line and the bottom line of the n+1-th frame.

<<Case of FIG. 10>>

Also in the case where an external flash is emitted at the time shown in FIG. 10, the line determination unit 41 operates similarly to the case shown in FIG. 8, and the evaluation value comparison unit 413 outputs "artifact" as $LT_n$ and $LB_n$ in the n-th frame, and outputs "no artifact" as $LT_n$ and $LB_n$ in the n+1-th frame.

(2.2.3: Overall Operations of Imaging Device 2000)

Next is a description of overall operations performed by the imaging device 2000 of the second embodiment with reference to FIGS. 6, 8, 9, and 10.

First is a description of the case where, as shown in FIG. 8, an external flash is emitted while the n-th frame is being captured.

(Processing of n−2-th frame):

When the imaging signal has not been influenced by an external flash, such as when the imaging signal of the n−2-th frame is input to the line determination unit 41, the line determination unit 41 outputs "no artifact" as the top line determination information $LT_{n-2}$ and the bottom line determination information $LB_{n-2}$ for the imaging signal of the n−2-th frame.

Out of these two, the determination information storage unit 42 stores at least the bottom line determination information $LB_{n-2}$. Specifically, in this example, the determination information storage unit 42 stores "no artifact".

When the frame determination unit 43 has received an input of the top line determination information $LT_{n-2}$ of the n−2-th frame and the imaging signal of the frame one frame earlier, that is to say the n−3-th frame, the frame determination unit 43 receives an input of the bottom line determination information $LB_{n-3}$ of the n−3-th frame that is stored in the determination information storage unit 42 (it is assumed that "no artifact" is stored). Here, since both $LT_{n-2}$ and $LB_{n-3}$ are "no artifact", the frame determination unit 43 determines that the imaging signal of at least the n−3-th frame has not been influenced by an external flash, and outputs information indicating "correction unnecessary" to the flash correction processing unit 5 as the frame determination information (FIG. 8(e)).

Upon receiving the imaging signal of the n−2-th frame, the flash correction processing unit 5 stores it in the delay unit. Also, since the frame determination information sent from the frame determination unit 43 is "correction unnecessary", the flash correction processing unit 5 outputs, as an output signal, the imaging signal of the n−3-th frame already stored in the delay unit, as is without performing correction thereon.

(Processing of n−1-th frame):

Next, when the imaging signal of the n−1-th frame is input to the line determination unit 41, "no artifact" is indicated by the top line determination information $LT_{n-1}$ and "artifact" is indicated by the bottom line determination information $LB_{n-1}$ for the imaging signal of the n−1-th frame, that are output from the line determination unit 41.

Out of these two, the determination information storage unit 42 stores at least the bottom line determination information $LB_{n-1}$.

When the frame determination unit 43 has received an input of the top line determination information $LT_{n-1}$ of the n−1-th frame and the imaging signal of the frame one frame earlier, that is to say the n−2-th frame, the frame determination unit 43 receives an input of the bottom line determination information $LB_{n-2}$ of the n−2-th frame that is stored in the determination information storage unit 42. Here, since both $LT_{n-1}$ and $LB_{n-2}$ indicate "no artifact", the frame determination unit 43 determines that the imaging signal of at least the n−2-th frame has not been influenced by an external flash, and outputs information indicating "correction unnecessary" to the flash correction processing unit 5 as the frame determination information.

Upon receiving the imaging signal of the n−1-th frame, the flash correction processing unit 5 stores it in the delay unit. Also, since the frame determination information sent from the frame determination unit 43 is "correction unnecessary", the flash correction processing unit 5 outputs, as an output signal, the imaging signal of the n−2-th frame already stored in the delay unit, as is without performing correction thereon.

(Processing of n-th frame):

Next, when the imaging signal of the n-th frame is input to the line determination unit 41, "artifact" is indicated by the top line determination information $LT_n$ for the imaging signal of the n-th frame that is output, and "no artifact" is indicated by the bottom line determination information $LB_n$.

Out of these two, the determination information storage unit 42 stores at least the bottom line determination information $LB_n$.

When the frame determination unit 43 has received an input of the top line determination information $LT_n$ of the n-th frame and the imaging signal of the frame one frame earlier, that is to say the n−1-th frame, the frame determination unit 43 receives an input of the bottom line determination information $LB_{n-1}$ of the n−1-th frame that is stored in the determination information storage unit 42. Here, since both $LT_n$ and $LB_{n-1}$ indicate "artifact", the frame determination unit 43 determines that the imaging signals of the n−1-th and n-th frames have both been influenced by an external flash. Since the imaging signal of the n−1-th frame has been influenced by an external flash, at this time the frame determination unit 43 outputs information indicating "correction necessary" to the flash correction processing unit 5 as the frame determination information.

Upon receiving the imaging signal of the n-th frame, the flash correction processing unit 5 stores it in the delay unit. Also, since the frame determination information sent from the frame determination unit 43 is "correction necessary", the flash correction processing unit 5 performs correction processing such as eliminating or suppressing the influence of an external flash on the imaging signal of the n−1-th frame already stored in the delay unit, and outputs the result imaging signal as an output signal. Conceivable examples of the correction processing include a method of using the imaging signal of the n−2-th frame, which is the frame one frame earlier, as the output signal, and a method of using a specified imaging signal that has been determined in advance (e.g., an imaging signal in which all of the pixels have a specified pixel value (e.g., the pixel value corresponding to black (W 0% level) or white level (W 100% level)) as the output signal.

(Processing of n+1-th frame):

Furthermore, when the imaging signal of the n+1-th frame has been input to the line determination unit 41, the top line determination information $LT_{n+1}$ and the bottom line determination information $LB_{n+1}$ for the imaging signal of the n+1-th frame that are output both indicate "no artifact".

Out of these two, the determination information storage unit 42 stores at least the bottom line determination information $LB_{n+1}$.

When the frame determination unit 43 has received an input of the top line determination information $LT_{n+1}$ of the n+1-th frame and the imaging signal of the frame one frame earlier, that is to say the n-th frame, the frame determination unit 43 receives an input of the bottom line determination information LBn of the n-th frame that is stored in the determination information storage unit 42. Here, although $LT_{n+1}$ and $LB_n$ both indicate that there is no artifact, the frame determination unit 43 has already determined based on the previous determination result that the imaging signal of the n-th frame has been influenced by an external flash. Accordingly, at this time, the frame determination unit 43 outputs information indicating "correction necessary" to the flash correction processing unit 5 as the frame determination information for the imaging signal of the n-th frame.

Upon receiving the imaging signal of the n+1-th frame, the flash correction processing unit 5 stores it in the delay unit. Also, since the frame determination information sent from the frame determination unit 43 is "correction necessary", the flash correction processing unit 5 performs correction processing on the imaging signal of the n-th frame already stored in the delay unit similarly to the above case, and outputs the result imaging signal as an output signal.

As described above, in the imaging device 2000, if the frame determination unit 43 has determined that the bottom line of the imaging signal of the frame one frame earlier has been influenced by an external flash, and furthermore that the top line of the imaging signal of the current frame has been influenced by an external flash, the frame determination unit 43 determines that the imaging signal of the frame one frame earlier and the imaging signal of the current frame have been influenced by an external flash, and outputs such a determination result to the flash correction processing unit 5 as the frame determination information. Then, in the imaging device 2000, based on the frame determination information output from the frame determination unit 43, the flash correction processing unit 5 subjects the imaging signals to processing for eliminating or suppressing the influence of an external flash. In the case where an external flash is emitted while the n-th frame is being captured, as in the example shown in FIG. 8, the flash correction processing unit 5 performs correction processing on the imaging signals of the n−1-th frame and the n-th frame in accordance with the above determination.

<<Case of FIG. 9 (Case of Emission of Multiple External Flashes)>>

Next, as shown in FIG. 9, in the case where an external flash is emitted while the n-th frame is being captured, and another external flash is emitted while the imaging signal is being influenced by the first external flash, white band-shaped artifacts appear spanning three frames in the imaging signals output from the imaging unit 1, namely the lower portion of the image of the n−1-th frame, the entirety of the screen of the n-th frame, and the upper portion of the image of the n+1-th frame.

In this case as well, similarly to the case shown in FIG. 8, in the imaging device 2000, if the frame determination unit 43 has determined that the influence of an external flash is indicated by the bottom line determination information of the frame one frame earlier, and furthermore determined that the influence of an external flash is indicated by the top line determination information of the current frame, the frame determination unit 43 determines that the imaging signal of the frame one frame earlier and the imaging signal of the current frame have been influenced by an external flash, and outputs frame determination information. Then, based on the frame determination information output from the frame determination unit 43, the flash correction processing unit 5 subjects the imaging signals to processing for eliminating or suppressing the influence of the external flash. More specifically, the frame determination information for the n−1-th frame and the n-th frame indicates "correction necessary" since both $LT_n$ and $LB_{n−1}$ indicate "artifact", and the frame determination information for the n-th frame and the n+1-th frame indicates "correction necessary" since $LT_{n+1}$ and $LB_n$ also both indicate "artifact". As a result, in the imaging device 2000, the flash correction processing unit 5 executes correction processing on the n−1-th, n-th, and n+1-th frames.

<<Case of FIG. 10>>

Also, if an external flash has been emitted at a time that is after the start of charge accumulation in the bottom line of the imaging signal of the n-th frame and furthermore is before the end of accumulation in the top line of the imaging signal of the n-th frame, a white band-shaped artifact appears in only the entirety of the imaging signal of the n-th frame output from the imaging unit 1 as shown in FIG. 10.

In such a case, in the imaging device 2000 of the present embodiment, neither the top line determination information nor the bottom line determination information of the frame one frame earlier indicate the influence of an external flash. Specifically, $LB_{n−1}$ indicates "no artifact", $LT_n$ and $LB_n$ indicate "artifact", and $LT_{n+1}$ indicates "no artifact". Accordingly, in the imaging device 2000, the imaging signal of a frame that has been influenced by an external flash is not detected, and the frame determination unit 43 does not output frame determination information indicating the influence of an external flash. For this reason, the flash correction processing unit 5 does not subject the imaging signal to processing for eliminating or suppressing the influence of an external flash. In other words, when the video formed by the imaging signal (video signal) output from the imaging device 2000 in the case shown in FIG. 10 is displayed on the display device, the entire screen is uniformly white (bright), and is a natural image as in the case of performing imaging using an imaging device that uses a CCD as the imaging element, and therefore there is no particular need for processing in the imaging device 2000.

As described above, with the imaging device 2000 of the present embodiment, the detection unit 4 can detect a frame that has been influenced by an external flash by determining whether the influence of an external flash is present in the top line and the bottom line of the image of each frame. For this reason, with the imaging device 2000, whether the influence of an external flash is present can be reliably determined regardless of which line the influence starts to be present in depending on the timing of the emission of the external flash, without requiring a frame memory for detection.

Also, with the imaging device 2000, when the line determination unit 41 determines whether the influence of an external flash is present in the top line and the bottom line, evaluation values of the imaging signal of the current frame and evaluation values of the imaging signal of the frame one frame earlier are compared in order to detect an increase or decrease in the evaluation values between frames, thus detecting the frames in which the influence of an external flash starts and ends. For this reason, in the imaging device 2000, frames that have been influenced can be detected even when the influence of an external flash spans three or more frames.

Also, in the imaging device 2000, comparing the same evaluation values in the same line enables mitigating influence due to the type of subject.

Third Embodiment

Next is a description of a third embodiment.

The configuration of an imaging device of the third embodiment is similar to the configuration of the imaging device 2000 of the second embodiment.

The following describes the imaging device of the third embodiment with reference to FIGS. 6, 7, 11, 12, and 13.

The operations of the evaluation value storage unit 412 and the evaluation value comparison unit 413 of the present embodiment differ from those of the second embodiment with respect to the following points (1) and (2). Specifically:

(1) Out of the generated evaluation values, the evaluation value storage unit 412 temporarily stores the evaluation value of the top line.

(2) The evaluation value comparison unit 413 compares the evaluation value of the top line that is stored in the evaluation value storage unit 412 and the evaluation value of the bottom line that was generated by the evaluation value generation unit 411, determines whether the influence of an external flash is present the top line and the bottom line, and output the determination results as the top line determination information and the bottom line determination information respectively.

Figure 11:
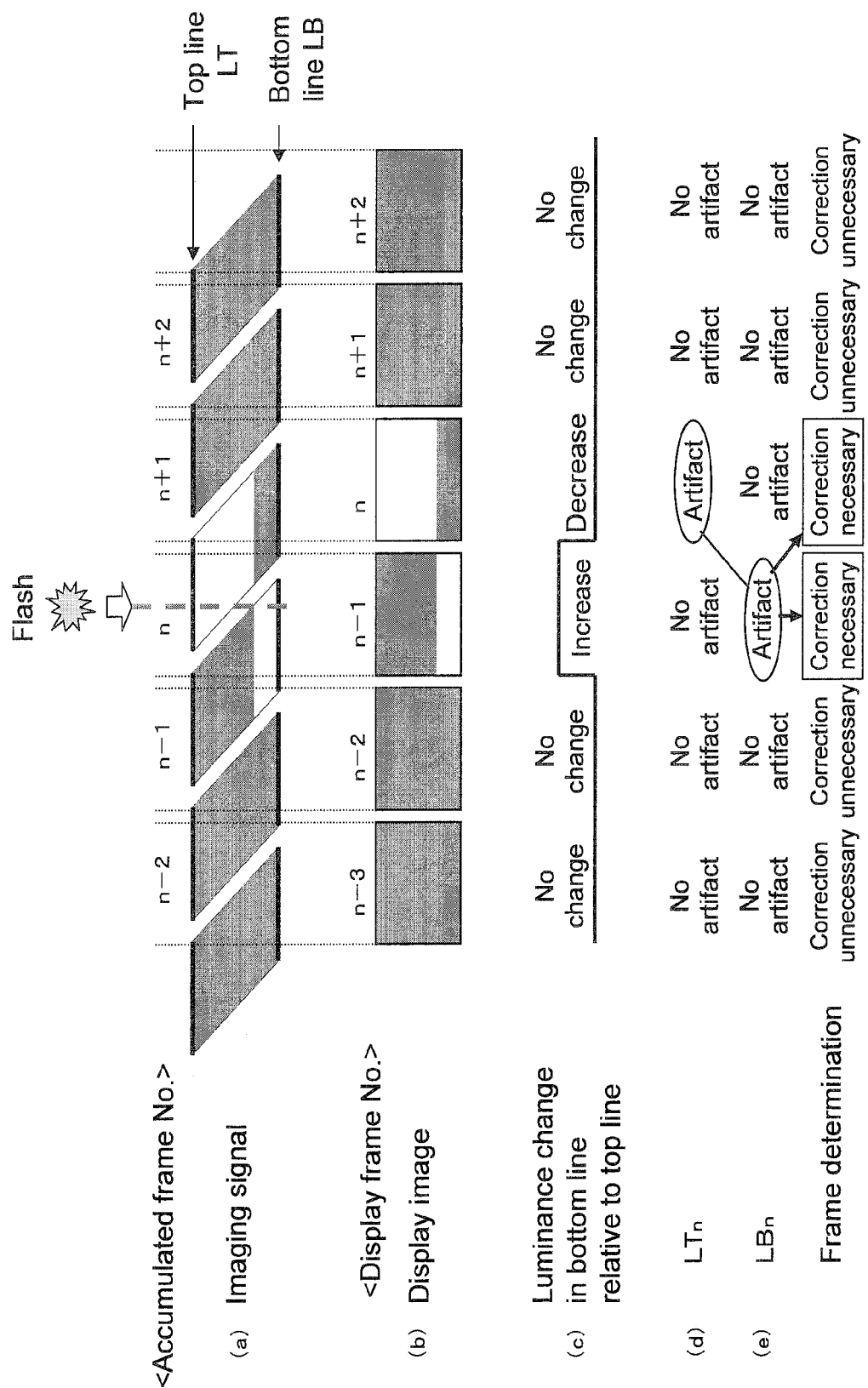
FIG. 11 is a diagram illustrating the influence an external flash has on an imaging signal in an imaging device that uses a CMOS image sensor.
Figure 12:
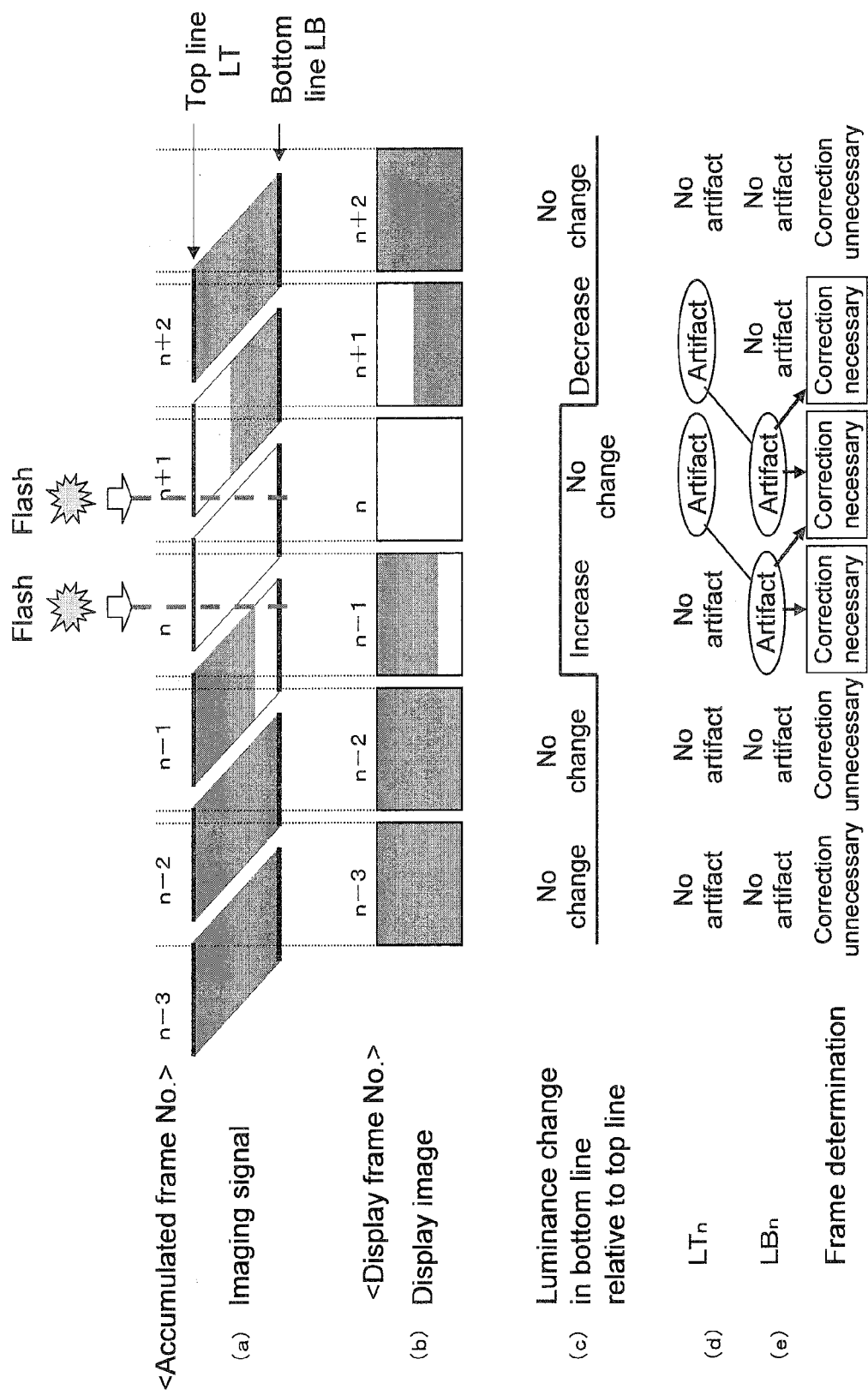
FIG. 12 is a diagram illustrating the influence external flashes have on an imaging signal in an imaging device that uses a CMOS image sensor.
Figure 13:
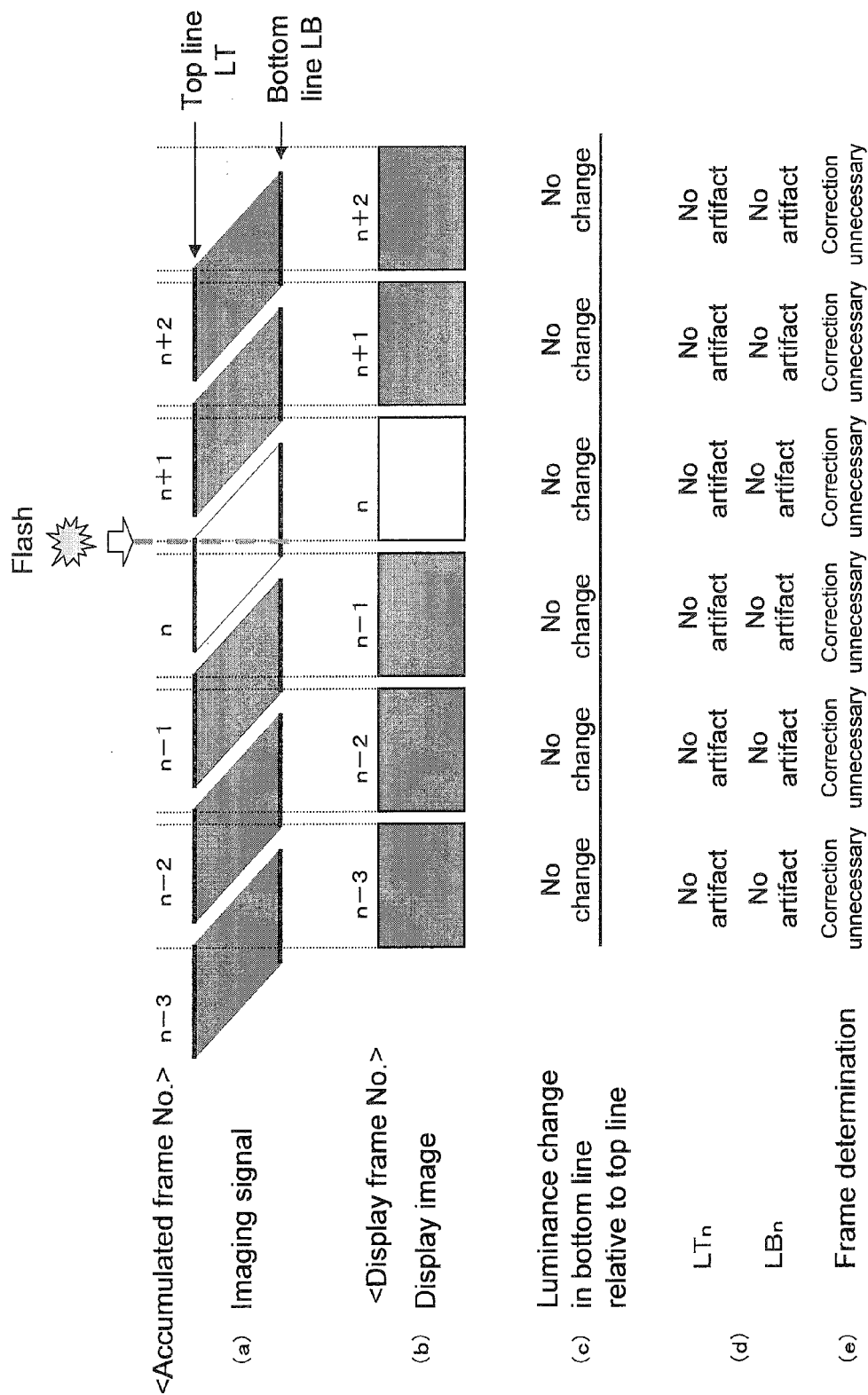
FIG. 13 is a diagram illustrating the influence an external flash has on an imaging signal in an imaging device that uses a CMOS image sensor.

FIGS. 11 to 13 are diagrams showing the influence that external flashes such as a still camera flash emitted during imaging by the imaging unit 1 has on imaging signals and output signals (display images to be displayed by a monitor or viewfinder), the external flashes having been emitted at the same times as those in FIGS. 8 to 10 respectively.

In these figures, (a), (b), (d), and (e) are similar to (a), (b), (d), and (e) in FIGS. 8 to 10. In these figures, (c) illustrates change in the evaluation values (average luminance of each line) of the bottom line with respect to the top line, which are evaluated by the evaluation value comparison unit 413.

In FIG. 6, operations other than those of the line determination unit 41 are the same as those described in the second embodiment, and therefore the following describes mainly operations of the line determination unit 41.

The imaging signal output from the imaging unit 1 in FIG. 6 is input to the line determination unit 41. In the line determination unit 41, the input imaging signals corresponding to the respective lines of the frame images formed by the input imaging signals are sequentially supplied to the evaluation value generation unit 411.

The evaluation value generation unit 411 generates evaluation values for the imaging signals of the top line and the bottom line by performing the same operations as those in the case described in the second embodiment. By detecting relative change in the evaluation values of the top line and the bottom line within a frame, it is possible to check whether the influence of an external flash is present in the imaging device of the present embodiment.

The evaluation value storage unit 412 temporarily stores the evaluation value for the imaging signal of the top line.

<<Case of FIG. 11>>

For example, if an external flash has been emitted at the time shown in FIG. 11, out of the evaluation values for the imaging signals of the top line and the bottom line of the n−2-th frame that were sequentially generated by the evaluation value generation unit 411, the evaluation value of the top line is stored in the evaluation value storage unit 412, and the evaluation value of the bottom line is supplied to the evaluation value comparison unit 413.

The evaluation value comparison unit 413 compares the evaluation value for the video signal of the bottom line of the n−2-th frame and the evaluation value for the imaging signal of the top line of the n−2-th frame that is stored in the evaluation value storage unit 412, and determines whether the amount of change (amount of increase or amount of decrease) is greater than a predetermined threshold value that has been set in advance.

As shown in FIG. 11(*c*), the amount of change in the evaluation value of the bottom line of the n−2-th frame relative to the evaluation value of the top line of the n−2-th frame is less than the predetermined threshold value (hereinafter, this case is noted as "no change"). Since the internal state LBI holding the immediately previous bottom line determination information $LB_{n-3}$ is "no artifact", and there has been no change in the evaluation value of the bottom line relative to the evaluation value of the top line of the video signal of the n−2-th frame, "no artifact" is output as the top line determination information $LT_{n-2}$ and the bottom line determination information $LB_{n-2}$. Also, the internal state LBI is kept indicating "no artifact".

Note that the threshold value used in the comparison processing performed by the evaluation value comparison unit 413 is set to a value such that, in a frame in which there has been a change in the luminance level due to the influence of an external flash, the amount of change in the evaluation value of the bottom line relative to the top line exceeds the threshold value, and in a frame in which there is no change, the amount of change in the evaluation value of the bottom line relative to the top line does not exceed the threshold value. Although the threshold value may be set as a fixed value (e.g., a fixed value set in advance that enables appropriately detecting an external flash taking the system performance (camera performance) of the imaging device of the present embodiment into consideration), there is no limitation to this, and for example, the threshold value may be calculated based on the overall average luminance of the immediately previous frame that was determined to not have been influenced by an external flash and not need correction processing.

(Processing of n−1-th frame):

Next, likewise, when the imaging signal of the n−1-th frame has been input, out of the evaluation values for the imaging signals of the top line and the bottom line of the n−1-th frame that were generated by the evaluation value generation unit 411, the evaluation value of the top line is stored in the evaluation value storage unit 412, and the evaluation value of the bottom line is supplied to the evaluation value comparison unit 413.

The evaluation value comparison unit 413 compares the evaluation value for the imaging signal of the bottom line of the n−1-th frame and the evaluation value for the imaging signal of the top line of the n−1-th frame that is stored in the evaluation value storage unit 412. Specifically, the amount of change (amount of increase) in the evaluation value of the bottom line relative to the evaluation value of the top line of the n−1-th frame is greater than the predetermined threshold value (hereinafter, this case is noted as "increase"). Since there has been an "increase" in the evaluation value of the n−1-th frame, the evaluation value comparison unit 413 outputs "no artifact" as the top line determination information $LT_{n-1}$, outputs "artifact" as the bottom line determination information $LB_{n-1}$, and sets the internal state LBI to "artifact".

(Processing of n-th frame):

Next, likewise, when the imaging signal of the n-th frame is input, out of the evaluation values for the imaging signals of the top line and the bottom line of the n-th frame that were generated by the evaluation value generation unit 411, the evaluation value of the top line is stored in the evaluation value storage unit 412, and the evaluation value of the bottom line is supplied to the evaluation value comparison unit 413.

The evaluation value comparison unit 413 compares the evaluation value for the imaging signal of the bottom line of the n-th frame and the evaluation value for the imaging signal of the top line of the n-th frame that is stored in the evaluation value storage unit 412. Specifically, the amount of change (amount of decrease) in the evaluation value of the bottom line relative to the evaluation value of the top line of the n-th frame is greater than the predetermined threshold value (hereinafter, this case is noted as "decrease"). Since there has been a "decrease" in the evaluation value of the n-th frame, the evaluation value comparison unit 413 outputs "artifact" as the top line determination information $LT_n$, outputs "no artifact" as the bottom line determination information $LB_n$, and sets the internal state LBI to "no artifact".

(Processing of n+1-th frame):

Furthermore, likewise, when the imaging signal of the n+1-th frame has been input, out of the evaluation values for the imaging signals of the top line and the bottom line of the n+1-th frame that were generated by the evaluation value generation unit 411, the evaluation value of the top line is stored in the evaluation value storage unit 412, and the evaluation value of the bottom line is supplied to the evaluation value comparison unit 413.

The evaluation value comparison unit 413 compares the evaluation value for the imaging signal of the bottom line of the n+1-th frame and the evaluation value for the imaging signal of the top line of the n+1-th frame that is stored in the evaluation value storage unit 412. Specifically, the amount of change in the evaluation value of the bottom line relative to the evaluation value of the top line of the n+1-th frame indicates "no change". Since the internal state LBI is "no artifact", and the evaluation value of the n+1-th frame indicates "no change", the evaluation value comparison unit 413 outputs "no artifact" as the top line determination information $LT_{n+1}$, outputs "no artifact" as the bottom line determination information $LB_{n+1}$, and sets the internal state LBI to "no artifact".

The following describes overall operations of the imaging device of the present embodiment. In the imaging device of the present embodiment, the determination information storage unit 42, the frame determination unit 43, and the flash correction processing unit 5 in FIG. 6 perform the same operations as those described in the second embodiment, based on the top line determination information and the bottom line determination information output from the evaluation value comparison unit 413 as described above. More specifically, in the case shown in FIG. 11, in the imaging device of the present embodiment, the line determination unit 41 determines both $LT_n$ and $LB_{n-1}$ to be "artifact", and the frame determination unit 43 determines "correction necessary" for the n−1-th and n-th frames. As a result, in the imaging device of the present embodiment, the flash correction processing unit 5 executes correction processing on the n−1-th and n-th frames.

<<Case of FIG. 12>>

The following describes the case where external flashes have been emitted at the times shown in FIG. 12.

(Processing of n−2-th, n−1-th, and n+2-th frame):

When the imaging signals of the n−2-th, n−1-th, and n+2-th frames are input, the line determination unit 41 performs the same operations as those for the n−2-th, n−1-th, and n+1-th frames in the example shown in FIG. 11.

(Processing of n-th frame):

When the imaging signal of the n-th frame is input, out of the evaluation values for the imaging signals of the top line and the bottom line of the n-th frame that were generated by the evaluation value generation unit 411, the evaluation value of the top line is stored in the evaluation value storage unit 412, and the evaluation value of the bottom line is supplied to the evaluation value comparison unit 413.

The evaluation value comparison unit 413 compares the evaluation value for the imaging signal of the bottom line of the n-th frame and the evaluation value for the imaging signal of the top line of the n-th frame that is stored in the evaluation value storage unit 412. Specifically, the amount of change in the evaluation value of the bottom line relative to the evaluation value of the top line of the n-th frame indicates "no change". Since the internal state LBI is "artifact", and there has been "no change" in the evaluation value of the n-th frame, the evaluation value comparison unit 413 outputs "artifact" as the top line determination information $LT_n$, outputs "artifact" as the bottom line determination information $LB_n$, and keeps the internal state LBI set to "artifact".

(Processing of n+1-th frame):

Next, likewise, when the imaging signal of the n+1-th frame has been input, out of the evaluation values for the imaging signals of the top line and the bottom line of the n+1-th frame that were generated by the evaluation value generation unit 411, the evaluation value of the top line is stored in the evaluation value storage unit 412, and the evaluation value of the bottom line is supplied to the evaluation value comparison unit 413.

The evaluation value comparison unit 413 compares the evaluation value for the imaging signal of the bottom line of the n+1-th frame and the evaluation value for the imaging signal of the top line of the n+1-th frame that is stored in the evaluation value storage unit 412. Specifically, the amount of change in the evaluation value of the bottom line relative to the evaluation value of the top line of the n+1-th frame indicates a "decrease". Since there has been a "decrease" in the evaluation value of the n+1-th frame, the evaluation value comparison unit 413 outputs "artifact" as the top line determination information $LT_{n+1}$, outputs "no artifact" as the bottom line determination information $LB_{n+1}$, and sets the internal state LBI to "no artifact".

The following describes overall operations of the imaging device of the present embodiment. In the imaging device of the present embodiment, the determination information storage unit 42, the frame determination unit 43, and the flash correction processing unit 5 in FIG. 6 perform the same operations as those described in the second embodiment, based on the top line determination information and the bottom line determination information output from the evaluation value comparison unit 413 as described above. More specifically, in the case shown in FIG. 12, in the imaging device of the present embodiment, the line determination unit 41 determines both $LT_n$ and $LB_{n-1}$ to be "artifact", and the frame determination unit 43 determines "correction necessary" for the n−1-th and n-th frames. Then, in the imaging device of the present embodiment, the line determination unit 41 determines both $LT_{n+1}$ and $LB_n$ to be "artifact", and the frame determination unit 43 determines "correction necessary" for the n-th and n+1-th frames. As a result, in the imaging device of the present embodiment, the flash correction processing unit 5 executes correction processing on the n−1-th, n-th, and n+1-th frames.

<<Case of FIG. 13>>

If an external flash has been emitted at the time shown in FIG. 13, in the imaging device of the third embodiment, the evaluation value comparison unit 413 always determines that neither the top line nor the bottom line have been influenced by an external flash, and always outputs "no artifact" as the top line determination information and the bottom line determination information at the times corresponding to the respective frames.

The following describes overall operations of the imaging device. In the imaging device of the present embodiment, the determination information storage unit 42, the frame determination unit 43, and the flash correction processing unit 5 in FIG. 6 perform the same operations as those described in the second embodiment, based on the top line determination information and the bottom line determination information output from the evaluation value comparison unit 413 as described above. More specifically, in the case of FIG. 13, in the imaging device of the present embodiment, the detection unit 4 determines "correction unnecessary" for all of the frames, and the flash correction processing unit 5 does not perform correction processing. In other words, when the video formed by the imaging signal (video signal) output from the imaging device of the present embodiment in the case shown in FIG. 13 is displayed on the display device, the entire screen is uniformly white (bright), and is a natural image as in the case of performing imaging using an imaging device that uses a CCD as the imaging element, and therefore there is no particular need for processing in the imaging device of the present embodiment.

As described above, with the imaging device of the present embodiment, evaluation values of the top line and the bottom line of the imaging signal of the current frame are compared in order to detect an increase or decrease in evaluation values within a frame, thus detecting frames that have been influenced by an external flash. For this reason, with the imaging device of the present embodiment, whether the influence of an external flash is present can be reliably determined regardless of which line the influence starts to be present in depending on the timing of the emission of the external flash, without requiring a frame memory for detection.

Also, with the imaging device of the present embodiment, the line determination unit 41 detects the frames in which the influence of an external flash starts and ends by comparing the evaluation values of the top line and the bottom line in the same frame in order to detect an increase or a decrease, thus enabling detecting a frame that has been influenced by an external flash even if the influence of an external flash spans three or more frames. In other words, with the imaging device of the present embodiment, since evaluation values in the same frame are compared, there is no influence from setting conditions such as the iris of the imaging device (a setting of the imaging device is not allowed to change in the middle of a frame), and the evaluation value of an earlier frame is not necessary, thus enabling detecting whether the influence of an external flash is present with less of a delay.

Fourth Embodiment

The configuration of an imaging device of the fourth embodiment is similar to the configuration of the imaging device 2000 of the second embodiment.

The following describes the imaging device of the fourth embodiment with reference to FIGS. 6 to 8, 10, and 13 to 15.

In the imaging device of the present embodiment, the operations of the line determination unit 41, that is to say the operations of the units shown in FIG. 7, are the same as those described in the second embodiment or the third embodiment, and therefore the following describes mainly operations other than those performed by the line determination unit 41.

The imaging signal output from the imaging unit 1 is input to the line determination unit 41, and the line determination unit 41 outputs top line determination information and bottom line determination information corresponding to each frame.

The determination information storage unit 42 stores the bottom line determination information similarly to the second embodiment, and also stores the top line determination information.

Similarly to the second embodiment, normally if the bottom line determination information of the frame one frame earlier stored in the determination information storage unit 42 indicates that the influence of an external flash is present, and furthermore the top line determination information of the current frame that is output from the line determination unit 41 indicates that the influence of an external flash is present, the frame determination unit 43 performs operations for determining that the influence of an external flash is present in the imaging signal of the frame one frame earlier and the imaging signal of the current frame and outputting frame determination information.

On the other hand, if the top line determination information of the current frame stored in the determination information storage unit 42 indicates that the influence of an external flash is present, and furthermore the bottom line determination information of the current frame that is output from the line determination unit 41 indicates that the influence of an external flash is present, the frame determination unit 43 determines that the entirety of the imaging signal of the current frame has been influenced by an external flash, and outputs frame determination information.

Figure 14:
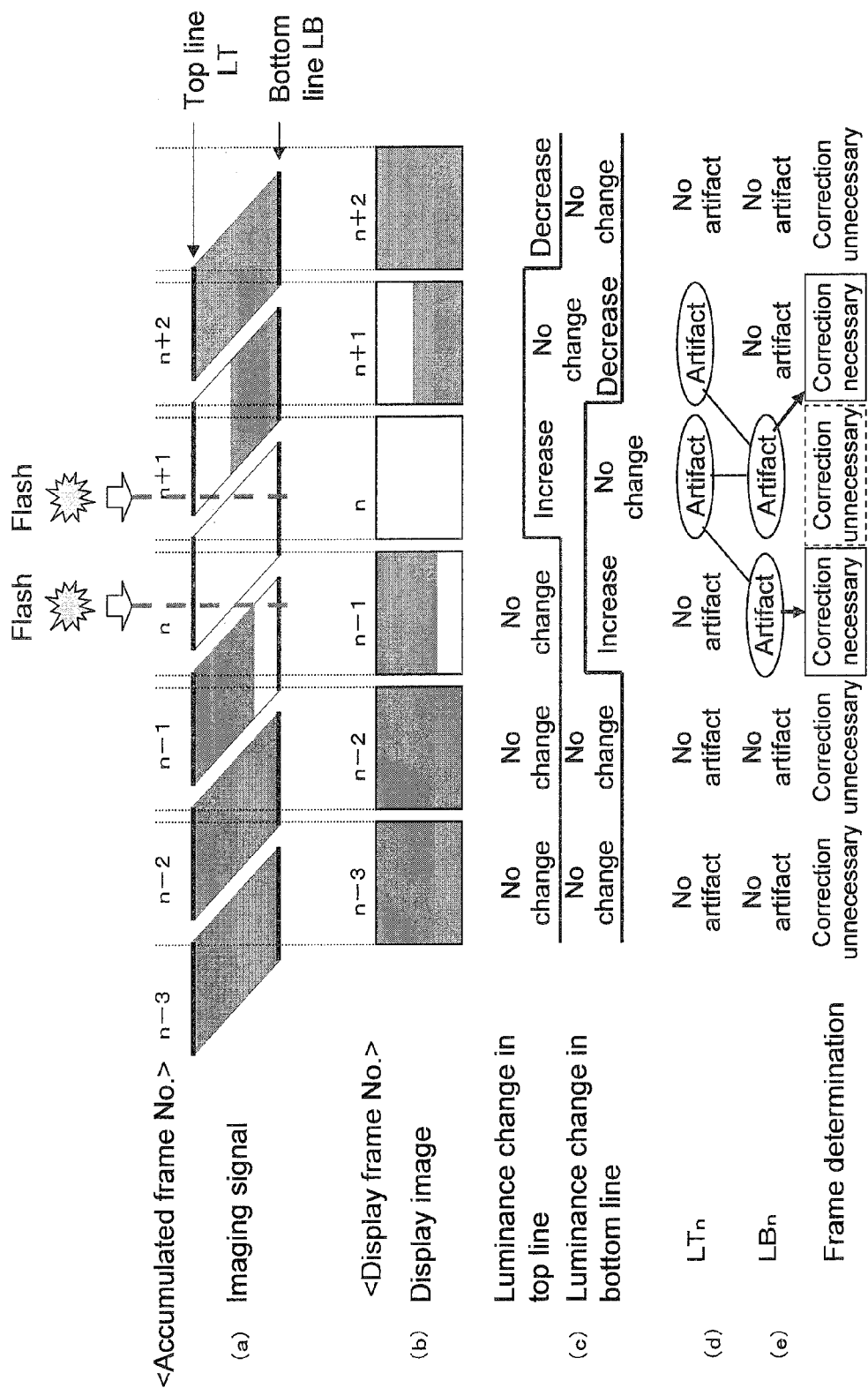
FIG. 14 is a diagram illustrating the influence external flashes have on an imaging signal in an imaging device that uses a CMOS image sensor.

FIGS. 8, 10, and 14 are diagrams showing the influence on imaging signals and output signals (display images to be displayed by a monitor or a viewfinder) in the case where external flashes such as still camera flashes have been emitted at different times during imaging by the imaging unit 1 in the imaging device of the fourth embodiment, in the case where the operations of the line determination unit 41 are the same as those described in the second embodiment.

Figure 15:
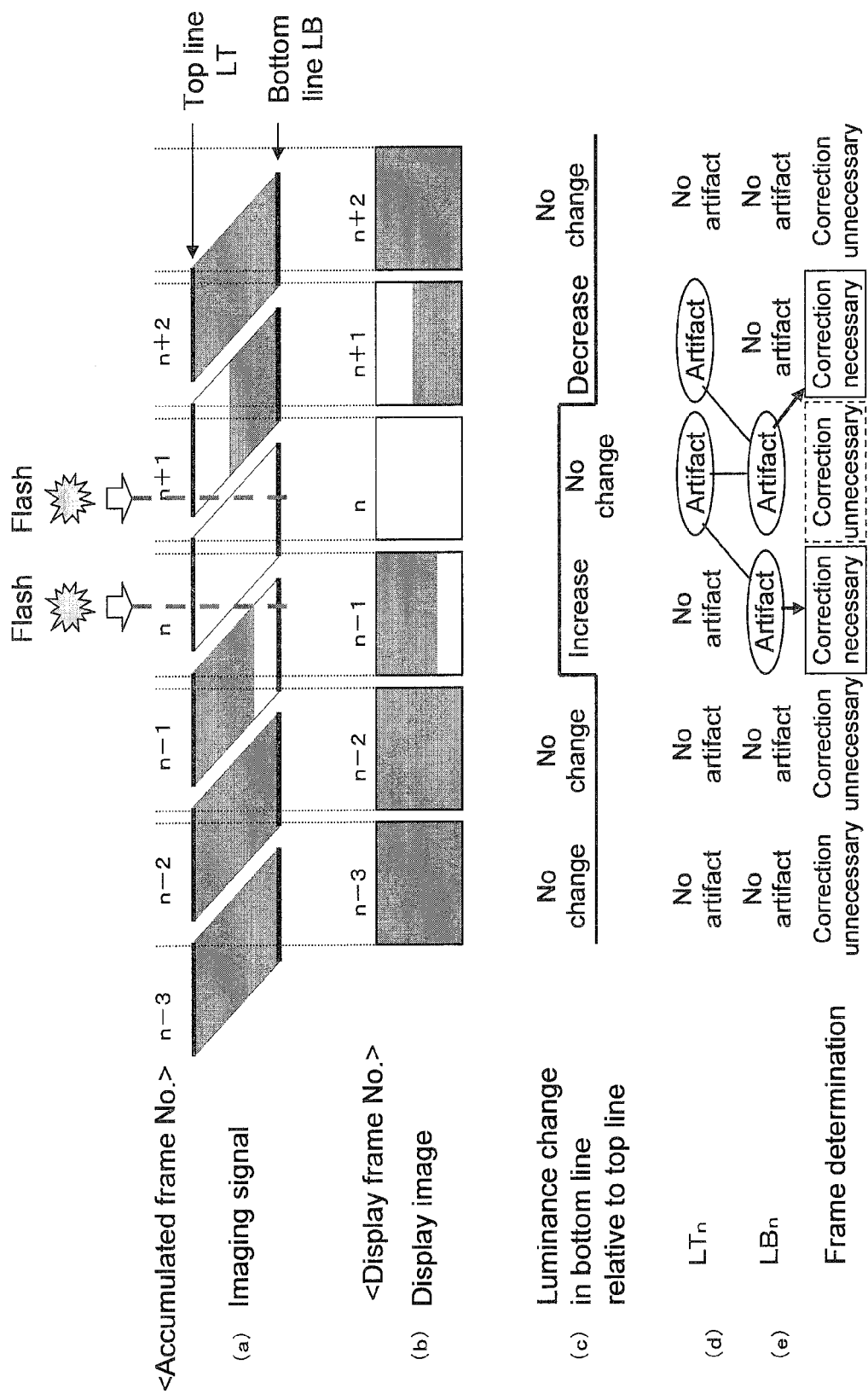
FIG. 15 is a diagram illustrating the influence external flashes have on an imaging signal in an imaging device that uses a CMOS image sensor.

FIGS. 11, 13, and 15 are diagrams showing the influence on imaging signals and output signals (display images to be displayed by a monitor or a viewfinder) in the case where external flashes such as still camera flashes have been emitted at different times during imaging by the imaging unit 1 in the imaging device of the fourth embodiment, in the case where the operations of the line determination unit 41 are the same as those described in the third embodiment.

In both cases, (a) to (d) in the figures are the same as those described in the second embodiment and the third embodiment.

The top line determination information $LT_n$ and the bottom line determination information $LB_n$ shown in (d) of the figures that have been output from the line determination unit 41 are sequentially stored in the determination information storage unit 42 and also supplied to the frame determination unit 43.

In the frame determination unit 43, when the top line determination information $LT_n$ of the current frame has been received as input from the line determination unit 41, the bottom line determination information $LB_{n-1}$ of the frame one frame earlier that is stored in the determination information storage unit 42 is received as input. Then, if $LT_n$ and $LB_{n-1}$ both indicate "artifact", the frame determination unit 43 can determine that the influence of an external signal is present in the imaging signals of the frame one frame earlier and the current frame, but at this point in time, the frame determination unit 43 outputs, as the frame determination information, information indicating "correction necessary" for only the imaging signal of the frame one frame earlier. Specifically, if the current frame is the n-th frame in FIGS. 8, 11, 14, and 15, the frame determination unit 43 determines "correction necessary" for the n−1-th frame.

Subsequently, in the frame determination unit 43, when the bottom line determination information $LB_n$ of the current frame has been received as input from the line determination unit 41, the top line determination information $LT_n$ of the same frame that is stored in the determination information storage unit 42 is received as input, and although $LT_n$ indicates "artifact", the frame determination unit 43 outputs information indicating "correction necessary" as frame determination information for the imaging signal of the current frame only if $LB_n$ indicates "no artifact".

Specifically, if the current frame is the n-th frame in FIGS. 8 and 11, the frame determination unit 43 determines "correction necessary" for the n-th frame.

If the current frame is the n+1-th frame in FIGS. 14 and 15, the frame determination unit 43 determines "correction necessary" for the n+1-th frame. Note that if $LB_n$ indicates "artifact" in addition to $LT_n$, it is assumed that the entirety of the imaging signal has been influenced by an external flash, and the frame determination unit 43 outputs information indicating "correction unnecessary" as the frame determination information for the imaging signal of the current frame. Specifically, if the current frame is the n-th frame in FIGS. 14 and 15, the frame determination unit 43 determines "correction unnecessary" for the n-th frame.

In cases other than those described above, the frame determination unit 43 outputs information indicating "correction unnecessary" as the frame determination information.

Based on the frame determination information output from the frame determination unit 43, the flash correction processing unit 5 subjects the imaging signal of the frame for which "correction necessary" was determined to processing for eliminating or suppressing the influence of an external flash, similarly to the second embodiment and the third embodiment.

Accordingly, if a white band-shaped artifact appears in only the upper portion or lower portion of the screen, the flash correction processing unit 5 subjects the imaging signal to correction processing for eliminating or suppressing the influence of an external flash based on the frame determination information, but does not perform correction processing if the entire screen is uniformly white.

As described above, with the imaging device of the present embodiment, if the entire screen of an imaging signal has been influenced by an external flash, such as the case of an intermediate frame when the influence of an external flash spans three or more frames, or a frame in which an external flash was emitted between the end of the scanning of the bottom line of the imaging signal of the frame one frame earlier and the start of the scanning of the top line of the imaging signal of the current frame, it is possible to acquire a natural image as in the case where imaging is performed by an imaging device using a CCD as the imaging element, and therefore it is possible to make use of the image acquired by imaging as is, without performing processing (processing for correcting the influence of an external flash).

Note that although the case where the luminance levels of imaging signals are used as the evaluation values of respective lines is described in the second to fourth embodiments, there is no limitation to this, and for example, another signal component or value such as the color component or frequency component of an imaging signal or the SN ratio (Signal to Noise Ratio) may be used as the evaluation value as long it changes depending on whether the influence of an external flash is present.

Also, although the case where a determination regarding the influence of an external flash on the top line and the bottom line is made based on a relative difference between the evaluation values of two predetermined lines is described in the second to fourth embodiments, there is no limitation to this, and this determination may be made based on, for example, the absolute magnitudes of the evaluation values of individual lines.

Also, although the case where the evaluation values of two lines, namely the top line and the bottom line, are calculated and compared is described in the second to fourth embodiments, there is no limitation to this, and in order to mitigate the influence of the type and motion of the subject and the influence of noise, it is possible to, for example, calculate and compare the evaluation values of multiple lines at both the top and the bottom of the screen.

Also, there is no need for the lines for which an evaluation value is calculated to necessarily be lines in the effective area of the screen (e.g., 1,080 lines in the case of an HD camera having a total of 1,125 scan lines), and the line for which an evaluation is calculated may be inside the effective area or outside the effective area, as long as it is a line in which an external flash can be received.

Also, although the example where a determination regarding the influence of an external flash is made by comparing evaluation values either between frames or in the same frame is described in the second to fourth embodiments, there is no limitation to this, and for example, this determination may be made reliably by implementing both methods in the same imaging device.

Also, although the case where a determination regarding the influence of an external flash on frames is made based on whether the influence of an external flash is present in the bottom line of the frame one frame earlier and the top line of the current frame is described in the second to fourth embodiments, there is no limitation to this. In the imaging device, by monitoring changes in the presence or absence of the influence of an external flash in the bottom line and the top line over a larger number of frames, it is possible to more reliably determine whether frames have been influenced by an external flash by using a regularity such as the fact that the influence of an external flash starts first at the bottom line of an arbitrary frame, and also starts at the top line of the next frame, then ends first at the bottom line, and also ends at the top line of the next frame.

Fifth Embodiment

<5.1: Configuration of Imaging Device>

Next is a description of a fifth embodiment with reference to FIGS. 16 to 21.

Figure 16:
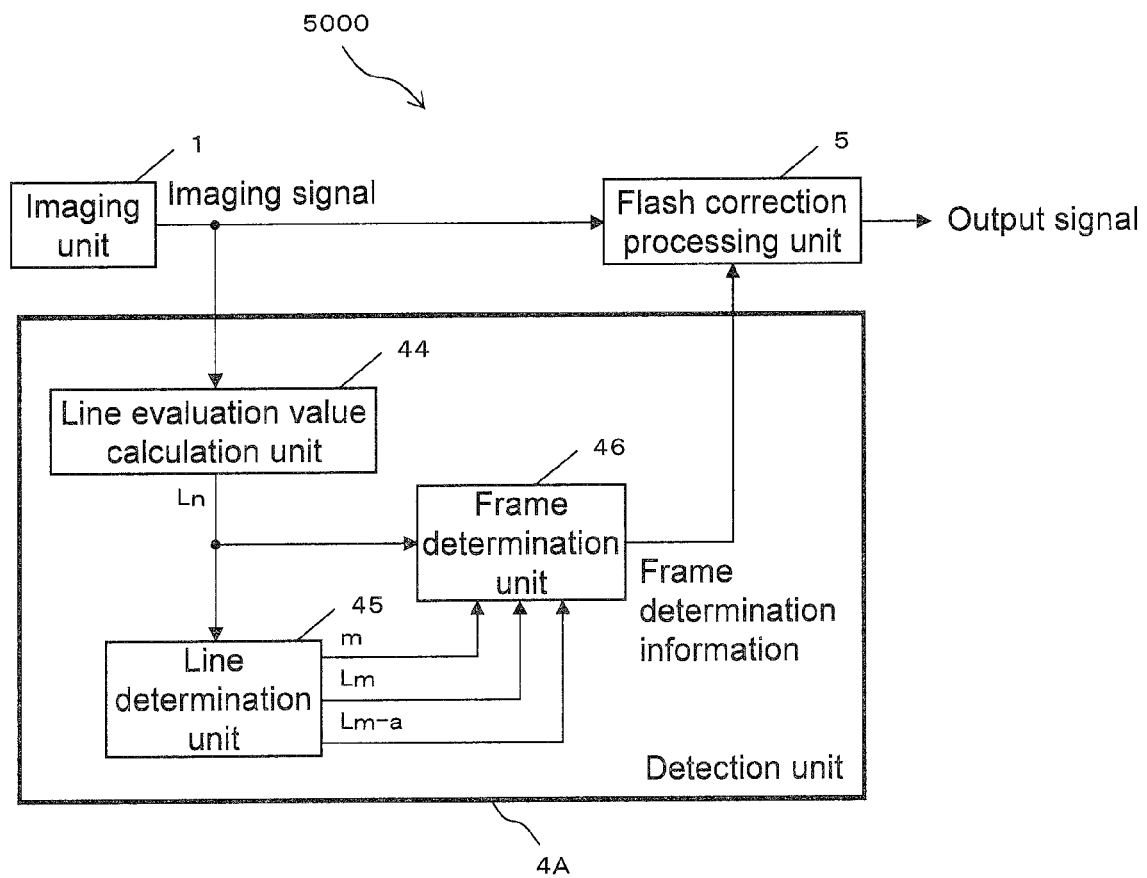
FIG. 16 is a diagram illustrating the schematic configuration of an imaging device according to a fifth embodiment and the second embodiment.

FIG. 16 is a diagram showing the schematic configuration of an imaging device 5000 of the fifth embodiment.

As shown in FIG. 16, the imaging device 5000 includes an imaging unit 1, a detection unit 4A, and a flash correction processing unit 5. Also, the detection unit 4A includes a line evaluation value calculation unit 44, a line determination unit 45, and a frame determination unit 46.

The imaging unit 1 is constituted including an imaging element such as a CMOS image sensor, and the imaging unit 1 acquires an imaging signal by capturing images of a subject, and outputs the acquired imaging signal to the line evaluation value calculation unit 44 and the flash correction processing unit 5. Note that captured images (frame images) are formed by the imaging signal. The captured video can then be displayed by a display device by causing the display device to display a plurality of frame images.

The line evaluation value calculation unit 44 receives an input of the imaging signal output from the imaging unit 1. For each frame (each frame of the captured video formed by the imaging signal), the line evaluation value calculation unit 44 calculates an evaluation value Ln (n being a positive integer indicating the line position) for each line of the imaging signal (each line of the captured image formed by the imaging signal) based on, for example, the average luminance level of that line. The line evaluation value calculation unit 44 then outputs the calculated evaluation values Ln to the line determination unit 45 and the frame determination unit 46.

The line determination unit 45 receives an input of the evaluation values Ln output from the line evaluation value calculation unit 44. The line determination unit 45 detects a line m (m being the line position) at which the evaluation value is greater than the evaluation value of a line that is a lines earlier (a being a positive integer) by a predetermined amount or more, and temporarily stores line position information m and the evaluation values Lm and Lm−α of the line m and the line m−α that is a lines earlier. The line determination unit 45 then outputs the stored and held line position information m and the evaluation values Lm and Lm−α to the frame determination unit 46.

The frame determination unit 46 receives an input of the evaluation values Ln output from the line evaluation value calculation unit 44, and the line position information m and the evaluation values Lm and Lm−α that have been output from the line determination unit 45. In the frame determination unit 46, with respect to the line position information m stored in the line determination unit 45, the evaluation values Lm and Lm−α of the line m and the line m−α that are stored in the line determination unit 45 are compared with the evaluation values L'm and L'm−α of the line m and the line m−α of the imaging signal of a subsequent frame, either between lines or between frames, and thus the frame determination unit 46 determines whether the influence of an external flash is present in each frame and acquires frame determination information indicating the result. The frame determination unit 46 then outputs the acquired frame determination information to the flash correction processing unit 5.

The flash correction processing unit 5 receives an input of the imaging signal output from the imaging unit 1 and the frame determination information output from the frame determination unit 46. Based on the frame determination information, the flash correction processing unit 5 subjects the imaging signal to processing for eliminating or suppressing the influence of an external flash.

(5.1.1: Schematic Configuration of Line Determination Unit 45)

First, the schematic configuration of the line determination unit 45 will be described.

Figure 17:
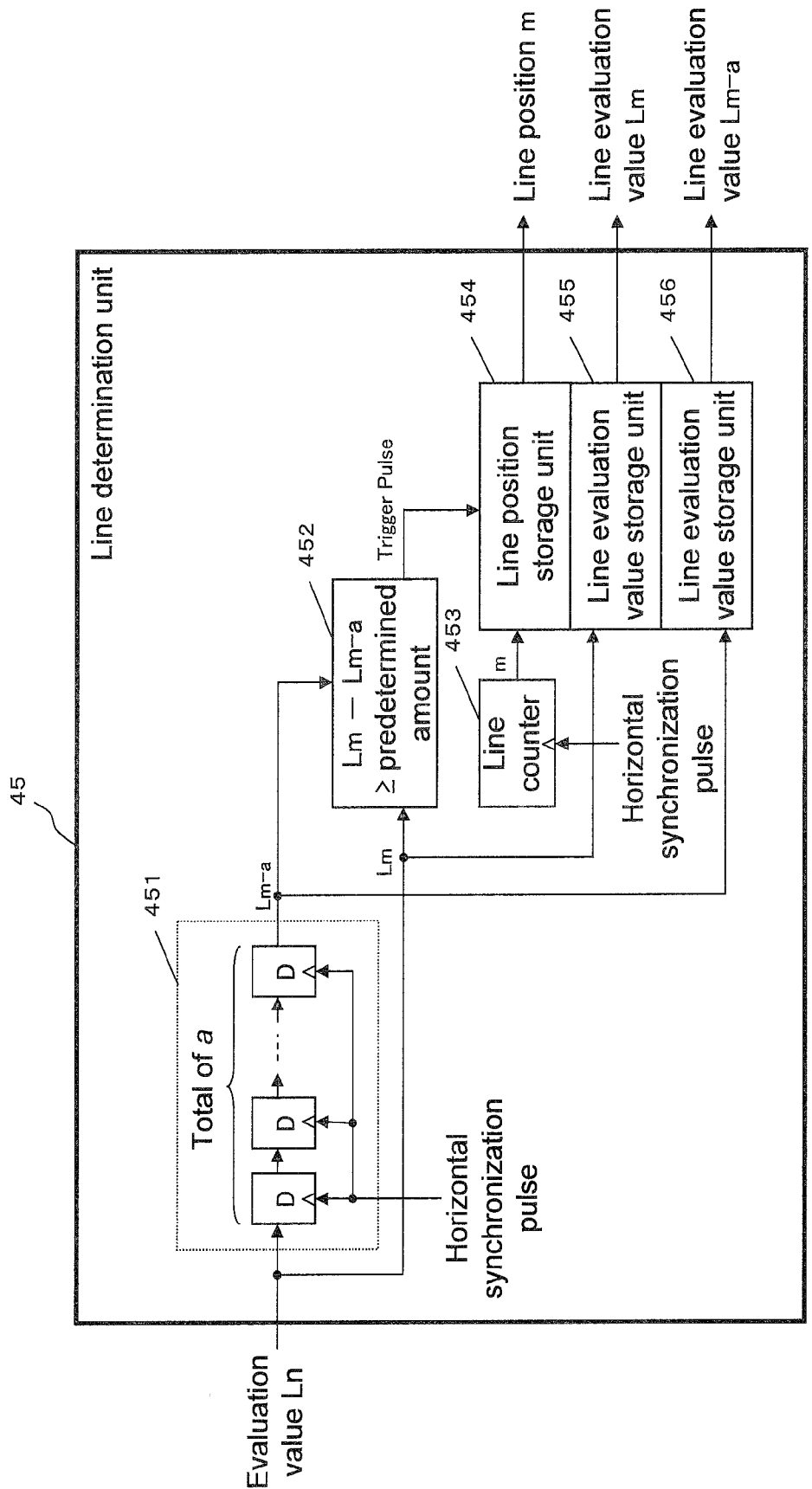
FIG. 17 is a diagram illustrating the schematic configuration of a line determination unit of the imaging device according to the fifth embodiment and the second embodiment.

FIG. 17 is a diagram showing the schematic configuration of the line determination unit 45 shown in FIG. 16.

As shown in FIG. 17, the line determination unit 45 includes an evaluation value shift register unit 451, an evaluation value comparison unit 452, a line counter 453, a line position storage unit 454, and line evaluation value storage units 455 and 456.

The evaluation value shift register unit 451 is a shift register constituted by a flip-flops or the like, and the evaluation value shift register unit 451 receives an input of the evaluation values Ln of the lines calculated by the line evaluation value calculation unit 44 shown in FIG. 16, and in accordance with a horizontal synchronization pulse, transfers the input line evaluation values Ln line-by-line to a next-stage register. The evaluation value shift register unit 451 thus outputs a line evaluation value that has been acquired through register transfer (e.g., the line evaluation value Ln−α (corresponding to the line evaluation value of the line that is a lines earlier than the line n)) to the evaluation value comparison unit 452 and the line evaluation value storage unit 456.

The evaluation value comparison unit 452 receives an input of the line evaluation value Ln output from the line evaluation value calculation unit 44 and the line evaluation value Ln−α output from the evaluation value shift register unit 451. For each line, the evaluation value comparison unit 452 compares the line evaluation value Ln of the line targeted for processing and the line evaluation value Ln−α of the line that is a lines earlier than that line, and generates a trigger pulse if the difference is greater than or equal to a predetermined amount. Specifically, if the following relationship holds, the evaluation value comparison unit 452 generates a trigger pulse and outputs the generated trigger pulse to the line position storage unit 454 and the line evaluation value storage units 455 and 456.

(line evaluation value *Ln*)−(line evaluation value *Ln*−α)≧(predetermined amount)

Note that FIG. 17 shows the case where n=m. It should also be noted that it is preferable that the "predetermined amount" in the above relationship is set so as to ensure sufficient precision in the detection of the presence of an external flash, and it is preferable that the "predetermined amount" is set taking the characteristics of the imaging device into consideration.

The line counter 453 counts the number of lines in accordance with the horizontal synchronization pulse. The line counter 453 also outputs count information indicating the number of lines to the line position storage unit 454. Note that the horizontal synchronization pulse is, for example, a pulse signal generated by a signal generator (not shown) and a timing generator (not shown), and is a pulse signal indicating horizontal synchronization.

The line position storage unit 454 receives an input of the trigger pulse output from the evaluation value comparison unit 452 and the count information indicating the number of lines (corresponding to the line number of the line targeted for processing) that is output from the line counter 453. In accordance with the trigger pulse generated by the evaluation value comparison unit 452, the line position storage unit 454 temporarily stores the line position information m for which the line evaluation values Ln and Ln−α of line n (i.e., the counter value of the line counter 453) and line n−α satisfy the condition described above (here, it is assumed that line m is the line position for which the above-described condition is satisfied). The line position storage unit 454 then outputs the temporarily stored line position information m to the frame determination unit 46. In the following description, it is assumed that the line position for which the line evaluation values Ln and Ln−α satisfy the above-described condition is m (i.e., n=m).

The line evaluation value storage unit 455 receives an input of the line evaluation value Ln output from the line evaluation value calculation unit 44, and temporarily stores the line evaluation value Lm of the line m in accordance with the trigger pulse (the trigger pulse generated when the line evaluation values Ln and Ln−α satisfy the above-described condition). The line evaluation value storage unit 455 then outputs the temporarily stored line evaluation value Lm to the frame determination unit 46.

The line evaluation value storage unit 456 receives an input of the line evaluation value Ln−α output from the evaluation value shift register unit 451, and temporarily stores the line evaluation value Lm−α of the line m−α in accordance with the trigger pulse (the trigger pulse generated when the line evaluation values Ln and Ln−α satisfy the above-described condition). The line evaluation value storage unit 456 then outputs the temporarily stored line evaluation value Lm−α to the frame determination unit 46.

(5.1.2: Schematic Configuration of Frame Determination Unit 446)

Next, the schematic configuration of the frame determination unit 46 will be described.

Figure 18:
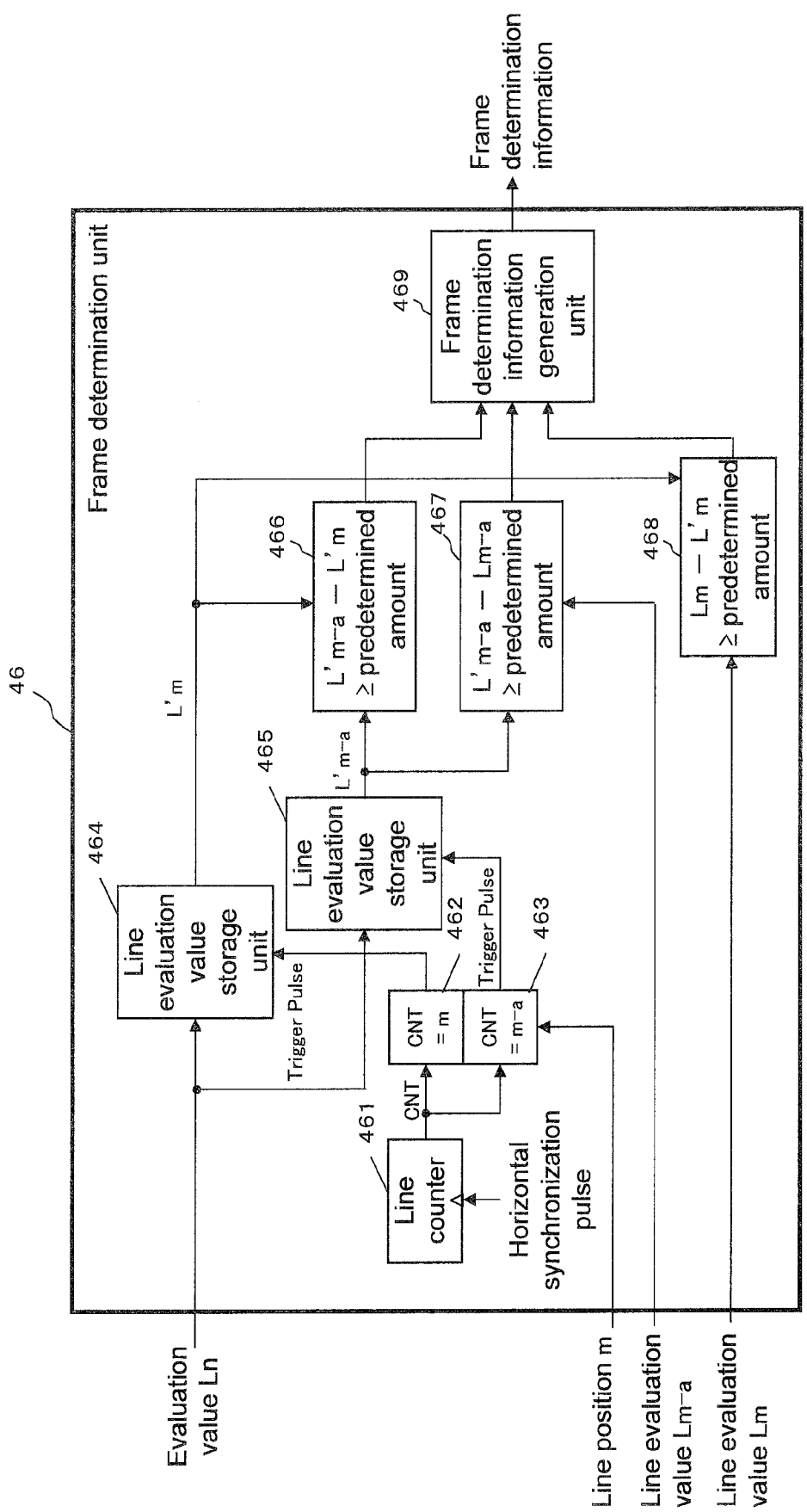
FIG. 18 is a diagram illustrating the schematic configuration of a frame determination unit of the imaging device according to the fifth embodiment and the second embodiment.

FIG. 18 is a diagram showing the schematic configuration of the frame determination unit 46 shown in FIG. 16.

As shown in FIG. 18, the frame determination unit 46 has a line counter 461, counter value comparison units 462 and 463, line evaluation value storage units 464 and 465, evaluation value comparison units 466, 467, and 468, and a frame determination information generation unit 469.

The line counter 461 counts the number of lines in accordance with the horizontal synchronization pulse. The line counter then outputs CNT, which is count information indicating the number of lines, to the counter value comparison units 462 and 463.

The counter value comparison units 462 and 463 generate a trigger pulse when the counter value CNT of the line counter 461 reaches m and m−α, with respect to the line position information m stored in the line determination unit 45 in FIG. 16. Then, the counter value comparison unit 462 outputs the trigger pulse generated at the timing of line m to the line evaluation value storage unit 464. The counter value comparison unit 463 outputs the trigger pulse generated at the timing of line m−α to the line evaluation value storage unit 465.

The line evaluation value storage unit 464 receives an input of the evaluation values Ln of respective lines calculated by the line evaluation value calculation unit 44 in FIG. 16, and temporarily stores the line evaluation value L'm of the line m in accordance with the trigger pulse generated by the counter value comparison unit 462. The line evaluation value storage unit 464 then outputs the line evaluation value L'm to the evaluation value comparison unit 466 and the evaluation value comparison unit 468.

The line evaluation value storage unit 465 receives an input of the evaluation values Ln of respective lines calculated by the line evaluation value calculation unit 44 in FIG. 16, and temporarily stores the line evaluation value L'm−α of the line m−α in accordance with the trigger pulse generated by the counter value comparison unit 463. The line evaluation value storage unit 465 then outputs the line evaluation value L'm−α to the evaluation value comparison unit 466 and the evaluation value comparison unit 467.

Note that the line evaluation value storage units 464 and 465 can be realized by, for example, flip-flops that operate using a trigger pulse.

The evaluation value comparison units 466, 467, and 468 compare the line evaluation values L'm and L'm−α stored in the line evaluation value storage units 464 and 465 respectively with the line evaluation values Lm and Lm−α of the line m and the line m−a stored in the line determination unit 45 in FIG. 16, and raises a flag if a predetermined condition is satisfied. For example, the evaluation value comparison units 466, 467, and 468 raise a flag if the following conditions are satisfied.

(Condition determination in evaluation value comparison unit 466):

(line evaluation value $L'm-\alpha$)−(line evaluation value $L'm$)≥(predetermined amount)

A first flag F1 is set to "1" if the above is satisfied, and otherwise is set to "0".

(Condition determination in evaluation value comparison unit 467):

(line evaluation value $L'm-\alpha$)−(line evaluation value $Lm-\alpha$)≥(predetermined amount)

A second flag F2 is set to "1" if the above is satisfied, and otherwise is set to "0".

(Condition determination in evaluation value comparison unit 468):

(line evaluation value $Lm$)−(line evaluation value $L'm$)≥(predetermined amount)

A third flag F3 is set to "1" if the above is satisfied, and otherwise is set to "0".

It should also be noted that it is preferable that the "predetermined amount" in the above relationship is set so as to ensure sufficient precision in the detection of the presence of an external flash, and it is preferable that the "predetermined amount" is set taking the characteristics of the imaging device into consideration. Also, although it is preferable that the "predetermined amount" is the same in the above three expressions, the "predetermined amount" may be set to different values in the expressions.

Also, needless to say, the three condition determinations shown above are examples, and there is no limitation to this.

Note that the "predetermined amount" in the above three expressions needs only be set to a value that enables appropriately detecting an external flash taking the system performance (camera performance) of the imaging device 5000 into consideration. For example, in the imaging device 5000, the "predetermined amount" may be changed (the "predetermined amount" may be a variably set value) according to the average luminance level of a predetermined image region (predetermined image region formed by an imaging signal) of the imaging signal output from the imaging unit 1 (an imaging signal that has been subjected to processing such as AGC and has been standardized (a video signal that has been adjusted so as to have a desired predetermined dynamic range in the camera system). Also, the "predetermined amount" may be changed (the "predetermined amount" may be a variably set value) for each frame.

The evaluation value comparison units 466, 467, and 468 respectively output the flags F1, F2, and F3 indicating the determination results of the above expressions to the frame determination information generation unit 469.

The frame determination information generation unit 469 generates frame determination information if the flags generated by the evaluation value comparison units 466, 467, and 468 satisfy a predetermined condition, and if none of the flags are raised, the frame determination information generation unit 469 determines that the influence of an external flash basically continues to be that of the previous frame. Specifically, if F1=0, F2=0, and F3=0 when the three condition determinations shown above are made, the frame determination information generation unit 469 determines that the influence of an external flash basically continues to be that of the previous frame.

The frame determination information generation unit 469 then outputs the generated frame determination information to the flash correction processing unit 5.

<5.2: Operations of Imaging Device>

Figure 19:
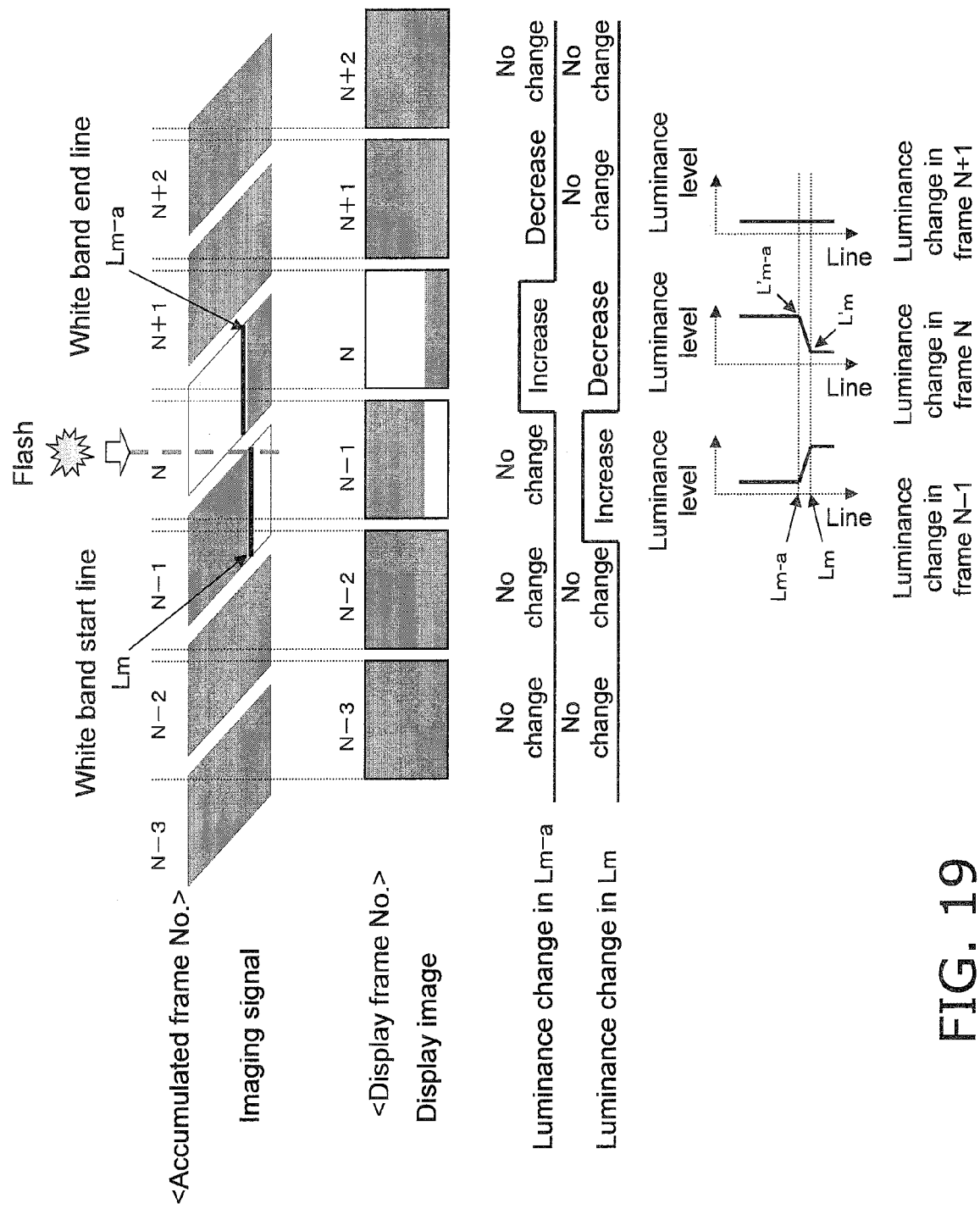
FIG. 19 is a diagram illustrating the influence an external flash has on an imaging signal in an imaging device that uses a CMOS image sensor.
Figure 20:
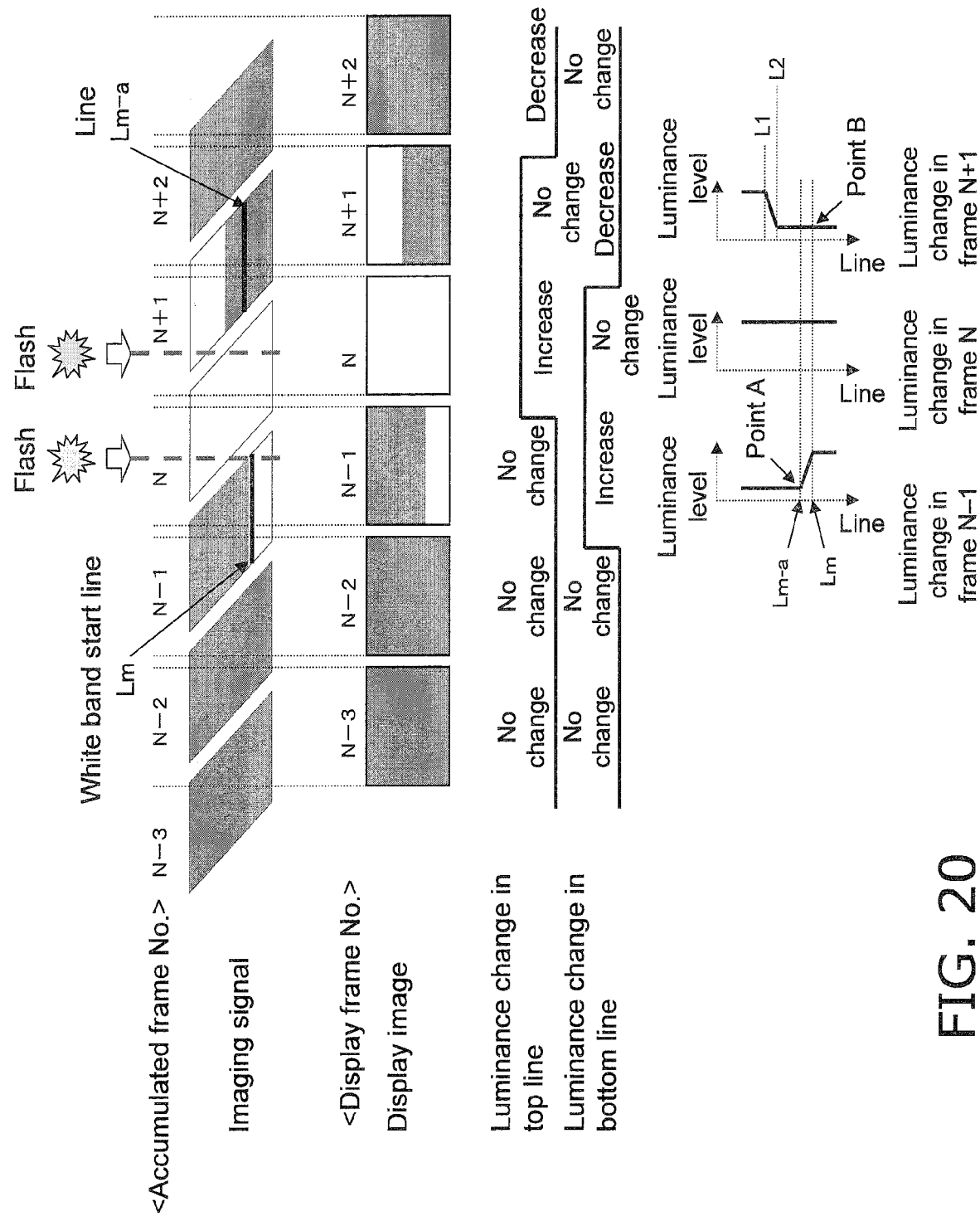
FIG. 20 is a diagram illustrating the influence external flashes have on an imaging signal in an imaging device that uses a CMOS image sensor.
Figure 21:
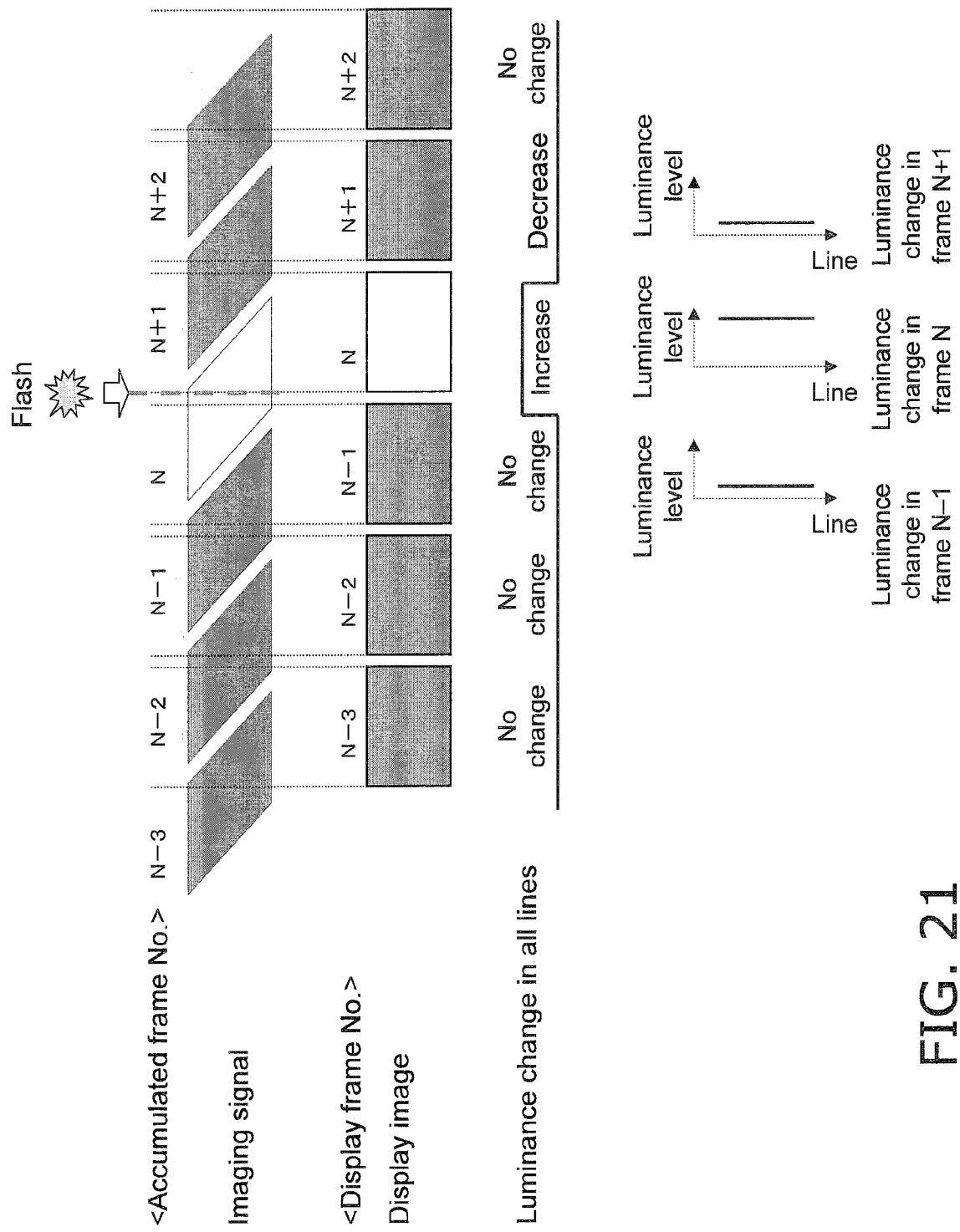
FIG. 21 is a diagram illustrating the influence an external flash has on an imaging signal in an imaging device that uses a CMOS image sensor.

FIGS. 19, 20, and 21 are diagrams showing the influence on an imaging signal and a display image (image formed by an imaging signal) in the case where external flashes such as a still camera flash from have been emitted at different times during imaging.

The following is a description of operations performed by the imaging device 5000 of the fifth embodiment with reference to FIGS. 16 to 21.

In the imaging device 5000, if an external flash is emitted while the N-th (N being an integer) frame is being captured, as shown in FIG. 19, in the imaging signal output from the imaging unit 1, a white band-shaped artifact appears in the lower portion of the image of the N−1-th frame and the upper portion of the image of the N-th frame.

As shown in FIG. 19, in the N−1-th frame, there is almost no influence of an external flash up to the line m−α, the lines from m onward are influenced by almost the entire light quantity of the external flash, and in the lines therebetween (the lines from line m−α to line m), there is a transient period in which the amount of accumulated light gradually increases, depending on the external flash emission period as described in the background art section.

In the N-th frame, the lines up to line m−α are influenced by almost the entire light quantity of an external flash, there is almost no influence of an external flash in the lines from line m onward, and in the lines therebetween (the lines from line m−α to line m), there is a transient period in which the amount of accumulated light gradually decreases.

The line evaluation value calculation unit 44 receives an input of the imaging signal of the N−1-th frame from the imaging unit 1 shown in FIG. 16, and for each line, calculates a line evaluation value Ln and supplies it to the line determination unit 45 and the frame determination unit 46.

In the line determination unit 45, the line evaluation values Ln are input to the evaluation value shift register unit 451 shown in FIG. 17, and are sequentially shifted line-by-line to a next-stage register.

In the evaluation value comparison unit 452, in a period in which there is no influence of an external flash, the difference between the evaluation values of two lines that have been input is less than a predetermined amount that has been appropriately set in advance, but when the evaluation value Lm of the line m of the imaging signal of the N−1-th frame shown in FIG. 19 has been input, the line evaluation value Lm of the line m that is input to the evaluation value comparison unit 452 is greater than the line evaluation value Lm−α of the line m−α by the predetermined amount or more. In other words, the following expression is satisfied.

(line evaluation value $Lm$)−(line evaluation value $Lm-\alpha$)≥(predetermined amount)

Accordingly, in this case, the imaging device 5000 determines that the influence of an external flash has started (the period of influence of an external flash has started), and the evaluation value comparison unit 452 generates a trigger pulse.

The line counter 453 is a counter that is incremented line-by-line, and the counter value thereof corresponds to the number n of the line for which an evaluation value Ln to be input to the line determination unit 45 was calculated. Then, in accordance with the trigger pulse generated by the evaluation value comparison unit 452, the counter value m (m corresponding to the line number at which the trigger pulse was generated) of the line counter 453 is stored in the line position storage unit 454, and the line evaluation values Lm and Lm−α of the line m and the line m−α are stored in the line evaluation value storage units 455 and 456 respectively.

The line evaluation value calculation unit 44 receives an input of the imaging signal of the N-th frame from the imaging unit 1 shown in FIG. 16, and likewise for each line, calculates a line evaluation value Ln and supplies it to the line determination unit 45 and the frame determination unit 46. The frame determination unit 46 receives an input of the line position (line position information) m stored in the line determination unit 45 and the line evaluation values Lm and Lm−α of the line m and the line m−α, and based on the line position information m, the counter value comparison units 462 and 463 shown in FIG. 18 respectively generate a trigger pulse when the counter value of the line counter 461 reaches m and m−α, that is to say, when the line evaluation values L'm and L'm−α of the line m and the line m−α are received as input from the line evaluation value calculation unit 44 in FIG. 16.

In accordance with the trigger pulses generated by the counter value comparison units 462 and 463, the line evaluation value storage units 464 and 465 respectively store the line evaluation values L'm and L'm−α of the line m and the line m−a. Specifically, assuming that the line evaluation values Lm and Lm−α are the line evaluation values of the line m and the line m−α in the K-th (K being an integer) frame, the line evaluation values L'm and L'm−α are the line evaluation values of the line m and the line m−α in the K+1-th frame.

The evaluation value comparison unit 466 raises a flag if the line evaluation value L'm of the line m of the imaging signal of the N-th frame is less than the line evaluation value L'm−α of the line m−α by a predetermined amount or more that has been appropriately set in advance, that is to say if the following expression is satisfied.

(line evaluation value $L'm-\alpha$)−(line evaluation value $L'm$)≥(predetermined amount)

The evaluation value comparison unit 467 raises a flag if the line evaluation value L'm−α of the line m−α of the imaging signal of the N-th frame is greater than the line evaluation value Lm−α of the line m−α of the imaging signal of the N−1-th frame by a predetermined amount or more that has been appropriately set in advance, that is to say if the following expression is satisfied.

(line evaluation value $L'm-\alpha$)−(line evaluation value $Lm-\alpha$)≥(predetermined amount)

The evaluation value comparison unit 468 raises a flag if the line evaluation value L'm of the line m of the imaging signal of the N-th frame is less than the line evaluation value Lm of the line m of the imaging signal of the N−1-th frame by a predetermined amount or more that has been appropriately set in advance, that is to say if the following expression is satisfied.

(line evaluation value $Lm$)−(line evaluation value $L'm$)≥(predetermined amount)

If the above three flags are all raised, the frame determination information generation unit 469 determines that the influence of an external flash is present in the imaging signals of the N−1-th and N-th frames, generates frame determination information, and outputs the generated frame determination information to the flash correction processing unit 5.

Based on the frame determination information output by the frame determination unit 46, the flash correction processing unit 5 shown in FIG. 16 then subjects the imaging signals to processing for eliminating or suppressing the influence of an external flash.

<<Case of Two External Flashes>>

Next is a description of operations performed by the imaging device 5000 in the case of two external flashes being emitted in two frame periods.

If an external flash is emitted while the N-th frame is being captured, and another external flash is emitted while the imaging signal is being influenced by the other external flash, as shown in FIG. 20, in the imaging signal output from the imaging unit 1, a white band-shaped artifact appears spanning three frames, namely in the lower portion of the image of the N−1-th frame, the entire screen of the N-th frame, and the upper portion of the image of the N+1-th frame.

As shown in FIG. 20, in the N−1-th frame, there is almost no influence of an external flash up to the line m−α, the lines from m onward are influenced by almost the entire light quantity of the external flash, and in the lines therebetween, there is a transient period in which the amount of accumulated light gradually increases, as described in the background art.

In the N-th frame, before readout of the line m−α, at which the influence of the first external flash starts to end, the next external flash is emitted, and therefore the influence of an external flash does not end from the middle of the screen (the influence of an external flash does not disappear).

In the N+1-th frame, up to a line before the line m−α (the line L1 shown in FIG. 20), the influence of almost the entire light quantity of an external flash is present, and at a line before the line m (the line L2 shown in FIG. 20), the influence of an external flash has ended (the influence of an external flash disappears).

In this case as well, portions of the imaging device 5000 of the present embodiment operate similarly the above-described case, with the exception of the frame determination unit 46 shown in FIG. 16.

Upon receiving an input of the imaging signal of the N−1-th frame from the imaging unit 1 shown in FIG. 16, the line determination unit 45 stores the line position information m and the line evaluation values Lm and Lm−α of the line m and the line m−α, similarly to the above-described case.

When the frame determination unit 46 receives the imaging signal of the N-th frame, the units shown in FIG. 18 operate similarly to the case described above based on the line position information m received as input from the line determination unit 45, and in the N-th frame, the line evaluation value does not decrease by an amount greater than or equal to the predetermined value from the middle of the screen, and therefore only the evaluation value comparison unit 467 raises a flag. In this case, the frame determination information generation unit 469 determines that the influence of an external flash has started in the imaging signal of the N−1-th frame, determines that the influence of an external flash continues in the imaging signal of the N-th frame, and outputs frame determination information.

When the frame determination unit 46 receives the imaging signal of the N+1-th frame, the units shown in FIG. 18 operate similarly to the case described above based on the line position information m received as input from the line determination unit 45, and in the N+1-th frame, the line evaluation value decreases at a line before the line m (the line evaluation value starts to decrease from the line L1 in FIG. 20), and therefore the evaluation value comparison unit 468 raises a flag. In other words, the evaluation value comparison unit 468 raises a flag at the timing of the line m of the N+1-th frame.

In this case, the frame determination information generation unit 469 determines that the influence of an external flash on the imaging signal of the N+1-th frame has ended, and outputs frame determination information.

Specifically, in the imaging device 5000, in the case where an external flash has been emitted twice in two frame periods as shown in FIG. 20, the period from point A (line m−α of the N−1-th frame) to point B (line m of the N+1-th frame) shown in FIG. 20 is detected as the period during which the influence of an external flash is present.

Based on the frame determination information output by the frame determination unit 46, the flash correction processing unit 5 shown in FIG. 16 then subjects the imaging signal to processing for eliminating or suppressing the influence of an external flash.

<<Case where External Flash is Emitted Between End of Scan of Bottom Line of N−1-th Frame and Start of Scan of Top Line of Imaging Signal of N-th Frame>>

Next is a description of operations performed by the imaging device 5000 in the case where an external flash is emitted between the end of the scanning of the bottom line of the imaging signal of the N−1-th frame and the start of the scanning of the top line of the imaging signal of the N-th frame.

If an external flash is emitted between the end of the scanning of the bottom line of the imaging signal of the N−1-th frame and the start of the scanning of the top line of the imaging signal of the N-th frame, as shown in FIG. 21, in the imaging signal output from the imaging unit 1, a white band-shaped artifact appears in the entire screen of the N-th frame.

In such a case, in the imaging device 5000 of the present embodiment, the line determination unit 45 shown in FIG. 16 neither detects nor stores the line including the influence of an external flash, and the frame determination unit 46 does not output frame determination information indicating that the influence of an external flash is present. For this reason, the flash correction processing unit 5 does not subject the imaging signal to processing for eliminating or suppressing the influence of an external flash. However, in this case, the entire screen of the image captured by the imaging device 5000 is uniformly white, and a natural image is obtained as in the case of performing imaging with an imaging device that uses a CCD image sensor as the imaging element, and therefore there is no particular need for processing in the imaging device 5000.

Note that although the imaging device 5000, the line determination unit 45, and the frame determination unit 46 of the present embodiment have been described with reference to FIGS. 16, 17, and 18, they can, needless to say, have other appropriate configurations without departing from the spirit of the invention.

Note that although the case where the luminance levels of imaging signals are used as the evaluation values of respective lines is described in the present embodiment, there is no limitation to this, and for example, another signal component or value such as the color component or frequency component of an imaging signal or the SN ratio (Signal to Noise Ratio) may be used as the evaluation value as long it changes depending on whether the influence of an external flash is present.

As described above, with the imaging device 5000 of the present embodiment, a line on which focus is to be placed is specified by first detecting a steep change in evaluation value in the line direction (line evaluation values), and thereafter only the specified line is monitored, thus enabling appropriately detecting a portion (imaging signal) that has been influenced by an external flash. In other words, with the imaging device 5000, regardless of the timing when an external flash is emitted (regardless of the line at which the influence of an external flash starts), only the line position and the line evaluation value need to be stored, thus eliminating the need for a frame memory or the like, and enabling the comparison of evaluation values (line evaluation values) between frames, and employing the regularity of the change in evaluation value (line evaluation value) in both the line direction and the frame direction of the image enables more reliably determining whether the influence of an external flash is present.

Sixth Embodiment

Next is a description of a sixth embodiment.

FIGS. 16, 17, and 18 show the schematic configuration of an imaging device, a line determination unit, and a frame determination unit of the sixth embodiment as well. The basic configurations and operations of various units in FIGS. 16, 17, and 18 are similar to those described in the fifth embodiment, and therefore the following describes mainly differing portions.

In FIG. 16, the imaging unit 1 includes imaging elements such as CMOS image sensors for three channels, which obtain G (green), B (blue), and R (red) primary color signals, respectively, and the imaging unit 1 captures images of a subject and outputs imaging signals for the three channels.

For each frame, the line evaluation value calculation unit 44 calculates a line evaluation value LGn, LBn, and LRn (n being the line position) independently for each line based on the average signal level or the like of the respective lines of the imaging signals for the three channels.

The line determination unit 45 detects the line m (m being the line position) at which the line evaluation values for the three channels are all greater than the line evaluation values of the line that is a lines earlier (a being a positive integer) by respective predetermined amounts or more, and temporarily stores the line position information m and the line evaluation values LGm, LBm, and LRm, and LGm−α, LBm−α, and LRm−α of the line m and the line m−α that is a lines earlier.

In the frame determination unit 46, with respect to the line position information m stored in the line determination unit 45, the evaluation values LGm, LBm, and LRm, and LGm−α, LBm−α, and LRm−α of the line m and the line m−α that are stored in the line determination unit 45 are compared with the evaluation values LG'm, LB'm, and LR'm, and LG'm−α, LB'm−α, and LR'm−α of the line m and the line m−α of the imaging signal of a subsequent frame, either between lines or between frames, and thus the frame determination unit 46 determines whether the influence of an external flash is present in each frame and outputs frame determination information indicating the result.

Based on the frame determination information, the flash correction processing unit 5 subjects the imaging signal to processing for eliminating or suppressing the influence of an external flash.

FIG. 17 is a diagram showing the schematic configuration of the line determination unit 45 shown in FIG. 16.

The evaluation value shift register unit 451 is a shift register constituted by a flip-flops or the like, and the evaluation value shift register unit 451 receives an input of the evaluation values LGn, LBn, and LRn of the respective lines calculated by the line evaluation value calculation unit 44 shown in FIG. 16, and in accordance with a horizontal synchronization pulse, transfers the input line evaluation values line-by-line to a next-stage register.

For each line, the evaluation value comparison unit 452 outputs a trigger pulse if the evaluation values are greater than the line evaluation values of the three channels of the line that is a lines earlier by the respective predetermined amounts or more.

In accordance with the trigger pulse generated by the evaluation value comparison unit 452, the line position storage unit 454 temporarily stores the line position information m for which the line evaluation values LGm, LBm, and LRm, and LGm−α, LBm−α, and LRm−a of the line m (i.e., the counter value of the line counter 453) and the line m−α satisfy the condition described above.

Similarly, in accordance with the trigger pulse, the line evaluation value storage units 455 and 456 temporarily store the line evaluation values LGm, LBm, and LRm, and LGm−α, LBm−α, and LRm−α of the line m and the line m-a.

FIG. 18 is a diagram showing the schematic configuration of the frame determination unit 46 shown in FIG. 16.

The counter value comparison units 462 and 463 generate a trigger pulse when the counter value of the line counter 461 reaches m and m−α, with respect to the line position information m stored in the line determination unit 45 in FIG. 16.

The line evaluation value storage units 464 and 465 receive an input of the line evaluation values LGn, LBn, and LRn of the respective lines calculated by the line evaluation value calculation unit 44 in FIG. 16, and in accordance with the trigger pulses generated by the counter value comparison units 462 and 463 respectively, temporarily stores the line evaluation values LG'm, LB'm, and LR'm, and LG'm−α, LB'm−α, and LR'm−α of the line m and the line m-a.

The evaluation value comparison units 466, 467, and 468 compare the line evaluation values LG'm, LB'm, and LR'm, and LG'm−α, LB'm−α, and LR'm−α stored in the line evaluation value storage units 464 and 465 respectively with the line evaluation values LGm, LBm, and LRm, and LGm−α, LBm−α, and LRm−α of the line m and the line m−α stored in the line determination unit 45 in FIG. 16, and raises a flag if the line evaluation values of all of the channels satisfy a predetermined condition. The predetermined condition is the same as that described in the fifth embodiment. Note that the present embodiment differs from the fifth embodiment in that the determination of a line evaluation value using the predetermined condition is performed for the three channels R, G, and B.

The frame determination information generation unit 469 generates frame determination information if the flags generated by the evaluation value comparison units 466, 467, and 468 satisfy a predetermined condition, and if none of the flags are raised, the frame determination information generation unit 469 determines that the influence of an external flash basically continues to be that of the previous frame.

The imaging device of the present embodiment differs from the imaging device 5000 of the fifth embodiment in that line evaluation values are calculated based on three channels, namely the primary color signals G, B, and R, and the evaluation value comparison units of the line determination unit 45 and the frame determination unit 46 determine that the influence of an external flash is present if the line evaluation values of all three channels satisfy a predetermined condition at the same time. In the imaging device of the sixth embodiment, the operations performed in the case where an external flash has been emitted at the time shown in FIGS. 19, 20, and 21 are the similar to those described in the fifth embodiment, with the exception of the differences described above. Since the influence of an external flash starts and stops at the same times in the imaging signals for all of the primary color signal channels, the imaging device of the present embodiment can more reliably determine whether the influence of an external flash is present regardless of the type of subject.

Note that although the imaging device, the line determination unit, and the frame determination unit of the present embodiment have been described with reference to FIGS. 16, 17, and 18, they can, needless to say, have other appropriate configurations without departing from the spirit of the invention.

Note that although the case where the signal levels of primary color signals G, B, and R are used as the evaluation values of respective lines is described in the present embodiment, there is no limitation to this, and for example, another signal component or value such as the color component or frequency component of an imaging signal or the SN ratio may be used as the evaluation value as long it changes depending on whether the influence of an external flash is present.

Also, although the case where the present invention is applied to the imaging signals of the three channels R, B, and B is described above, there is no limitation to this, and the present invention may be applied to, for example, imaging signals for three channels corresponding to the subtractive colors yellow, magenta, and cyan. Furthermore, the present invention may be applied to imaging signals of four channels (e.g., the R channel, G1 channel, G2 channel, and B channel) or more.

As described above, with the imaging device of the present embodiment, a line on which focus is to be placed is specified by first detecting a steep change in evaluation value in the line direction (line evaluation values), and thereafter only the specified line is monitored, thus enabling appropriately detecting a portion (imaging signal) that has been influenced by an external flash. In other words, with the imaging device of the present embodiment, regardless of the timing at which an external flash is emitted (regardless of the line at which the influence of an external flash starts), only the line position and the line evaluation value need to be stored, thus eliminating the need for a frame memory or the like, and enabling the comparison of evaluation values (line evaluation values) between frames. Furthermore, employing the line evaluation values of imaging signals of multiple channels enables suppressing the erroneous detection of the influence of an external flash, and employing the regularity of the change in evaluation value (line evaluation value) in both the line direction and the frame direction of the image enables more reliably determining whether the influence of an external flash is present.

Seventh Embodiment

Next is a description of a seventh embodiment.
<7.1: Configuration of Imaging Device>
FIG. 22 is a diagram showing the schematic configuration of an imaging device 7000 of the seventh embodiment.

Figure 22:
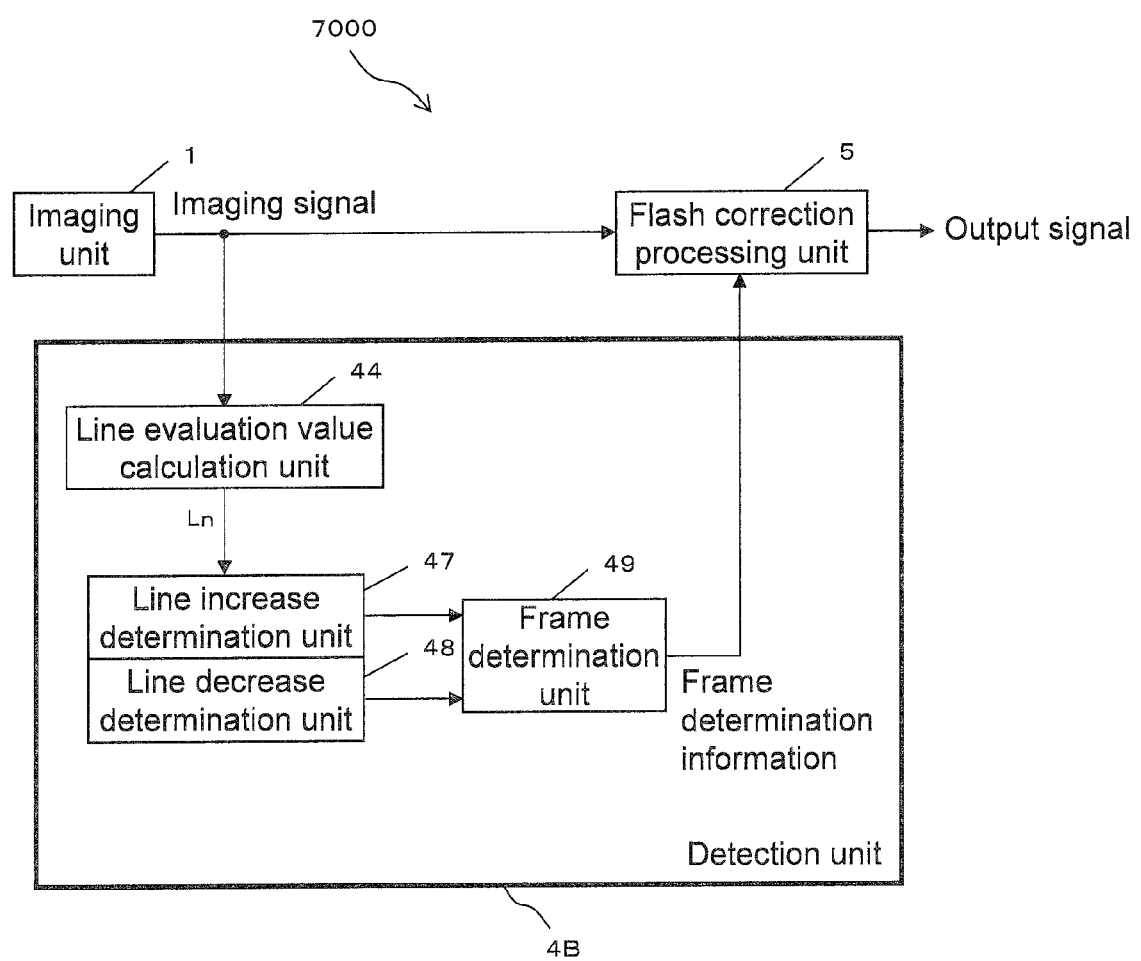
FIG. 22 is a diagram illustrating the schematic configuration of an imaging device according to a seventh embodiment and an eighth embodiment.

As shown in FIG. 22, the imaging device 7000 includes an imaging unit 1, a detection unit 4B, and a flash correction processing unit 5. Also, the detection unit 4B includes a line evaluation value calculation unit 44, a line increase determination unit 47, a line decrease determination unit 48, and a frame determination unit 49. Note that the same reference signs have been given to portions that are the same as those of the previously described embodiments, and a detailed description thereof will not be given.

The line increase determination unit 47 raises a flag upon detecting a line m1 (m1 being the line position) at which the line evaluation value is greater than the line evaluation value of a line that is a lines earlier (a being a positive integer) by a predetermined amount or more. In other words, the line increase determination unit 47 raises a flag if the following expression is satisfied.

$$(\text{line evaluation value } Ln) - (\text{line evaluation value } Ln-\alpha) \geq (\text{predetermined amount})$$

The line decrease determination unit 48 raises a flag upon detecting a line m2 (m2 being the line position) at which the line evaluation value is less than the line evaluation value of a line that is b lines earlier (b being a positive integer) by a predetermined amount or more. In other words, the line decrease determination unit 48 raises a flag if the following expression is satisfied.

(line evaluation value $Ln-b$)−(line evaluation value $Ln$)≥(predetermined amount)

If the flag output from the line increase determination unit 47 is raised, the frame determination unit 49 determines that the influence of an external flash on the imaging signal of that frame has started, if the flag output from the line decrease determination unit 48 is raised, the frame determination unit 49 determines that the influence of an external flash on the imaging signal of that frame has ended, and the frame determination unit 49 outputs frame determination information indicating the determination results to the flash correction processing unit 5.

(7.1.1: Schematic Configuration of Line Increase Determination Unit 47)

Figure 23:
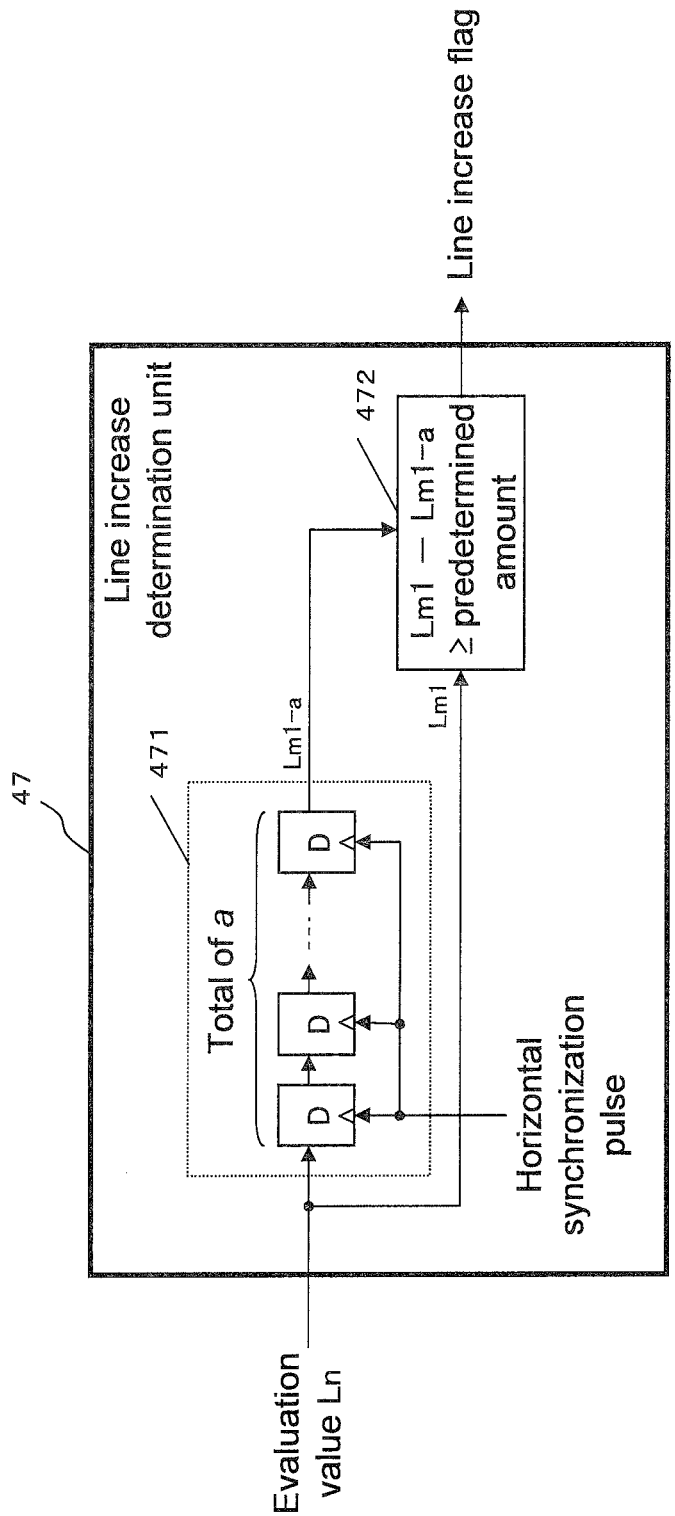
FIG. 23 is a diagram illustrating the schematic configuration of a line increase determination unit of the imaging device according to the seventh embodiment and the eighth embodiment.

FIG. 23 is a diagram showing the schematic configuration of the line increase determination unit 47.

As shown in FIG. 23, the line increase determination unit 47 includes an evaluation value shift register unit 471, and an evaluation value comparison unit 472.

The evaluation value shift register unit 471 operates similarly to the evaluation value shift register unit 451 in FIG. 17.

For each line, the evaluation value comparison unit 472 raises a flag if the line evaluation value of the line targeted for processing is greater than the line evaluation value of the line that is a lines earlier by a predetermined amount or more.

(7.1.2: Schematic Configuration of Line Decrease Determination Unit 48)

Figure 24:
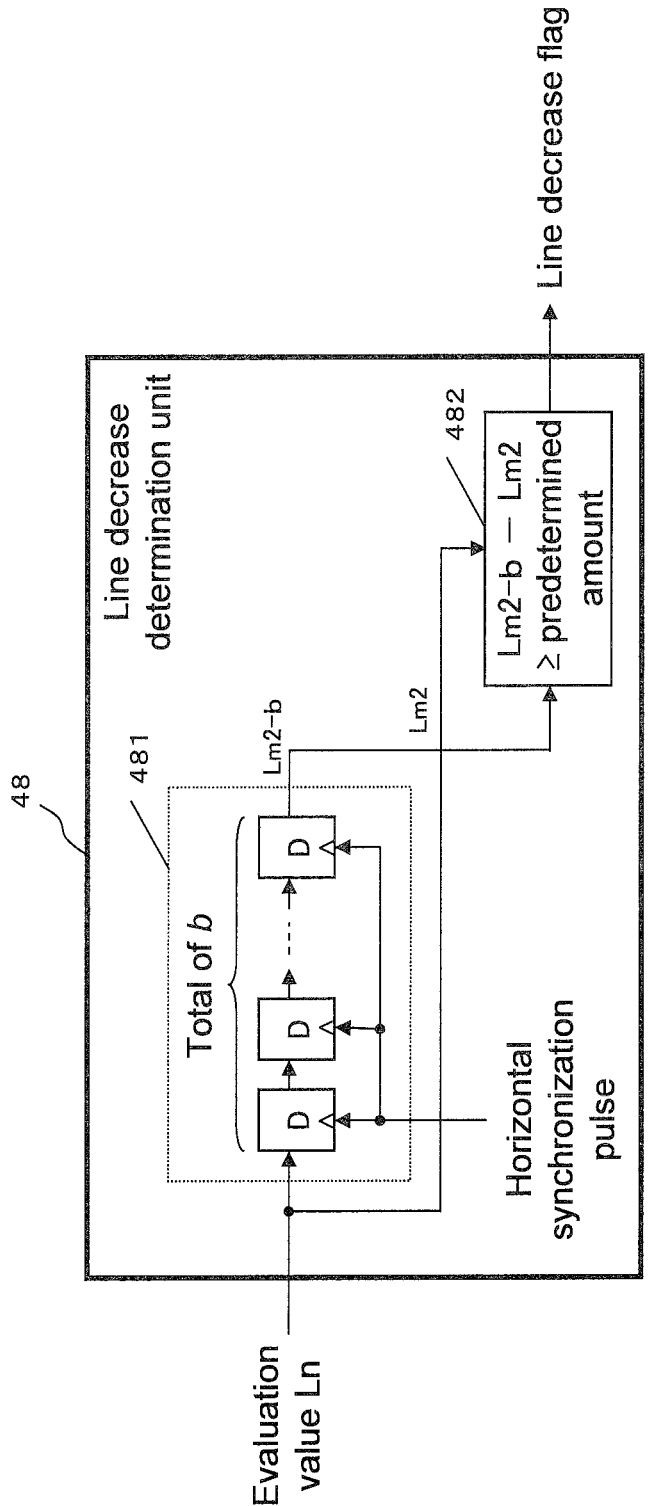
FIG. 24 is a diagram illustrating the schematic configuration of a line decrease determination unit of the imaging device according to the seventh embodiment and the eighth embodiment.

FIG. 24 is a diagram showing the schematic configuration of the line decrease determination unit 48.

As shown in FIG. 24, the line decrease determination unit 48 includes an evaluation value shift register unit 481, and an evaluation value comparison unit 482.

The evaluation value shift register unit 481 operates similarly to the evaluation value shift register unit 451 in FIG. 17.

For each line, the evaluation value comparison unit 482 raises a flag if the line evaluation value of the line targeted for processing is less than the line evaluation value of the line that is b lines earlier by a predetermined amount or more.

<7.2: Operations of Imaging Device>

The following is a description of operations performed by the imaging device 7000 of the seventh embodiment with reference to FIGS. 22 to 24, and 19 to 21.

In the imaging device 7000, if an external flash is emitted at the time shown in FIG. 19, in the line increase determination unit 47, the line evaluation values Ln received as input from the line evaluation value calculation unit 44 are input to the evaluation value shift register unit 471 shown in FIG. 23, and are sequentially shifted line-by-line to a next-stage register.

In the evaluation value comparison unit 472, in a period in which there is no influence of an external flash, the difference between the line evaluation values of two lines that have been input is less than a predetermined amount that has been appropriately set in advance, but when the evaluation value Lm1 of the line m (here, assumed to the line m1) of the imaging signal of the N−1-th frame shown in FIG. 19 has been input, the line evaluation value Lm1 of the line m1 that is input to the evaluation value comparison unit 472 is greater than the line evaluation value Lm1−a of the line m1−a by the predetermined amount or more. For this reason, at this time, the evaluation value comparison unit 472 raises a flag (line increase flag) indicating that the influence of an external flash has started.

Then, in accordance with this flag (line increase flag), the frame determination unit 49 determines that the influence of an external flash on the imaging signal of the N−1-th frame has started, and generates frame determination information.

On the other hand, in the line decrease determination unit 48, the line evaluation values Ln received as input from the line evaluation value calculation unit 44 are input to the evaluation value shift register unit 481 shown in FIG. 24, and are sequentially shifted line-by-line to a next-stage register.

In the evaluation value comparison unit 482, when the evaluation value Lm2 of the line m (here, assumed to the line m2) of the imaging signal of the N-th frame shown in FIG. 19 has been input, the line evaluation value Lm2 of the line m2 that is input to the evaluation value comparison unit 482 is less than the line evaluation value Lm2−b of the line m2−b by the predetermined amount or more, and therefore the evaluation value comparison unit 482 raises a flag (line decrease flag) indicating that the influence of an external flash has ended.

Then, in accordance with this flag (line decrease flag), the frame determination unit 49 determines that the influence of an external flash on the imaging signal of the N-th frame has ended, and generates frame determination information.

In the case where an external flash has been emitted at the time shown in FIG. 19, the line position information m1 and m2 normally indicate the same line.

Based on the frame determination information output by the frame determination unit 49, the flash correction processing unit 5 shown in FIG. 22 then subjects the imaging signal to processing for eliminating or suppressing the influence of an external flash.

Similarly, also in the case where external flashes are emitted at the times shown in FIG. 20, when the line increase determination unit 47 has received an input of the imaging signal of the N−1-th frame, the evaluation value comparison unit 472 raises a flag (line increase flag) when the line evaluation value Lm1 of the line m (here, assumed to be the line m1) is input.

Then, in accordance with this flag (line increase flag), the frame determination unit 49 determines that the influence of an external flash on the imaging signal of the N−1-th frame has started, and generates frame determination information.

On the other hand, when the line decrease determination unit 48 has received an input of the imaging signal of the N+1-th frame, when the evaluation value comparison unit 482 has received an input of the evaluation value Lm2 of the line m2 that is before the line m (herein, assumed to be the line m1), the line evaluation value Lm2 is less than the line evaluation value Lm2−b of the line that is b lines earlier by the predetermined amount or more, and therefore the evaluation value comparison unit 482 raises a flag (line decrease flag) indicating that the influence of an external flash has ended.

Then, in accordance with this flag (line decrease flag), the frame determination unit 49 determines that the influence of an external flash on the imaging signal of the N+1-th frame has ended, and generates frame determination information.

In the case where external flashes have been emitted at the times shown in FIG. 20, the line position information m2 normally indicates a line before m1.

Based on the frame determination information output by the frame determination unit 49, the flash correction processing unit 5 shown in FIG. 22 then subjects the imaging signal to processing for eliminating or suppressing the influence of an external flash.

In the case where an external flash is emitted at the time shown in FIG. 21, in the imaging device 7000 of the present embodiment, the line increase determination unit 47 and the line decrease determination unit 48 do not detect a line including the influence of an external flash, and the frame determination unit 49 does not output frame determination information indicating that the influence of an external flash is present. For this reason, in the imaging device 7000, the flash correction processing unit 5 does not subject the imaging signal to processing for eliminating or suppressing the influence of an external flash. However, in this case, the entire screen of the image captured by the imaging device 7000 is uniformly white, and a natural image is obtained as in the case of performing imaging with an imaging device that uses a CCD image sensor as the imaging element, and therefore there is no particular need for processing in the imaging device 7000.

Note that although the imaging device, the line increase determination unit, and the line decrease determination unit of the present embodiment have been described with reference to FIGS. 22, 23, and 24, they can, needless to say, have other appropriate configurations without departing from the spirit of the invention.

Note that although the case where the luminance levels of imaging signals are used as the evaluation values of respective lines is described in the present embodiment, there is no limitation to this, and for example, another signal component or value such as the color component or frequency component of an imaging signal or the SN ratio (Signal to Noise Ratio) may be used as the evaluation value as long it changes depending on whether the influence of an external flash is present.

As described above, with the imaging device 7000 of the present embodiment, the frame in which the influence of an external flash has started is detected by detecting a steep increase in evaluation value in the line direction (line evaluation values), and the frame in which the influence of an external flash has ended is detected by detecting a steep decrease in evaluation value in the line direction (line evaluation values). Accordingly, with the imaging device 7000, regardless of the timing at which an external flash is emitted (regardless of the line at which the influence of an external flash starts), there is no need for a frame memory or the like, and since the evaluation value of a previous frame is not necessary, there is no frame delay in the determination of whether the influence of an external flash is present, and it is possible to determine whether the influence of an external flash is present in the same frame. For this reason, with the imaging device 7000, whether the influence of an external flash is present can be determined without being influenced by setting conditions such as the iris of the imaging device.

Eighth Embodiment

Next is a description of an eighth embodiment.

FIGS. 22, 23, and 24 show the schematic configuration of an imaging device, a line increase determination unit, and a line decrease determination unit of the eighth embodiment as well. The basic configurations and operations of various units in FIGS. 22, 23, and 24 are similar to those described in the seventh embodiment, and therefore the following describes mainly differing portions.

In FIG. 22, the imaging unit 1 is constituted by an imaging element that uses, for example, a three-channel CMOS image sensor that obtains G (green), B (blue), and R (red) primary color signals, and the imaging unit 1 captures images of a subject and outputs imaging signals for the three channels.

For each frame, the line evaluation value calculation unit 44 calculates an evaluation value LGn, LBn, and LRn (n being the line position) independently for each line based on the average signal level or the like of the respective lines of the imaging signals for the three channels.

The line increase determination unit 47 detects the line m1 (m1 being the line position) at which the line evaluation values for the three channels are all greater than the line evaluation values of a line that is a lines earlier (a being a positive integer) by respective predetermined amounts or more, and raises a flag (line increase flag).

The line decrease determination unit 48 detects the line m2 (m2 being the line position) at which the line evaluation values for the three channels are all less than the line evaluation values of a line that is b lines earlier (b being a positive integer) by respective predetermined amounts or more, and raises a flag (line decrease flag).

If the flag output from the line increase determination unit 47 (line increase flag) is raised, the frame determination unit 49 determines that the influence of an external flash on the imaging signal of that frame has started, if the flag output from the line decrease determination unit 48 (line decrease flag) is raised, the frame determination unit 49 determines that the influence of an external flash on the imaging signal of that frame has ended, and the frame determination unit 49 outputs frame determination information indicating the determination results.

If neither of the flags output from the line increase determination unit 47 and the line decrease determination unit 48 are raised, the frame determination unit 49 determines that the influence of an external flash basically continues to be that of the previous frame.

Based on the frame determination information, the flash correction processing unit 5 subjects the imaging signal to processing for eliminating or suppressing the influence of an external flash.

The imaging device of the present embodiment differs from the imaging device 7000 of the seventh embodiment in that line evaluation values are calculated based on three channels, namely the primary color signals G, B, and R, and the evaluation value comparison units of the line increase determination unit 47 and the line decrease determination unit 48 determine that the influence of an external flash has started and stopped if the line evaluation values of all three channels satisfy a predetermined condition at the same time. The operations performed in the case where an external flash has been emitted at the times shown in FIGS. 19, 20, and 21 are the similar to those described in the seventh embodiment, with the exception of the differences described above. Since the influence of an external flash starts and stops at the same times in the imaging signals for all of the primary color signal channels, the imaging device of the present embodiment can more reliably determine whether the influence of an external flash is present regardless of the type of subject.

Note that although the imaging device, the line increase determination unit, and the line decrease determination unit of the present embodiment have been described with reference to FIGS. 22, 23, and 24, they can, needless to say, have other appropriate configurations without departing from the spirit of the invention.

Note that although the case where the signal levels of primary color signals G, B, and R are used as the evaluation values of respective lines is described in the present embodiment, there is no limitation to this, and for example, another signal component or value such as the color component or frequency component of an imaging signal or the SN ratio may be used as the evaluation value as long it changes depending on whether the influence of an external flash is present.

Also, although the case where the present invention is applied to the imaging signals of the three channels R, G, and B is described above, there is no limitation to this, and the present invention may be applied to, for example, imaging signals for three channels corresponding to the subtractive colors yellow, magenta, and cyan. Furthermore, the present invention may be applied to imaging signals of four channels (e.g., the R channel, G1 channel, G2 channel, and B channel) or more.

As described above, with the imaging device of the present embodiment, a frame in which the influence of an external flash started is detected by detecting a steep increase in evaluation value in the line direction (line evaluation values), and a frame in which the influence of an external flash ended is detected by detecting a steep decrease in evaluation value in the line direction, thus enabling appropriately detecting a portion (imaging signal) that has been influenced by an external flash. In other words, with the imaging device of the present embodiment, regardless of the timing at which an external flash is emitted (regardless of the line at which the influence of an external flash starts), there is no need for a frame memory or the like, and since the evaluation value of a previous frame is not necessary, there is no frame delay in the determination of whether the influence of an external flash is present, and it is possible to determine whether the influence of an external flash is present in the same frame. For this reason, with the imaging device of the present embodiment, whether the influence of an external flash is present can be determined without being influenced by setting conditions such as the iris of the imaging device, and furthermore, employing the evaluation values (line evaluation values) of imaging signals of multiple channels enables suppressing the erroneous detection of the influence of an external flash and more reliably determining whether the influence of an external flash is present.

Note that in the above embodiments, a description is given of the case where the evaluation value shift register units 451, 471, and 481 are constituted from a flip-flops and b flip-flops, and the output thereof is the output of the last flip-flop. However, there is no limitation to this, and for example, a configuration is possible in which the output of the evaluation value shift register units 451, 471, and 481 is a signal (line evaluation value) output from an arbitrary position (output of an arbitrary flip-flop) among the flip-flops constituting the evaluation value shift register units 451, 471, and 481. This enables changing the numbers of lines "a" and "b" that are parameters when determining whether an external flash was emitted.

Ninth Embodiment

Next is a description of a ninth embodiment with reference to the drawings.

<9.1: Configuration of Imaging Device>

Figure 25:
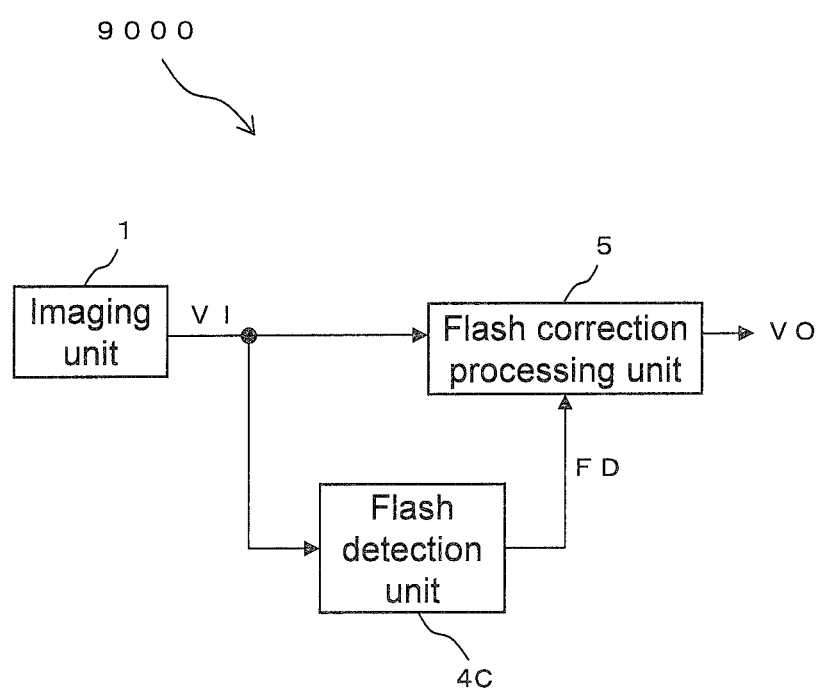
FIG. 25 is a block diagram of an imaging device according to a ninth embodiment.

FIG. 25 is a block diagram (schematic configuration diagram) of an imaging device 9000 of the ninth embodiment. Note that for the sake of convenience, the following will describe processing in units of fields.

As shown in FIG. 25, the imaging device 9000 includes an imaging unit 1 that generates an imaging signal VI by capturing images of a subject, a flash detection unit 4C that, for each field, detects whether an external flash has influenced the imaging signal VI generated by the imaging unit 1 and generates a flash detection signal FD including information indicating the detection results, and a flash correction processing unit 5 that corrects the imaging signal VI output from the imaging unit 1 that has been influenced by an external flash in accordance with the flash detection signal FD generated by the flash detection unit 4C.

The imaging unit 1 includes a CMOS imaging element (CMOS image sensor or the like), and acquires the imaging signal VI by collecting light from a subject and performing photoelectric conversion on the collected light. The imaging unit 1 outputs the acquired imaging signal VI to the flash detection unit 4C and the flash correction processing unit 5.

The flash detection unit 4C receives an input of the imaging signal VI output from the imaging unit 1, detects whether the influence of an external flash is present based on the imaging signal VI, and generates the flash detection signal FD having the value of "1" if the influence of an external flash is present in a lower portion of the screen, and having the value of "0" if there is no influence of an external flash. The flash detection unit 4C then outputs the generated flash detection signal FD to the flash correction processing unit 5.

Figure 27:
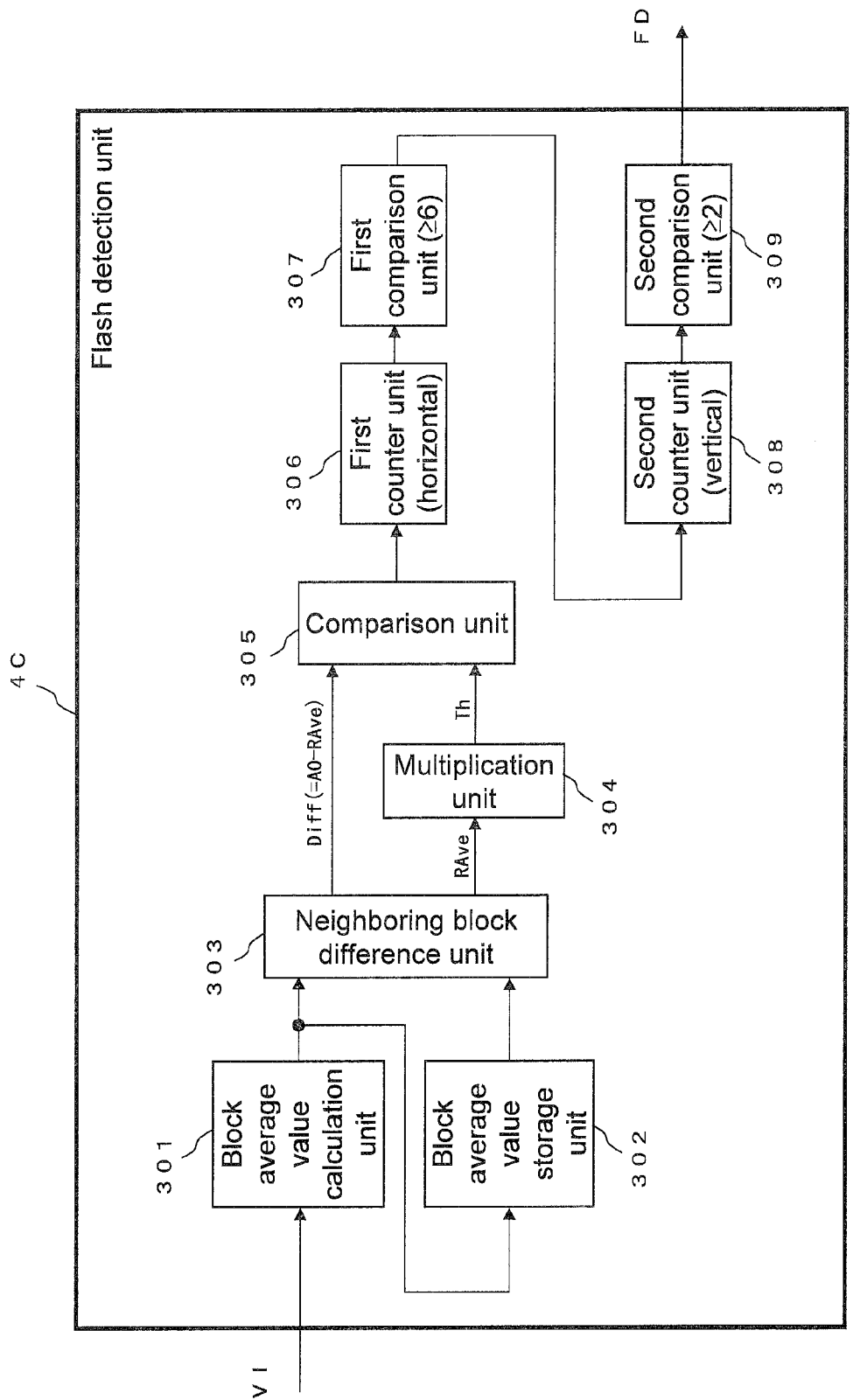
FIG. 27 is a diagram showing the configuration of a flash detection unit according to the ninth embodiment.

FIG. 27 is a diagram showing an example of the more detailed configuration of the flash detection unit 4C.

As shown in FIG. 27, the flash detection unit 4C includes a block average value calculation unit 301, a block average value storage unit 302, a neighboring block difference unit 303, a multiplication unit 304, and a comparison unit 305. The flash detection unit 4C furthermore includes a first counter unit 306, a first comparison unit 307, a second counter unit 308, and a second comparison unit 309.

Figure 26:
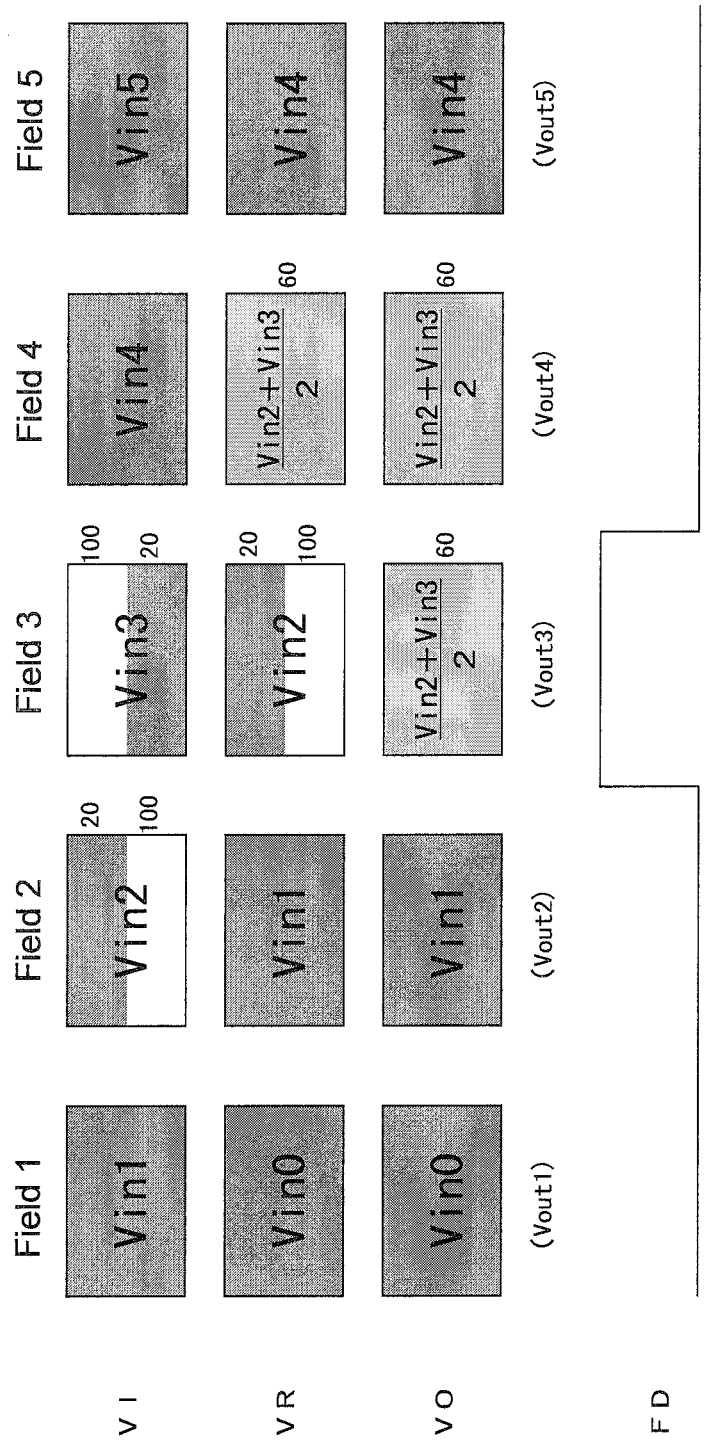
FIG. 26 is a diagram showing the state of a video in various units of the imaging device according to the ninth embodiment.

The flash correction processing unit 5 receives an input of the imaging signal VI output from the imaging unit 1 and the flash detection signal FD output from the flash detection unit 4C. Based on the flash detection signal FD, the flash correction processing unit 5 subjects the imaging signal VI to flash correction processing and noise elimination processing, and outputs an imaging signal VO that has been subjected to flash correction processing and noise elimination. For example, as shown in FIG. 26, when there is video (a field image) in which the brightness has changed due to a flash (external flash) in "field 2" and "field 3", the flash correction processing unit 5 performs signal averaging on the video in "field 2" and "field 3". Specifically, the flash correction processing unit 5 performs signal averaging on a portion that is bright due to a flash and has a signal level of "100" (e.g., the signal level at W 100% is assumed to be "100") and a portion that has not been influenced by the flash and has a signal level of "20", and thus generates a video that has a signal level of "60". This video obtained by the signal averaging is output as the imaging signal VO instead of "field 2", which is the field in which the flash detection signal FD has a value of "1", and "field 3", which is the subsequent field. A detailed description of the processing performed by the flash correction processing unit 5 will not be given here since it is not a main part of the present embodiment.

<9.2: Operations of Imaging Device>

The following describes operations of the imaging device 9000 constituted as described above.

The imaging signal VI acquired by the imaging unit 1 is output to the block average value calculation unit 301 of the flash detection unit 4C and the flash correction processing unit 5.

The block average value calculation unit 301 divides the image (field image) formed by the input imaging signal VI into blocks of a predetermined size (in FIG. 28, the image is divided into 16×24 blocks), and calculates a signal level average value for each block (average value of the pixel values constituting the block). The average values of the blocks calculated by the block average value calculation unit 301 are then output to the block average value storage unit 302 and the neighboring block difference unit 303.

The block average value storage unit 302 stores the block average values output from the block average value calculation unit 301, and outputs each of the stored block average values to the neighboring block difference unit 303 after delaying it by a time corresponding to one field (a time corresponding to one frame in the case of performing processing in units of frame images).

The following processes (1) to (3) are executed in the neighboring block difference unit 303.

(1) The neighboring block difference unit 303 acquires a block average value A0 for the block targeted for processing (referred to as the "block of interest") of the current field output from the block average value calculation unit 301.

(2) The neighboring block difference unit 303 detects, from among the neighboring blocks of the block of interest in the field one field earlier than the current field output from the block average value storage unit 302, the block whose block average value is the closest to the block average value A0 of the block of interest, and uses the block average value of the detected block as a representative average value RAve.

(3) The neighboring block difference unit 303 calculates a block difference value Diff using the following expression.

$$Diff = A0 - RAve$$

The block difference value Diff calculated by the neighboring block difference unit 303 is then output to the comparison unit 305. Also, the representative average value RAve acquired by the neighboring block difference unit 303 is output to the multiplication unit 304.

The multiplication unit 304 multiplies the representative average value RAve by a predetermined coefficient, and the multiplication result is output to the comparison unit 305 as a threshold signal Th.

The comparison unit 305 compares the block difference value Diff from the neighboring block difference unit 303 with the threshold signal Th output from the multiplication unit 304. Specifically, the comparison unit 305 outputs "1" to the first counter unit 306 if the following inequality expression is satisfied, and outputs "0" if it is not satisfied.

$$Diff > Th$$

The first counter unit 306 targets all of the blocks included in one horizontal level in the image (field image) formed by the imaging signal VI (in FIG. 28, 24 blocks) for counting, and counts the number of comparison results with the value of "1" that have been output from the comparison unit 305. The count value acquired by the first counter unit 306 is output to the first comparison unit 307. Note that when the first counter unit 306 has finished performing counting on all of the blocks included in one horizontal level in the image (field image) formed by the imaging signal VI (in FIG. 28, 24 blocks), the first counter unit 306 resets the count value.

The first comparison unit 307 compares the count value acquired by the first counter unit 306 with a predetermined threshold value (e.g., "6"). Specifically, the first comparison unit 307 outputs "1" to the second counter unit 308 if the count value acquired by the first counter unit 306 is greater than or equal to the predetermined threshold value, and otherwise outputs "0".

The second counter unit 308 counts the number of times that a comparison result with the value of "1" is output from the comparison unit 305. The count value acquired by the second counter unit 308 is output to the second comparison unit 309. Note that the second counter unit 308 targets a designated area of one field image (in FIG. 28, 8×24 blocks in the lower portion of the screen), and resets the count value when count processing has ended in the designated area.

The second comparison unit 309 compares the count value acquired by the second counter unit 308 with a predetermined threshold value (e.g., "2"). Specifically, the second comparison unit 309 outputs "1" if the count value acquired by the second counter unit 308 is greater than or equal to the predetermined threshold value, and otherwise outputs "0". The comparison result of the second comparison unit 309 is then output from the flash detection unit 4C to the flash correction processing unit 5 as the flash detection result signal FD, whose shape is sustained throughout the next field.

<<Case of FIG. 26 (Case of External Flash)>>

Next is a description of operations performed by the flash detection unit 4C that detects whether a flash was emitted upon receiving an input of the imaging signal VI from "field 1" to "field 5" in FIG. 26. Note that it is assumed here that the video of the field prior to "field 1" is "field 0", and that there is no influence of an external flash in "field 0".

Figure 29:
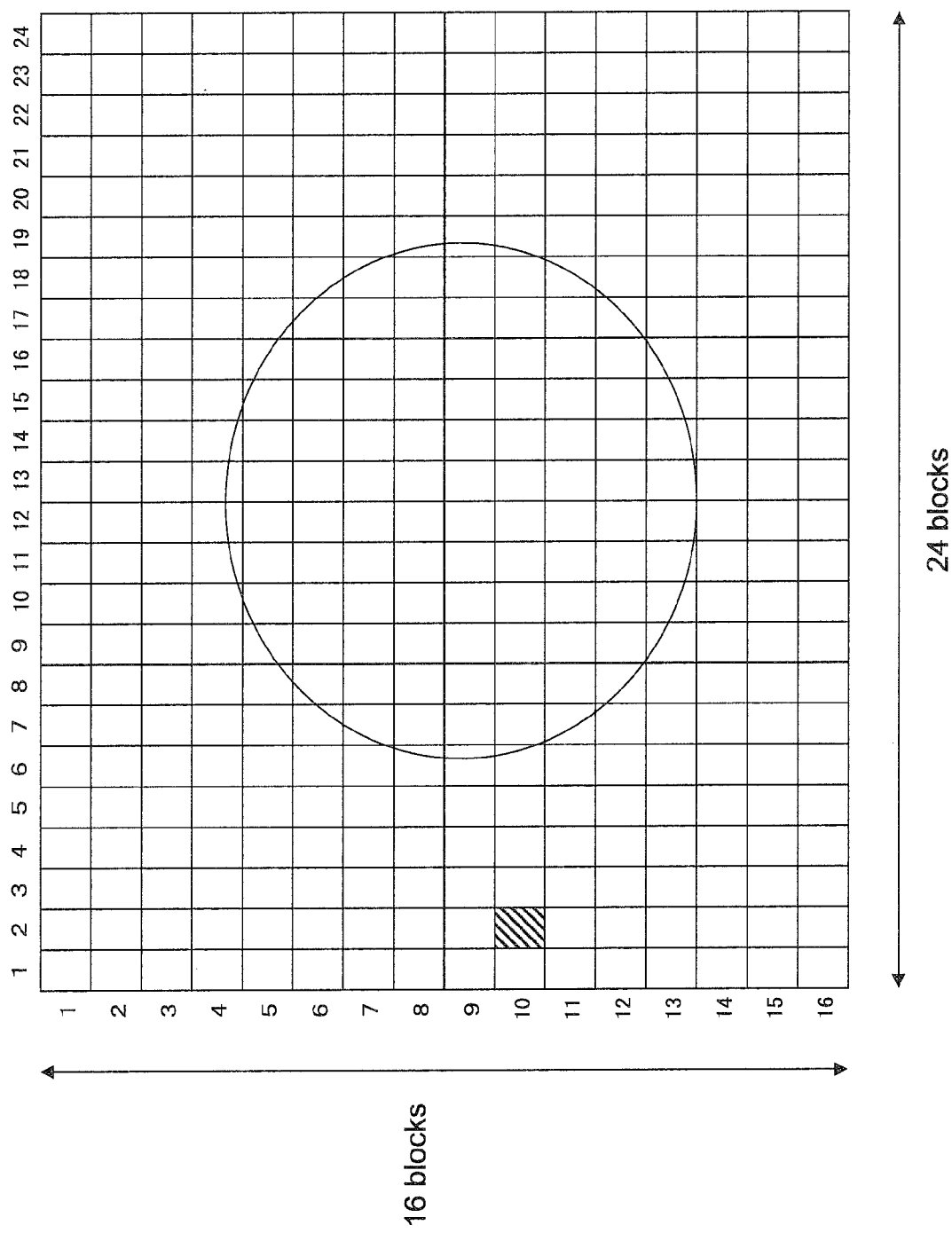
FIG. 29 is a diagram showing a block to be subjected to processing in the current field according to the ninth embodiment.

According to the imaging device 9000, an image of an elliptical subject as shown in FIG. 29 is being captured, and when the elliptical subject shown in FIG. 29 is influenced by a flash, the lower half of the subject becomes bright in "field 2" due to the influence of the flash. Specifically, the imaging signal VI corresponding to the lower portion of "field 2" is a bright (high luminance) signal due to the influence of the flash.

Figure 28:
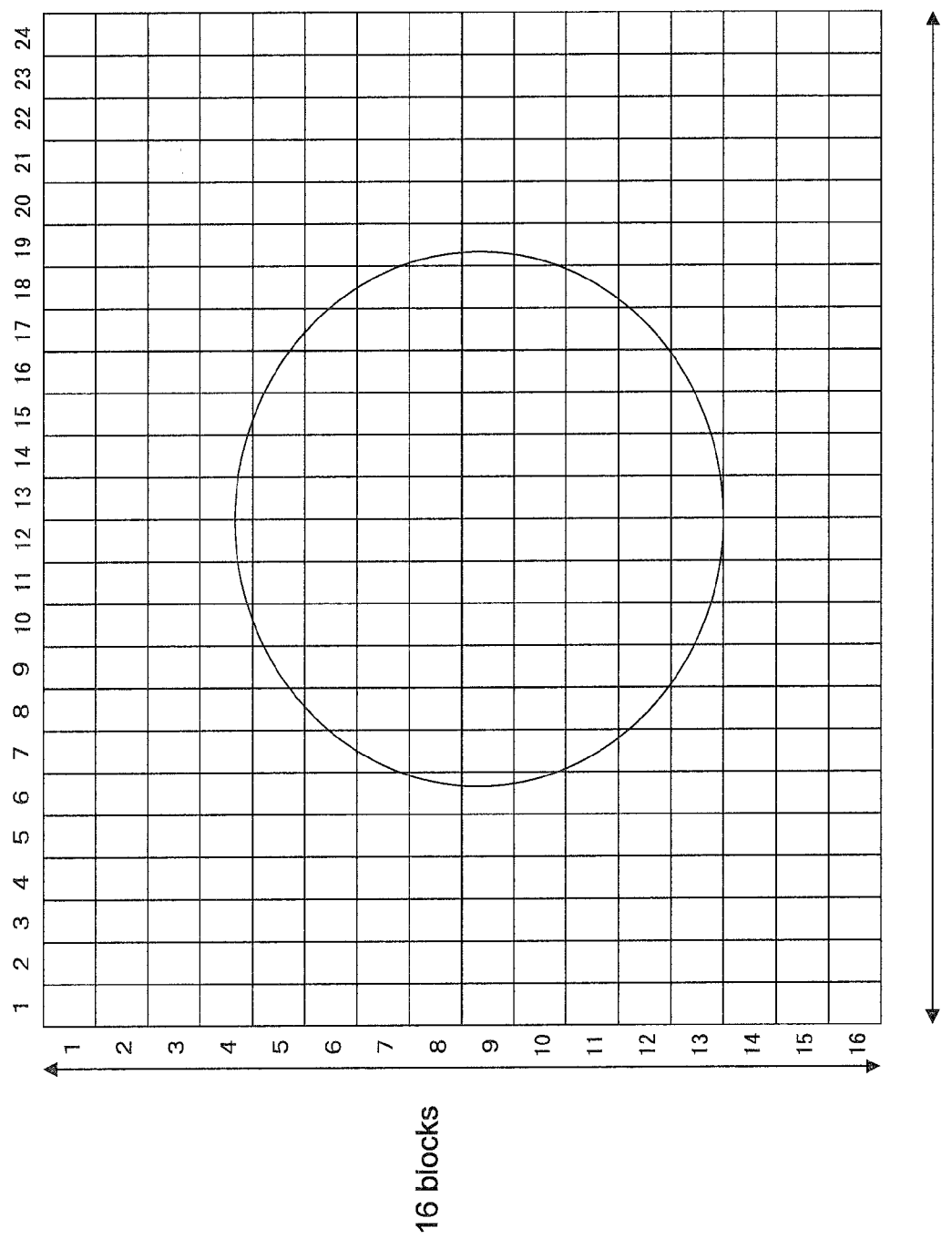
FIG. 28 is a diagram showing the state of a screen divided into blocks according to the ninth embodiment.

In the imaging device 9000, the screen is divided into 16 blocks vertically, and 24 blocks horizontally as shown in FIG. 28, and flash detection processing is performed using these divided blocks.

The block average value calculation unit 301 obtains an average value of the input imaging signal VI of each of the divided blocks. The average values of the blocks obtained by the block average value calculation unit 301 are stored in the block average value storage unit 302, and in the next field, they are used as the average values of the blocks of the field one field earlier.

Next is a description of processing that the neighboring block difference unit 303 performs on the block indicated by the hatched portion in FIG. 29. Note that in FIG. 5, the block average value of the n-th field in the i-th row and the j-th column is expressed as Ave(i,j,n).

Figure 30:
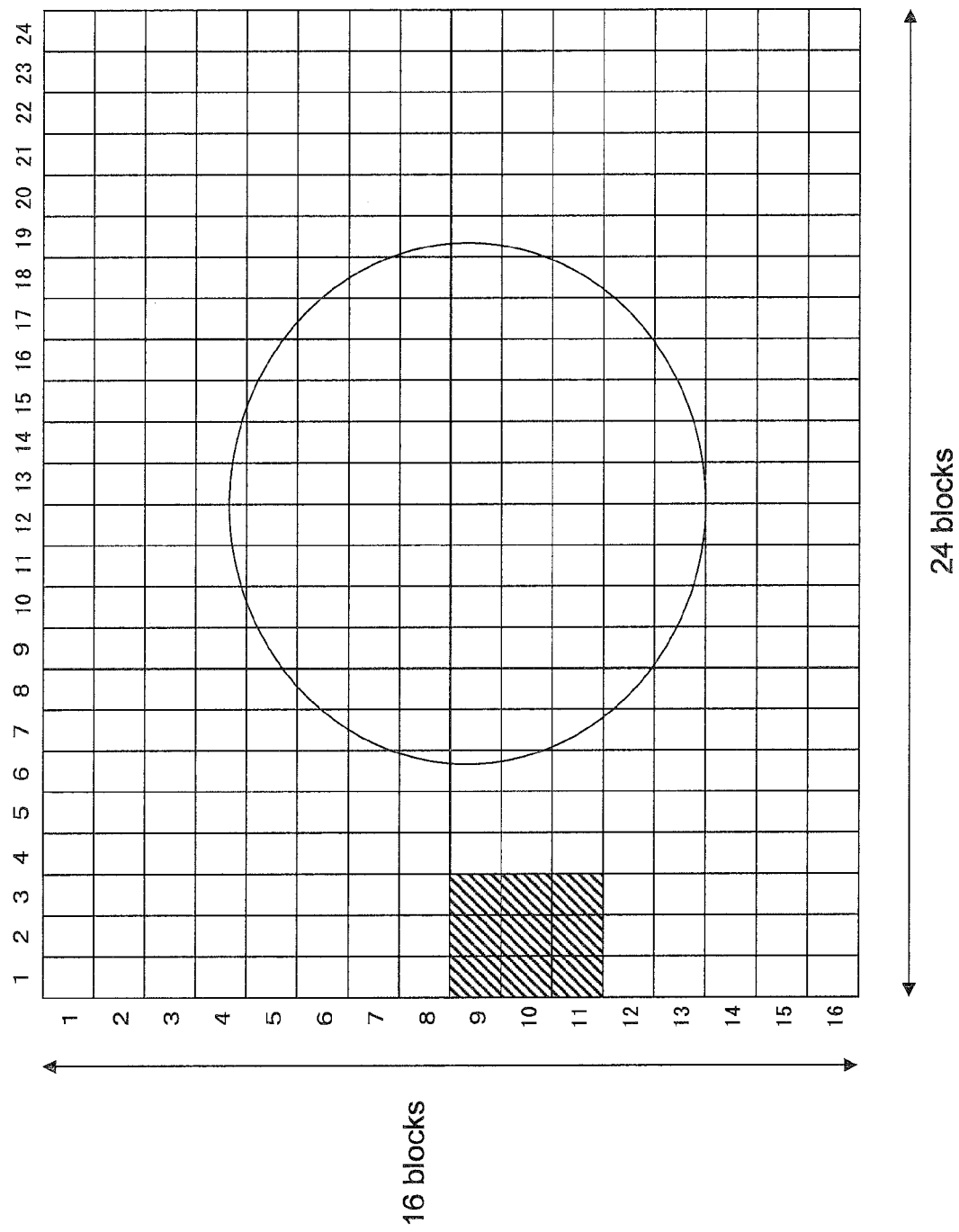
FIG. 30 is a diagram showing blocks of a previous field that are used in processing according to the ninth embodiment.

With respect to the block average value of the hatched portion in FIG. 29 that was generated by the block average value calculation unit 301, from among the block average values of a total of nine blocks of the previous field stored in the block average value storage unit 302, namely the block average value Ave(10,2,1) of the block that is at the same position (10,2) (10th row, 2nd column) indicated by the hatched portion in FIG. 30 in the field one field earlier (field 1) and the eight peripheral blocks surrounding it, namely Ave(9,1,1), Ave(9,2,1), Ave(9,3,1), Ave(10,1,1), Ave(10,3,1), Ave(11,1,1), Ave(11,2,1), and Ave(11,3,1), the value that is closest to the block average value Ave(10,2,2) of the current field (field 2) indicated by the hatched portion in FIG. 30 is used as the representative average value RAve of the neighboring nine blocks of the field one field earlier.

Then, the neighboring block difference unit 303 generates a block difference value Diff(10,2) by subtracting the representative average value RAve(10,1) from the block average value Ave(10,2,2) of the block indicated by the hatched portion in FIG. 30. Specifically, the neighboring block difference unit 303 calculates the block difference value Diff(10,2) using the following expression.

$$Diff(10,2) = Ave(10,2,2) - RAve(10,1)$$

The neighboring block difference unit 303 then outputs the calculated block difference value Diff to the comparison unit 305.

On the other hand, the representative average value RAve (10,1) of the nine neighboring blocks is multiplied by ¼ in the multiplication unit 304. Specifically, the neighboring block difference unit 303 calculates the threshold value Th(10,2) using the following expression.

$$Th(10,2) = \tfrac{1}{4} \times RAve(10,1)$$

The neighboring block difference unit 303 then outputs the calculated threshold value Th to the comparison unit 305.

The comparison unit 305 compares the block difference value Diff input from the neighboring block difference unit 303 and the threshold value Th input from the multiplication unit 304, and outputs "1" to the first counter unit 306 if the block difference value Diff is greater than or equal to the threshold value Th, and otherwise outputs "0".

The first counter unit 306 counts the number of blocks for which the comparison result obtained by the comparison unit 305 is the value of "1" in each level (i.e., in each horizontal group of 24 blocks), and outputs the number to the first comparison unit 307. The first comparison unit 307 outputs "1" to the first second comparison unit 347-308 if the counter for a level (i.e., a horizontal group of 24 blocks) is greater than or equal to 6, and outputs "0" if the counter is less than 6. Specifically, the first comparison unit 307 outputs "1" if one level of blocks includes six or more blocks whose brightness is 1.25 (=1+¼) times or more that of the block with the closest value among the nine neighboring blocks in the field one field earlier, and outputs "0" if there are less than six such blocks.

Figure 31:
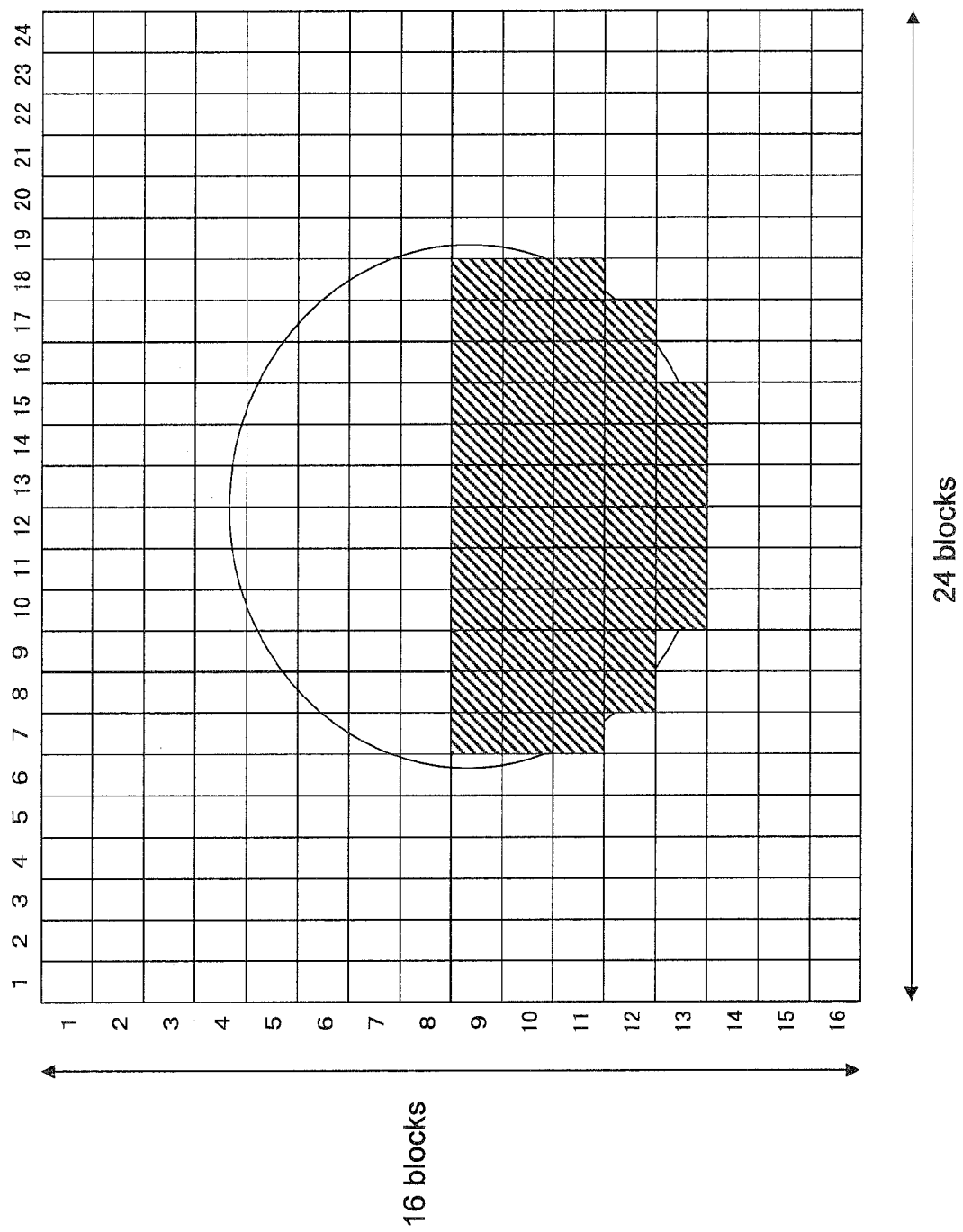
FIG. 31 is a diagram showing blocks determined to have been influenced by a flash according to the ninth embodiment.

Next, the second counter unit 308 receives an input of the output of the first comparison unit 307, and counts the number of continuous levels for which the output of the first comparison unit 307 is "1". In the case of an elliptical subject in the central portion of the screen as shown in FIG. 31, when the subject becomes brighter than in the field one field earlier in the lower half of the screen due to a flash, according to the above-described operations, the comparison unit 305 outputs "1" for the blocks indicated by the hatched portions in FIG. 31. In the case shown in FIG. 31, in the first five levels of the lower half of the screen (level 9 to level 13 in FIG. 31), the comparison unit 305 outputs "1" because there are six or more blocks in each of these levels. Since the first comparison unit 307 outputs "1" for five continuous levels starting at level 9 (level 9 to level 13 in FIG. 31), the second counter unit 308 acquires "5" as the count value.

The count value acquired by the second counter unit 308 is input to the second comparison unit 309. The second comparison unit 309 outputs "1" if this count value is two or more even one time in one field, and outputs "0" if this count value is not two or more even one time. Accordingly, in the case of FIG. 31, when the second counter unit 308 of the imaging device 9000 has counted up to "2" in the processing of counting up to "5", the second comparison unit 309 outputs "1". In other words, in this case, the flash detection unit 4C determines that a flash was emitted (the influence of an external flash is present) in the imaging signal forming the current field.

Figure 32:
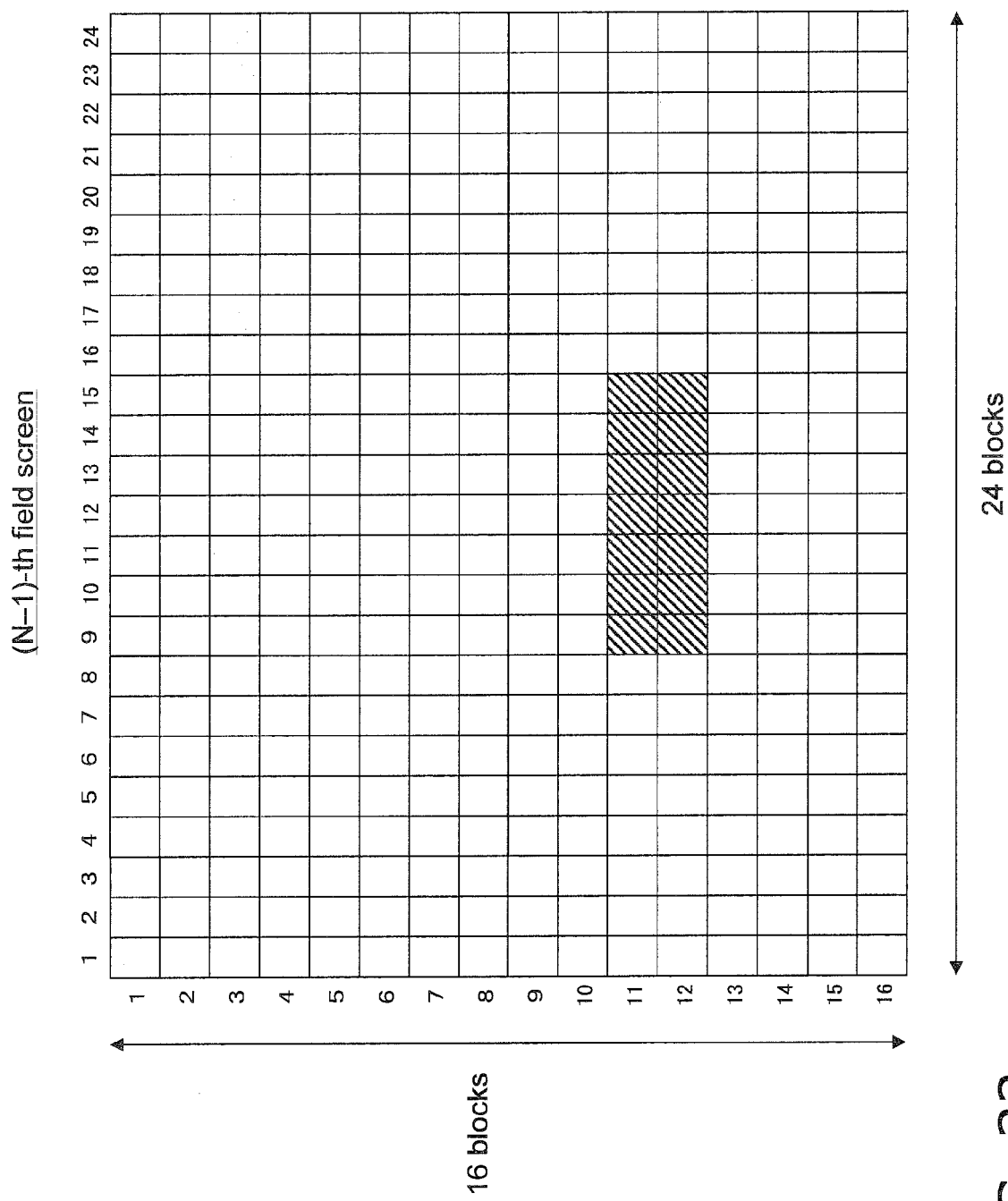
FIG. 32 is a diagram showing blocks in which a high-luminance subject appears in a previous field in a conventional example, according to the ninth embodiment.

<<Case of FIG. 32 (Case where High-Luminance Subject Moves in Screen)>>

Next is a description of the case where a high-luminance subject moves in the screen (the case where the imaging device 9000 captures a scene in which a high-luminance subject moves). Specifically, the following describes the case where a high-luminance subject exists in the portion shown by hatched portions in FIG. 32. Here, the blocks corresponding to the portion other than the high-luminance subject are blocks constituted by dark video, and the imaging device 9000 is capturing a scene in which this high-luminance subject has moved one block-worth in one field.

Figure 33:
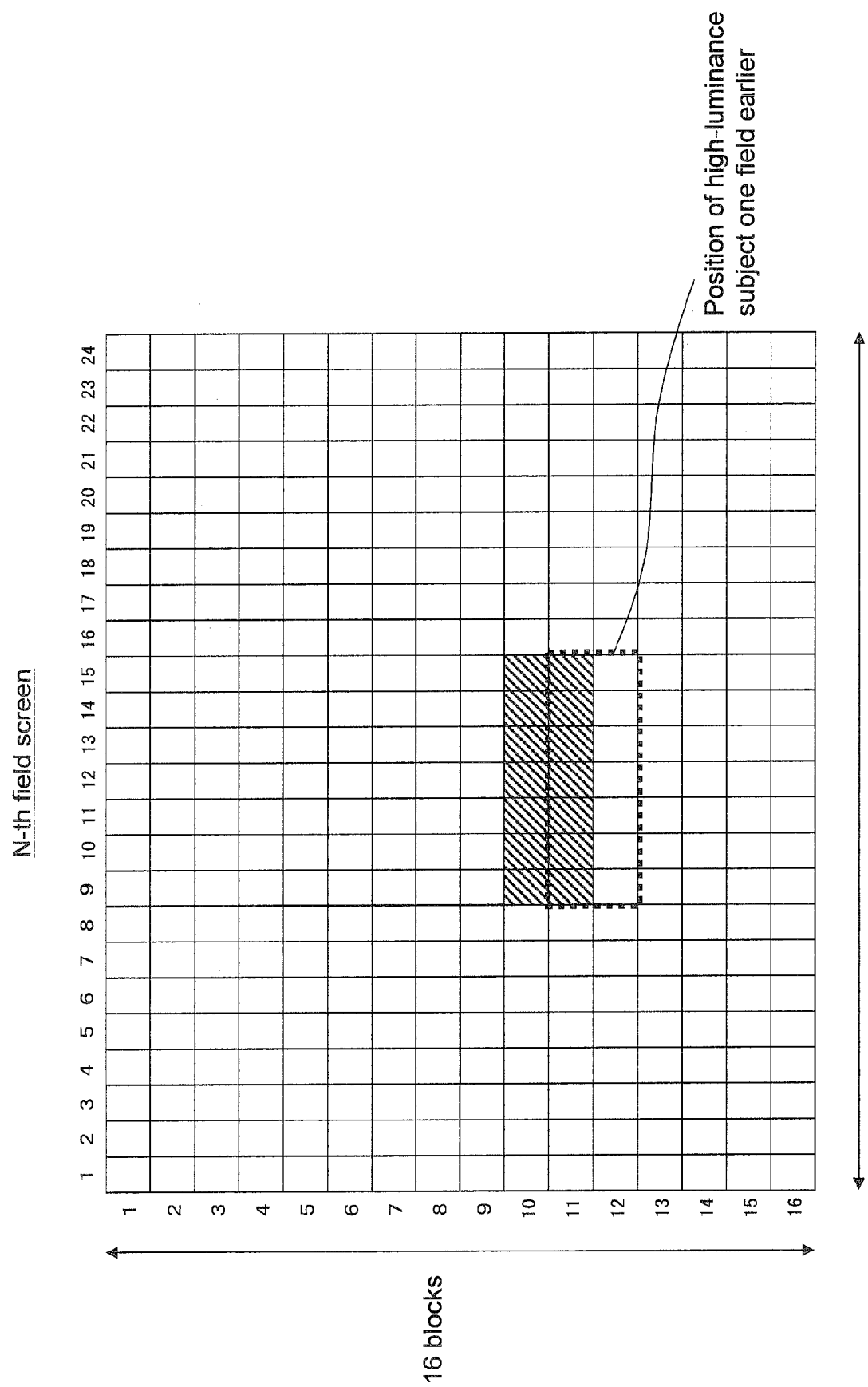
FIG. 33 is a diagram showing blocks in which a high-luminance subject appears in the current field in a conventional example, according to the first embodiment.
Figure 34:
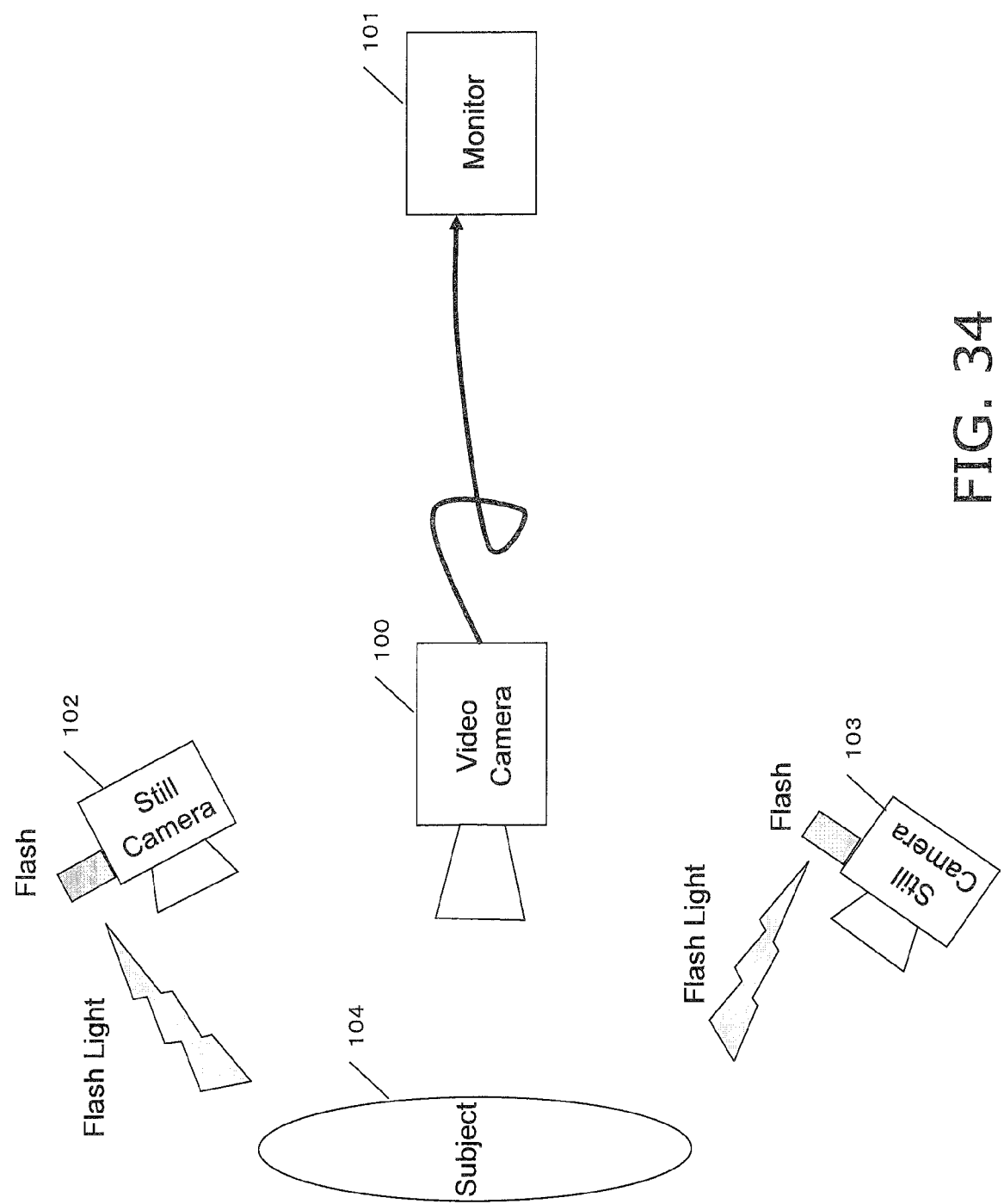
FIG. 34 is a diagram illustrating an imaging scene in which artifacts can appear in an imaging signal due to an external flash.

Assume that FIG. 33 is the screen one field after that in FIG. 32. Note that for the sake of convenience in the description, the screen in FIG. 32 is the "(N−1)-th field" (N being an integer) screen, and the screen in FIG. 33 is the "N-th field" screen.

In this case, the blocks in the 10th level are dark (have a low luminance value) in the field one field earlier ((N−1)-th field) as shown in FIG. 32. However, the 11th level in the (N−1)-th field is bright (the luminance value is high), and therefore when the blocks in the 10-th level of the N-th field are targeted for processing, bright blocks exist among the nine neighboring blocks of the field one field earlier ((N−1)-th field). Therefore, according to the operations described above, when performing processing on the bright blocks of the 10-th level in the N-th field, the neighboring block difference unit 303 selects the value of a bright block in the 11-th row in the field one field earlier ((N−1)-th field) as the representative average value RAve. Thus, a block difference value Diff is obtained by subtracting the representative value RAve of the field one field earlier ((N−1)-th field) from the block average value Ave of the block targeted for processing in the N-th field, and since the block difference value Diff is low, the comparison result of the comparison unit 305 is "0".

Also, when performing processing on the bright blocks of the 11-th level in the N-th field, the neighboring block difference unit 303 selects the value of a bright block in the 11-th or 12-th level in the field one field earlier ((N−1)-th field) as the representative average value RAve, and therefore the comparison result of the comparison unit 305 is likewise "0".

Accordingly, when a high-luminance subject has moved, the flash detection unit 4C does not mistakenly detect (erroneously detect) an increase in brightness due to a flash.

According to the above operations, the imaging device 9000 does not mistakenly detect (erroneously determine) that a flash was emitted when a high-luminance subject has moved. Furthermore, the imaging device 9000 can realize flash detection processing for detecting a change in brightness due to a normal flash without using motion detection processing, that is to say, with a small circuit scale.

Note that in the operations performed by the imaging device 9000 described above, there is not necessarily a need for the block average value to be a simple average value, and for example, a configuration is possible in which the average value is obtained by simply bit-shifting the total value of the pixel values of the pixels constituting a block and multiplying the total value by 1 divided by an integral multiple of 2.

<<Other Matters>>

The ninth embodiment has been described as an example of an embodiment of the present invention. However, the present invention is not limited to this. In view of this, the following describes a summary of other embodiments of the present invention. Note that the present invention is not limited to these embodiments, and is also applicable to other appropriately modified embodiments.

Although processing is described as being performed in units of fields that constitute screens in the ninth embodiment, there is no limitation this, and processing may be performed in units of frames.

Although the case of dividing a screen into 16 blocks vertically and 24 blocks horizontally is described in the ninth embodiment, the number of divided blocks is not limited to this, and another appropriate number of blocks vertically and horizontally may be used depending on the detection precision and circuit scale limitations.

In the ninth embodiment, the neighboring block difference unit 303 uses, as the representative average value for a block at a certain position, the closest average value among the average values of a total of nine blocks in the previous field, namely the block at the same position and the eight peripheral blocks surrounding it, but there is no limitation to this, and for example, a configuration is possible in which the closest average value among the average values of a total of 25 blocks, namely the block of interest, the eight peripheral blocks surrounding it, and the 16 blocks surrounding those peripheral blocks, is used as the representative average value.

Although the case where the multiplication unit 304 multiplies the input value by ¼ is described in the ninth embodiment, there is no limitation to this, and for example, the multiplication unit 304 may multiply the input value by ⅓ or ⅕.

Although the first comparison unit 307 outputs "1" if six or more blocks satisfy a condition among a horizontal group of 24 blocks in the ninth embodiment, this number of blocks is not limited to "6", and may be another number such as "5" or "7".

Although the second comparison unit 309 outputs "1" if the counter value of the second counter unit 308 is two or more even one time in one field in the ninth embodiment, there is no limit to the counter value reaching "2", and the value "3" or more may be used.

Other Embodiments

In the above embodiments, the portion described as a "frame" may be substituted with "field" without departing from the spirit of the invention. Also, in the above embodiments, the portion described as a "field" may be substituted with "frame" without departing from the spirit of the invention.

Also, the various blocks of the imaging device described in the aforementioned embodiments may be implemented as single individual chips by employing semiconductor devices such as LSIs, or some or all of the blocks may be implemented as a single chip.

Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, reconfigurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

In addition, the various processes in the aforementioned embodiments may be realized as hardware, or as software (this includes implementations through an OS (operating system), middleware, or a predetermined library). These processes may also be implemented through processes in which the software and hardware run integrated with one another. It goes without saying that it is necessary to adjust the timing at which to execute each process in the case where the imaging device according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiments are not necessarily limited to the descriptions in the aforementioned embodiments, and the order of execution can be interchanged without departing from the spirit of the invention.

It should be noted that the specific configuration of the present invention is not intended to be limited to the above embodiments in any way, and various modifications and variations can be made without deviating from the essential spirit of the invention.

INDUSTRIAL APPLICABILITY

An imaging device, external flash detection method, program, and integrated circuit according to the present invention are useful to an imaging device that detects and corrects a white band-shaped artifact that occurs due to capturing an image of a subject when a flash or the like is emitted, which is distinctive to imaging devices that use CMOS image sensors, which have come to be used in video cameras as well in recent years, and the present invention can be carried out in such a field.

REFERENCE SIGNS LIST 1000, 2000, 5000, 7000, 9000 imaging device
1 imaging unit
2, 4, 4A, 4B, 4C detection unit (flash detection unit)
3 correction unit
5 flash correction processing unit
11 line averaging unit (line luminance information calculation unit)
12 storage unit
13 frame difference calculation unit
14 determination unit
41, 45 line determination unit
42 determination information storage unit
43, 46, 49 frame determination unit
44, 47 line evaluation value calculation unit
47 line increase determination unit
48 line decrease determination unit
301 block average value calculation unit
302 block average value storage unit
303 neighboring block difference unit
304 multiplication unit
305, 307, 309 comparison unit
306, 308 counter unit
411 evaluation value generation unit
412 evaluation value storage unit
413 evaluation value comparison unit
451 evaluation value shift register unit
452 evaluation value comparison unit
453, 461 line counter
454 line position storage unit
455, 456 line evaluation value storage unit
462, 463 counter value comparison unit
464, 465 line evaluation value storage unit
466, 467, 468 evaluation value comparison unit
469 frame determination information generation unit

The invention claimed is:

1. An imaging device comprising:
   an imaging unit that acquires an imaging signal by capturing an image of a subject; and
   a flash detection unit that detects whether the imaging signal acquired by the imaging unit has been influenced by a flash,
   wherein the flash detection unit comprises:
   a line luminance information value calculation unit that calculates a luminance information value for each line of an image formed by the imaging signal;
   a frame difference calculation unit that, for each line of a current image formed by the imaging signal targeted for processing, calculates a frame difference value by subtracting the line luminance information value of the same line in an image one unit image earlier from the luminance information value of the line of the current image; and
   a determination unit that determines whether the influence of an external flash is present in the imaging signal by determining whether the frame difference values are greater than a first reference value, which is a predetermined value, and
   the determination unit determines that the influence of an external flash is present if a period of continuous lines whose frame difference values are greater than the first reference value is substantially equal to one frame period.

2. The imaging device according to claim 1,
   wherein each of the luminance information values is any one of an average value of luminance levels, an additional value of luminance levels, a root mean square value of luminance levels, and a weighted average value of luminance levels.

3. The imaging device according to claim 1,
   wherein the determination unit determines that the line at the start of the period of continuous lines whose frame difference values are greater than the first reference value is a start line at which the influence of an external flash started.

4. The imaging device according to claim 1,
   wherein the determination unit determines whether the influence of an external flash has ended by determining whether the frame difference values are less than a second reference value, which is a predetermined value.

5. The imaging device according to claim 1,
   wherein the determination unit determines that the influence of an external flash has ended if a period of continuous lines whose frame difference values are less than the second reference value is substantially equal to one frame period.

6. The imaging device according to claim 1,
   wherein the determination unit determines that the line at the start of the period of continuous lines whose frame difference values are less than the second reference value is an end line at which the influence of an external flash ends.

7. The imaging device according to claim 1, further comprising:
   a storage unit that stores the luminance information value calculated by the line luminance information value calculation unit.

8. An imaging device comprising:
   an imaging unit that acquires an imaging signal by capturing an image of a subject; and
   a flash detection unit that detects whether the imaging signal acquired by the imaging unit has been influenced by a flash,
   wherein the imaging unit comprises an electronic shutter function,
   the flash detection unit comprises:
   a line luminance information value calculation unit that calculates a luminance information value for each line of an image formed by the imaging signal;
   a frame difference calculation unit that, for each line of a current image formed by the imaging signal targeted for processing, calculates a frame difference value by subtracting the line luminance information value of the same line in an image one unit image earlier from the luminance information value of the line of the current image; and
   a determination unit that determines whether the influence of an external flash is present in the imaging signal by determining whether the frame difference values are greater than a first reference value, which is a predetermined value, and
   the determination unit determines that the influence of an external flash is present in the imaging signal if a period of continuous lines whose frame difference values are greater than the first reference value is substantially equal to a period corresponding to a shutter time of the electronic shutter.

9. The imaging device according to claim 8,
   wherein the determination unit determines that the influence of an external flash has ended if a period of continuous lines whose frame difference values are less than the second reference value is substantially equal to a period corresponding to a shutter time of the electronic shutter.

10. An external flash detection method comprising:
    an imaging step of acquiring an imaging signal by capturing an image of a subject;
    a flash detection step of detecting whether the imaging signal acquired in the imaging step has been influenced by a flash;
    a line luminance information value calculation step of calculating a luminance information value for each line of an image formed by the imaging signal;
    a frame difference calculation step of calculating, for each line of a current image formed by the imaging signal targeted for processing, a frame difference value by subtracting the line luminance information value of the same line in an image one unit image earlier from the luminance information value of the line of the current image; and
    a determination step of determining whether the influence of an external flash is present in the imaging signal by determining whether the frame difference values are greater than a first reference value, which is a predetermined value,
    wherein in the determination step, a determination is made that the influence of an external flash is present if a period of continuous lines whose frame difference values are greater than the first reference value is substantially equal to one frame period.

11. A non-transitory computer-readable medium having stored thereon a program for causing a computer to execute an external flash detection method used in an imaging device comprising an imaging unit that acquires an imaging signal by capturing an image of a subject, the external flash detection method comprising:

a flash detection step of detecting whether the imaging signal acquired by the imaging unit has been influenced by a flash;

a line luminance information value calculation step of calculating a luminance information value for each line of an image formed by the imaging signal;

a frame difference calculation step of calculating, for each line of a current image formed by the imaging signal targeted for processing, a frame difference value by subtracting the line luminance information value of the same line in an image one unit image earlier from the luminance information value of the line of the current image; and a determination step of determining whether the influence of an external flash is present in the imaging signal by determining whether the frame difference values are greater than a first reference value, which is a predetermined value, wherein in the determination step, a determination is made that the influence of an external flash is present if a period of continuous lines whose frame difference values are greater than the first reference value is substantially equal to one frame period.

12. An integrated circuit used in an imaging device comprising an imaging unit that acquires an imaging signal by capturing an image of a subject, the integrated circuit comprising:

a flash detection unit that detects whether the imaging signal acquired by the imaging unit has been influenced by a flash;

a line luminance information value calculation unit that calculates a luminance information value for each line of an image formed by the imaging signal;

a frame difference calculation unit that, for each line of a current image formed by the imaging signal targeted for processing, calculates a frame difference value by subtracting the line luminance information value of the same line in an image one unit image earlier from the luminance information value of the line of the current image; and a determination unit that determines whether the influence of an external flash is present in the imaging signal by determining whether the frame difference values are greater than a first reference value, which is a predetermined value, wherein the determination unit determines that the influence of an external flash is present if a period of continuous lines whose frame difference values are greater than the first reference value is substantially equal to one frame period.

* * * * *